US012749486B2

(12) United States Patent
Beckhardt et al.

(10) Patent No.: US 12,749,486 B2
(45) Date of Patent: Sep. 29, 2026

(54) ARBITRATION-BASED VOICE RECOGNITION

(71) Applicant: Sonos, Inc., Goleta, CA (US)

(72) Inventors: Steven Beckhardt, Boston, MA (US); Ted Lin, Ayer, MA (US)

(73) Assignee: Sonos, Inc., Goleta, CA (US)

( * ) Notice: Subject to any disclaimer, the term of this patent is extended or adjusted under 35 U.S.C. 154(b) by 130 days.

(21) Appl. No.: 18/787,400

(22) Filed: Jul. 29, 2024

(65) Prior Publication Data

US 2025/0037714 A1 Jan. 30, 2025

Related U.S. Application Data

(63) Continuation of application No. 18/449,254, filed on Aug. 14, 2023, now Pat. No. 12,051,418, which is a (Continued)

(51) Int. Cl.
*G10L 15/22* (2006.01)
*G06F 3/16* (2006.01)
(Continued)

(52) U.S. Cl.
CPC .............. *G10L 15/22* (2013.01); *G06F 3/165* (2013.01); *G06F 3/167* (2013.01); *G10L 15/32* (2013.01);
(Continued)

(58) Field of Classification Search
None
See application file for complete search history.

(56) References Cited

U.S. PATENT DOCUMENTS

| | | | |
|---|---|---|---|
| 2,171,598 | A | 9/1939 | Parker |
| 4,306,113 | A | 12/1981 | Morton |

(Continued)

FOREIGN PATENT DOCUMENTS

| | | | |
|---|---|---|---|
| CN | 1369188 | A | 9/2002 |
| CN | 1447624 | A | 10/2003 |

(Continued)

OTHER PUBLICATIONS

Notice of Allowance mailed on Oct. 6, 2022, issued in connection with U.S. Appl. No. 17/582,317, filed Jan. 24, 2022, 9 pages.

(Continued)

*Primary Examiner* — Jakieda R Jackson

(57) ABSTRACT

A first network microphone device (NMD) is configured to receive, from a second NMD, a first arbitration message including (i) a first measure of confidence associated with a voice input detected by the second NMD and (ii) the voice input detected by the second NMD, and receive, from a third NMD, a second arbitration message including (i) a second measure of confidence associated with the voice input as detected by the third NMD and (ii) the voice input as detected by the third NMD. The first NMD is configured to determine that the second measure of confidence is greater than the first measure of confidence and based on the determination, perform voice recognition based on the voice input as detected by the third NMD, where the voice input includes a command to control audio playback by the first, second, and/or third NMD, and after performing voice recognition, executing the command.

20 Claims, 11 Drawing Sheets

Related U.S. Application Data continuation of application No. 17/722,438, filed on Apr. 18, 2022, now Pat. No. 11,727,933, which is a continuation of application No. 16/841,116, filed on Apr. 6, 2020, now Pat. No. 11,308,961, which is a continuation of application No. 16/178,122, filed on Nov. 1, 2018, now Pat. No. 10,614,807, which is a continuation of application No. 15/297,627, filed on Oct. 19, 2016, now Pat. No. 10,181,323.

(51) Int. Cl.
*G10L 15/32* (2013.01)
*G10L 15/08* (2006.01)
*G10L 15/30* (2013.01)
*H04R 27/00* (2006.01)

(52) U.S. Cl.
CPC .. *G10L 2015/088* (2013.01); *G10L 2015/223* (2013.01); *G10L 15/30* (2013.01); *H04R 27/00* (2013.01); *H04R 2227/003* (2013.01); *H04R 2227/005* (2013.01)

(56) References Cited

U.S. PATENT DOCUMENTS 4,342,104 A 7/1982 Jack
4,504,704 A 3/1985 Ohyaba et al.
4,592,088 A 5/1986 Shimada
4,628,530 A 12/1986 Op De Beek et al.
4,631,749 A 12/1986 Rapaich
4,694,484 A 9/1987 Atkinson et al.
4,773,094 A 9/1988 Dolby
4,995,778 A 2/1991 Brussel
5,218,710 A 6/1993 Yamaki et al.
5,255,326 A 10/1993 Stevenson
5,323,257 A 6/1994 Abe et al.
5,386,478 A 1/1995 Plunkett
5,452,274 A 9/1995 Thompson
5,553,147 A 9/1996 Pineau
5,581,621 A 12/1996 Koyama et al.
5,692,104 A 11/1997 Chow et al.
5,754,774 A 5/1998 Bittinger et al.
5,757,927 A 5/1998 Gerzon et al.
5,910,991 A 6/1999 Farrar
5,939,656 A 8/1999 Suda
6,018,376 A 1/2000 Nakatani
6,055,497 A 4/2000 Hallkvist et al.
6,061,455 A 5/2000 Hadley et al.
6,072,879 A 6/2000 Ouchi et al.
6,111,957 A 8/2000 Thomasson
6,122,531 A 9/2000 Nicholls et al.
6,363,155 B1 3/2002 Horbach
6,548,967 B1 4/2003 Dowling et al.
6,573,067 B1 6/2003 Dib-Hajj et al.
6,631,179 B1 10/2003 Sifuentes
6,639,989 B1 10/2003 Zacharov et al.
6,643,744 B1 11/2003 Cheng
6,704,421 B1 3/2004 Kitamura
6,704,671 B1 3/2004 Umminger, III
6,721,428 B1 4/2004 Allred et al.
6,731,760 B2 5/2004 Pedersen
6,760,451 B1 7/2004 Craven et al.
6,766,025 B1 7/2004 Levy et al.
6,798,889 B1 9/2004 Dicker et al.
6,862,440 B2 3/2005 Sampath
6,916,980 B2 7/2005 Ishida et al.
6,931,134 B1 8/2005 Waller, Jr. et al.
6,985,694 B1 1/2006 De Bonet et al.
6,990,211 B2 1/2006 Parker
7,031,476 B1 4/2006 Chrisop et al.
7,039,212 B2 5/2006 Poling et al.
7,058,186 B2 6/2006 Tanaka
7,072,477 B1 7/2006 Kincaid
7,092,535 B1 8/2006 Pedersen et al.
7,092,537 B1 8/2006 Allred et al.
7,103,187 B1 9/2006 Neuman
7,187,947 B1 3/2007 White et al.
7,289,637 B2 10/2007 Montag et al.
7,312,785 B2 12/2007 Tsuk et al.
7,477,751 B2 1/2009 Lyon et al.
7,483,540 B2 1/2009 Rabinowitz et al.
7,489,784 B2 2/2009 Yoshino
7,490,044 B2 2/2009 Kulkarni
7,492,909 B2 2/2009 Carter et al.
7,519,188 B2 4/2009 Berardi et al.
7,519,579 B2 4/2009 Yalovsky et al.
7,529,377 B2 5/2009 Nackvi et al.
7,567,907 B2 7/2009 Greene et al.
7,590,772 B2 9/2009 Marriott et al.
7,630,500 B1 12/2009 Beckman et al.
7,664,276 B2 2/2010 McKee
7,676,044 B2 3/2010 Sasaki et al.
7,689,305 B2 3/2010 Kreifeldt et al.
7,697,701 B2 4/2010 Pedersen et al.
7,720,237 B2 5/2010 Bharitkar et al.
7,742,740 B2 6/2010 Goldberg et al.
7,769,183 B2 8/2010 Bharitkar et al.
7,796,068 B2 9/2010 Raz et al.
7,835,689 B2 11/2010 Goldberg et al.
7,876,903 B2 1/2011 Sauk
7,925,203 B2 4/2011 Lane et al.
7,949,140 B2 5/2011 Kino
7,949,707 B2 5/2011 Mcdowall et al.
7,961,893 B2 6/2011 Kino
7,970,922 B2 6/2011 Svendsen
8,005,228 B2 8/2011 Bharitkar et al.
8,042,961 B2 10/2011 Massara et al.
8,045,721 B2 10/2011 Burgan et al.
8,046,219 B2 10/2011 Zurek et al.
8,050,652 B2 11/2011 Qureshey et al.
8,063,698 B2 11/2011 Howard
8,074,253 B1 12/2011 Nathan
8,116,476 B2 2/2012 Inohara
8,126,156 B2 2/2012 Corbett et al.
8,126,172 B2 2/2012 Horbach et al.
8,131,390 B2 3/2012 Braithwaite et al.
8,139,774 B2 3/2012 Berardi et al.
8,144,883 B2 3/2012 Pdersen et al.
8,160,276 B2 4/2012 Liao et al.
8,160,281 B2 4/2012 Kim et al.
8,170,260 B2 5/2012 Reining et al.
8,175,292 B2 5/2012 Aylward et al.
8,175,297 B1 5/2012 Ho et al.
8,194,874 B2 6/2012 Starobin et al.
8,229,125 B2 7/2012 Short
8,238,547 B2 8/2012 Ohki et al.
8,238,578 B2 8/2012 Aylward
8,243,961 B1 8/2012 Morrill
8,264,408 B2 9/2012 Kainulainen et al.
8,265,310 B2 9/2012 Berardi et al.
8,270,620 B2 9/2012 Christensen
8,279,709 B2 10/2012 Choisel et al.
8,281,001 B2 10/2012 Busam et al.
8,290,185 B2 10/2012 Kim
8,291,349 B1 10/2012 Park et al.
8,300,845 B2 10/2012 Zurek et al.
8,306,235 B2 11/2012 Mahowald
8,325,931 B2 12/2012 Howard et al.
8,325,935 B2 12/2012 Rutschman
8,325,944 B1 12/2012 Duwenhorst et al.
8,331,585 B2 12/2012 Hagen et al.
8,332,414 B2 12/2012 Nguyen et al.
8,359,621 B2 1/2013 Medina et al.
8,379,876 B2 2/2013 Zhang
8,391,501 B2 3/2013 Khawand et al.
8,392,505 B2 3/2013 Haughay, Jr. et al.
8,401,202 B2 3/2013 Brooking
8,433,076 B2 4/2013 Zurek et al.
8,437,481 B2 5/2013 Johnson
8,447,048 B2 5/2013 Chen et al.
8,452,020 B2 5/2013 Gregg et al.
8,463,184 B2 6/2013 Dua
8,488,799 B2 7/2013 Goldstein et al.

(56) References Cited

U.S. PATENT DOCUMENTS

| | | | |
|---|---|---|---|
| 8,503,669 | B2 | 8/2013 | Mao |
| 8,527,876 | B2 | 9/2013 | Wood et al. |
| 8,566,722 | B2 | 10/2013 | Gordon et al. |
| 8,577,045 | B2 | 11/2013 | Gibbs |
| 8,577,048 | B2 | 11/2013 | Chaikin et al. |
| 8,600,075 | B2 | 12/2013 | Lim |
| 8,606,571 | B1 | 12/2013 | Every et al. |
| 8,620,006 | B2 | 12/2013 | Berardi et al. |
| 8,638,394 | B2 | 1/2014 | Onodera |
| 8,666,812 | B1 | 3/2014 | Gandhi |
| 8,670,574 | B2 | 3/2014 | Ito et al. |
| 8,682,002 | B2 | 3/2014 | Wihardja et al. |
| 8,731,206 | B1 | 5/2014 | Park |
| 8,755,538 | B2 | 6/2014 | Kwon |
| 8,798,280 | B2 | 8/2014 | Goldberg et al. |
| 8,798,995 | B1 | 8/2014 | Edara |
| 8,819,554 | B2 | 8/2014 | Basso et al. |
| 8,831,244 | B2 | 9/2014 | Apfel |
| 8,855,319 | B2 | 10/2014 | Liu et al. |
| 8,862,273 | B2 | 10/2014 | Karr |
| 8,879,761 | B2 | 11/2014 | Johnson et al. |
| 8,903,526 | B2 | 12/2014 | Beckhardt et al. |
| 8,914,559 | B2 | 12/2014 | Kalayjian et al. |
| 8,930,005 | B2 | 1/2015 | Reimann |
| 8,934,647 | B2 | 1/2015 | Joyce et al. |
| 8,934,655 | B2 | 1/2015 | Breen et al. |
| 8,948,426 | B2 | 2/2015 | Thomasson et al. |
| 8,965,033 | B2 | 2/2015 | Wiggins |
| 8,965,546 | B2 | 2/2015 | Visser et al. |
| 8,977,974 | B2 | 3/2015 | Kraut |
| 8,984,442 | B2 | 3/2015 | Pirnack et al. |
| 8,989,406 | B2 | 3/2015 | Wong et al. |
| 8,995,687 | B2 | 3/2015 | Marino, Jr. et al. |
| 8,995,688 | B1 | 3/2015 | Chemtob et al. |
| 8,996,370 | B2 | 3/2015 | Ansell |
| 9,014,380 | B2 | 4/2015 | Gautama et al. |
| 9,020,153 | B2 | 4/2015 | Britt, Jr. |
| 9,021,153 | B2 | 4/2015 | Lu |
| 9,065,929 | B2 | 6/2015 | Chen et al. |
| 9,084,058 | B2 | 7/2015 | Reilly et al. |
| 9,100,766 | B2 | 8/2015 | Soulodre et al. |
| 9,106,192 | B2 | 8/2015 | Sheen et al. |
| 9,147,397 | B2 | 9/2015 | Thomsen et al. |
| 9,179,233 | B2 | 11/2015 | Kang |
| 9,218,806 | B1 | 12/2015 | Salvador et al. |
| 9,219,460 | B2 | 12/2015 | Bush |
| 9,226,088 | B2 | 12/2015 | Pandey et al. |
| 9,231,545 | B2 | 1/2016 | Agustin et al. |
| 9,247,365 | B1 | 1/2016 | Ellis et al. |
| 9,264,839 | B2 | 2/2016 | Oishi et al. |
| 9,270,242 | B2 | 2/2016 | Ito et al. |
| 9,275,625 | B2 | 3/2016 | Kim et al. |
| 9,286,384 | B2 | 3/2016 | Kuper et al. |
| 9,288,596 | B2 | 3/2016 | Gossain et al. |
| 9,307,340 | B2 | 4/2016 | Seefeldt |
| 9,332,371 | B2 | 5/2016 | De Bruijn |
| 9,348,824 | B2 | 5/2016 | Coburn, IV |
| 9,355,555 | B2 | 5/2016 | Reichert et al. |
| 9,373,321 | B2 | 6/2016 | Bapat et al. |
| 9,398,392 | B2 | 7/2016 | Ridihalgh et al. |
| 9,418,651 | B2 | 8/2016 | Clark et al. |
| 9,424,840 | B1 | 8/2016 | Hart et al. |
| 9,431,029 | B2 | 8/2016 | Yook et al. |
| 9,443,519 | B1 | 9/2016 | Bakshi et al. |
| 9,451,377 | B2 | 9/2016 | Massey et al. |
| 9,462,399 | B2 | 10/2016 | Bharitkar et al. |
| 9,467,779 | B2 | 10/2016 | Iyengar et al. |
| 9,473,207 | B2 | 10/2016 | McCormack et al. |
| 9,491,499 | B2 | 11/2016 | Wagenaar et al. |
| 9,524,098 | B2 | 12/2016 | Griffiths et al. |
| 9,529,565 | B2 | 12/2016 | Bae et al. |
| 9,538,305 | B2 | 1/2017 | Lehnert et al. |
| 9,538,308 | B2 | 1/2017 | Isaac et al. |
| 9,544,701 | B1 | 1/2017 | Rappoport |
| 9,560,449 | B2 | 1/2017 | Carlsson et al. |
| 9,560,460 | B2 | 1/2017 | Chaikin et al. |
| 9,569,073 | B2 | 2/2017 | Tan |
| 9,575,615 | B1 | 2/2017 | Nicholls et al. |
| 9,584,915 | B2 | 2/2017 | Fullam et al. |
| 9,596,531 | B1 | 3/2017 | Zhang |
| 9,609,383 | B1 | 3/2017 | Hirst |
| 9,628,911 | B2 | 4/2017 | Rabinowitz et al. |
| 9,648,422 | B2 | 5/2017 | Sheen et al. |
| 9,654,073 | B2 | 5/2017 | Apodaca |
| 9,654,545 | B2 | 5/2017 | Gossain |
| 9,674,625 | B2 | 6/2017 | Armstrong-Muntner et al. |
| 9,678,708 | B2 | 6/2017 | Bierbower et al. |
| 9,686,625 | B2 | 6/2017 | Patel |
| 9,689,960 | B1 | 6/2017 | Barton et al. |
| 9,690,271 | B2 | 6/2017 | Sheen et al. |
| 9,690,539 | B2 | 6/2017 | Sheen et al. |
| 9,693,165 | B2 | 6/2017 | Downing et al. |
| 9,697,831 | B2 | 7/2017 | Lesso et al. |
| 9,699,582 | B2 | 7/2017 | Sheerin et al. |
| 9,706,319 | B2 | 7/2017 | Peters et al. |
| 9,706,323 | B2 | 7/2017 | Sheen |
| 9,715,365 | B2 | 7/2017 | Kusano |
| 9,723,420 | B2 | 8/2017 | Family et al. |
| 9,729,984 | B2 | 8/2017 | Tan et al. |
| 9,736,584 | B2 | 8/2017 | Sheen |
| 9,743,208 | B2 | 8/2017 | Oishi et al. |
| 9,749,763 | B2 | 8/2017 | Sheen |
| 9,763,018 | B1 | 9/2017 | McPherson et al. |
| 9,788,113 | B2 | 10/2017 | Wilberding et al. |
| 9,794,722 | B2 | 10/2017 | Petrov |
| 9,807,536 | B2 | 10/2017 | Liu et al. |
| 9,810,784 | B2 | 11/2017 | Altman et al. |
| 9,817,549 | B2 | 11/2017 | Chandrasekaran |
| 9,842,584 | B1 | 12/2017 | Hart et al. |
| 9,860,662 | B2 | 1/2018 | Jarvis et al. |
| 9,864,574 | B2 | 1/2018 | Hartung et al. |
| 9,881,011 | B2 | 1/2018 | Krishna et al. |
| 9,910,634 | B2 | 3/2018 | Sheen |
| 9,913,056 | B2 | 3/2018 | Master et al. |
| 9,916,126 | B2 | 3/2018 | Lang |
| 9,936,290 | B2 | 4/2018 | Mohammad et al. |
| 9,940,930 | B1 | 4/2018 | Campbell et al. |
| 9,952,825 | B2 | 4/2018 | Sheen |
| 9,965,247 | B2 | 5/2018 | Jarvis et al. |
| 9,984,703 | B2 | 5/2018 | Ur et al. |
| 9,997,151 | B1 | 6/2018 | Ayrapetian et al. |
| 10,002,259 | B1 | 6/2018 | Mai |
| 10,007,481 | B2 | 6/2018 | Daly et al. |
| 10,027,662 | B1 | 7/2018 | Mutagi et al. |
| 10,045,142 | B2 | 8/2018 | McPherson et al. |
| 10,079,026 | B1 | 9/2018 | Ebenezer |
| 10,097,919 | B2 | 10/2018 | Jarvis et al. |
| 10,102,848 | B2 | 10/2018 | Koulomzin |
| 10,102,855 | B1 | 10/2018 | Sindhwani |
| 10,111,002 | B1 | 10/2018 | Poulad |
| 10,114,605 | B2 | 10/2018 | Gossain et al. |
| 10,125,006 | B2 | 11/2018 | Jacobsen et al. |
| 10,127,006 | B2 | 11/2018 | Sheen |
| 10,127,908 | B1 | 11/2018 | Deller et al. |
| 10,152,966 | B1 | 12/2018 | O'Malley et al. |
| 10,154,359 | B2 | 12/2018 | Sheen |
| 10,187,025 | B1 | 1/2019 | May et al. |
| 10,206,052 | B2 | 2/2019 | Perianu |
| 10,212,512 | B2 * | 2/2019 | Lang ...................... G06F 3/165 |
| 10,216,475 | B2 | 2/2019 | Park et al. |
| 10,264,358 | B2 | 4/2019 | Torok et al. |
| 10,275,213 | B2 | 4/2019 | Daly |
| 10,299,054 | B2 | 5/2019 | McPherson et al. |
| 10,299,061 | B1 | 5/2019 | Sheen |
| 10,354,658 | B2 * | 7/2019 | Wilberding ............ G06F 3/167 |
| 10,360,915 | B2 | 7/2019 | Taple et al. |
| 10,402,154 | B2 | 9/2019 | Hartung et al. |
| 10,403,279 | B2 | 9/2019 | Zhao et al. |
| 10,440,492 | B2 | 10/2019 | Crockett |
| 10,446,165 | B2 | 10/2019 | Giacobello |
| 10,482,899 | B2 | 11/2019 | Ramprashad et al. |
| 10,510,362 | B2 | 12/2019 | Hicks et al. |
| 10,555,077 | B2 | 2/2020 | Jarvis et al. |
| 10,567,900 | B2 | 2/2020 | Tanaka et al. |

(56) References Cited

U.S. PATENT DOCUMENTS 10,567,901 B2 2/2020 Po et al.
10,587,430 B1 3/2020 Smith et al.
10,791,407 B2 9/2020 Oishi et al.
10,811,015 B2 10/2020 Smith et al.
10,817,249 B2 10/2020 Tanaka et al.
10,847,178 B2 11/2020 Sereshki et al.
10,853,022 B2 12/2020 Wilberding et al.
10,863,295 B2 12/2020 Bush
10,877,637 B1 12/2020 Antos et al.
10,904,691 B2 1/2021 Tu et al.
10,959,029 B2 3/2021 Soto et al.
11,017,789 B2 5/2021 Giacobello
11,095,978 B2 8/2021 Gigandet et al.
11,100,922 B1 8/2021 Mutagi et al.
11,138,975 B2 10/2021 D'Amato et al.
11,140,494 B2 10/2021 Pedersen et al.
11,178,716 B2 11/2021 Baik et al.
11,189,284 B2 11/2021 Maeng
11,189,286 B2 11/2021 Schillmoeller et al.
11,200,894 B2 12/2021 Smith et al.
11,200,900 B2 12/2021 Smith
11,206,002 B2 12/2021 Charlton et al.
11,258,671 B1 2/2022 Vora et al.
11,295,754 B2 4/2022 Eubank et al.
11,302,326 B2 4/2022 Sereshki
11,308,958 B2 4/2022 Smith
11,308,962 B2 4/2022 Smith et al.
11,361,756 B2 6/2022 Smith et al.
11,363,236 B1 6/2022 Zhang
11,432,030 B2 8/2022 Smith et al.
11,437,036 B2 9/2022 Zhang et al.
11,443,741 B2 9/2022 Huang et al.
11,482,224 B2 10/2022 Smith et al.
11,501,773 B2 11/2022 Smith et al.
11,513,216 B1 11/2022 Kamath Koteshwara et al.
11,514,898 B2 11/2022 Millington et al.
11,532,306 B2 12/2022 Kim et al.
11,538,460 B2 12/2022 Tolomei et al.
11,540,047 B2 12/2022 Soto
11,551,700 B2 1/2023 Jones et al.
11,556,306 B2 1/2023 Jarvis et al.
11,580,969 B2 2/2023 Han et al.
11,646,023 B2 5/2023 Smith et al.
11,646,045 B2 5/2023 Giacobello
11,664,023 B2 5/2023 Reilly et al.
11,688,419 B2 6/2023 Sereshki
11,694,689 B2 7/2023 Smith
11,696,074 B2 7/2023 Woo et al.
11,700,139 B2 7/2023 Drake
11,709,653 B1 7/2023 Shin
11,711,662 B2 7/2023 Stachura
11,714,600 B2 8/2023 D'Amato
11,715,489 B2 8/2023 Sereshki et al.
11,721,341 B2 8/2023 Kim et al.
11,722,571 B1 8/2023 Chenier et al.
11,727,930 B2 8/2023 Topcu et al.
11,727,936 B2 8/2023 Smith et al.
11,741,948 B2 8/2023 Coucke et al.
11,750,969 B2 9/2023 Lang
11,769,505 B2 9/2023 Sereshki
11,771,866 B2 10/2023 D'Amato et al.
11,778,361 B1 10/2023 Lovitt
11,790,911 B2 10/2023 Fainberg et al.
11,790,937 B2 10/2023 Smith et al.
11,797,263 B2 10/2023 Liu et al.
11,816,393 B2 11/2023 Vega-Zayas et al.
11,817,076 B2 11/2023 Sereshki et al.
11,832,068 B2 11/2023 Jarvis et al.
11,881,223 B2 1/2024 Myers et al.
11,934,742 B2 3/2024 Wilberding
11,961,519 B2 4/2024 Smith
12,142,266 B2 11/2024 Elkhatib et al.
2001/0038702 A1 11/2001 Lavoie et al.
2001/0043592 A1 11/2001 Jimenez et al.
2001/0053228 A1 12/2001 Jones
2002/0077830 A1 6/2002 Suomela et al.
2002/0078161 A1 6/2002 Cheng
2002/0089529 A1 7/2002 Robbin
2002/0126852 A1 9/2002 Kashani
2002/0136414 A1 9/2002 Jordan et al.
2002/0146136 A1 10/2002 Carter, Jr.
2002/0169583 A1 11/2002 Gutta et al.
2002/0184015 A1 12/2002 Li et al.
2003/0002689 A1 1/2003 Folio
2003/0031334 A1 2/2003 Layton et al.
2003/0081115 A1 5/2003 Curry et al.
2003/0108212 A1 6/2003 Yun
2003/0159569 A1 8/2003 Ohta
2003/0161479 A1 8/2003 Yang et al.
2003/0161492 A1 8/2003 Miller et al.
2003/0179891 A1 9/2003 Rabinowitz et al.
2003/0235311 A1 12/2003 Grancea et al.
2004/0071294 A1 4/2004 Halgas, Jr. et al.
2004/0114771 A1 6/2004 Vaughan et al.
2004/0131338 A1 7/2004 Asada et al.
2004/0236570 A1 11/2004 Tato et al.
2004/0237750 A1 12/2004 Smith et al.
2005/0021470 A1 1/2005 Martin et al.
2005/0031143 A1 2/2005 Devantier et al.
2005/0063554 A1 3/2005 Devantier et al.
2005/0131558 A1 6/2005 Braithwaite et al.
2005/0147261 A1 7/2005 Yeh
2005/0157885 A1 7/2005 Olney et al.
2005/0276425 A1 12/2005 Forrester et al.
2006/0008256 A1 1/2006 Khedouri et al.
2006/0026521 A1 2/2006 Hotelling et al.
2006/0032357 A1 2/2006 Roovers et al.
2006/0147057 A1 7/2006 Aggarwal et al.
2006/0153391 A1 7/2006 Hooley et al.
2006/0161964 A1 7/2006 Chung
2006/0195480 A1 8/2006 Spiegelman et al.
2006/0206340 A1 9/2006 Silvera et al.
2006/0209197 A1 9/2006 Vanhatalo
2006/0217976 A1 9/2006 Gao et al.
2006/0225097 A1 10/2006 Lawrence-Apfelbaum
2006/0289622 A1 12/2006 Khor et al.
2007/0003067 A1 1/2007 Gierl et al.
2007/0005206 A1 1/2007 Zhang et al.
2007/0022207 A1 1/2007 Millington
2007/0025559 A1 2/2007 Mihelich et al.
2007/0032895 A1 2/2007 Nackvi et al.
2007/0086597 A1 4/2007 Kino
2007/0087686 A1 4/2007 Holm et al.
2007/0116254 A1 5/2007 Looney et al.
2007/0121955 A1 5/2007 Johnston et al.
2007/0136778 A1 6/2007 Birger et al.
2007/0217619 A1 9/2007 Hall et al.
2008/0002839 A1 1/2008 Eng
2008/0014989 A1 1/2008 Sandegard et al.
2008/0065247 A1 3/2008 Igoe
2008/0069378 A1 3/2008 Rabinowitz et al.
2008/0077261 A1 3/2008 Baudino et al.
2008/0098027 A1 4/2008 Aarts
2008/0107128 A1 5/2008 Lo et al.
2008/0136623 A1 6/2008 Calvarese
2008/0144864 A1 6/2008 Huon et al.
2008/0175411 A1 7/2008 Greve
2008/0205647 A1 8/2008 Zhang et al.
2008/0214160 A1 9/2008 Jonsson
2008/0232603 A1 9/2008 Soulodre
2008/0266385 A1 10/2008 Smith et al.
2008/0281523 A1 11/2008 Dahl et al.
2009/0003613 A1 1/2009 Christensen
2009/0024662 A1 1/2009 Park et al.
2009/0031147 A1 1/2009 Horvat
2009/0047993 A1 2/2009 Vasa
2009/0063274 A1 3/2009 Dublin, III et al.
2009/0089054 A1 4/2009 Wang et al.
2009/0110218 A1 4/2009 Swain
2009/0138507 A1 5/2009 Burckart et al.
2009/0147134 A1 6/2009 Iwamatsu
2009/0169025 A1 7/2009 Chen
2009/0171487 A1 7/2009 Wilhelm
2009/0175476 A1 7/2009 Bottum

(56) References Cited

U.S. PATENT DOCUMENTS

| | | | |
|---|---|---|---|
| 2009/0180632 | A1 | 7/2009 | Goldberg et al. |
| 2009/0196428 | A1 | 8/2009 | Kim |
| 2009/0202082 | A1 | 8/2009 | Bharitkar et al. |
| 2009/0232481 | A1 | 9/2009 | Baalbergen et al. |
| 2009/0252481 | A1 | 10/2009 | Ekstrand |
| 2009/0262256 | A1 | 10/2009 | Asayama et al. |
| 2009/0285404 | A1 | 11/2009 | Hsu et al. |
| 2009/0304194 | A1 | 12/2009 | Eggleston et al. |
| 2009/0304205 | A1 | 12/2009 | Hardacker et al. |
| 2009/0316923 | A1 | 12/2009 | Tashev et al. |
| 2010/0013550 | A1 | 1/2010 | Tanaka |
| 2010/0054275 | A1 | 3/2010 | Noonan et al. |
| 2010/0057451 | A1 | 3/2010 | Carraux et al. |
| 2010/0095332 | A1 | 4/2010 | Gran et al. |
| 2010/0103776 | A1 | 4/2010 | Chan |
| 2010/0104114 | A1 | 4/2010 | Chapman |
| 2010/0128902 | A1 | 5/2010 | Liu et al. |
| 2010/0135501 | A1 | 6/2010 | Corbett et al. |
| 2010/0142735 | A1 | 6/2010 | Yoon et al. |
| 2010/0146445 | A1 | 6/2010 | Kraut |
| 2010/0162117 | A1 | 6/2010 | Basso et al. |
| 2010/0189203 | A1 | 7/2010 | Wilhelmsson et al. |
| 2010/0195846 | A1 | 8/2010 | Yokoyama |
| 2010/0272270 | A1 | 10/2010 | Chaikin et al. |
| 2010/0290643 | A1 | 11/2010 | Mihelich et al. |
| 2010/0296659 | A1 | 11/2010 | Tanaka |
| 2010/0303248 | A1 | 12/2010 | Tawada |
| 2010/0303250 | A1 | 12/2010 | Goldberg et al. |
| 2010/0323793 | A1 | 12/2010 | Andall |
| 2011/0002471 | A1 | 1/2011 | Wihardja et al. |
| 2011/0007904 | A1 | 1/2011 | Tomoda et al. |
| 2011/0007905 | A1 | 1/2011 | Sato et al. |
| 2011/0024566 | A1 | 2/2011 | Soenarjo |
| 2011/0029111 | A1 | 2/2011 | Sabin et al. |
| 2011/0051959 | A1 | 3/2011 | Ito et al. |
| 2011/0087842 | A1 | 4/2011 | Lu et al. |
| 2011/0135103 | A1 | 6/2011 | Sun et al. |
| 2011/0150228 | A1 | 6/2011 | Yoon et al. |
| 2011/0150230 | A1 | 6/2011 | Tanaka |
| 2011/0150247 | A1 | 6/2011 | Oliveras |
| 2011/0153326 | A1 | 6/2011 | Garudadri et al. |
| 2011/0170710 | A1 | 7/2011 | Son |
| 2011/0216093 | A1 | 9/2011 | Griffin |
| 2011/0216924 | A1 | 9/2011 | Berardi et al. |
| 2011/0234480 | A1 | 9/2011 | Fino et al. |
| 2011/0235808 | A1 | 9/2011 | Kon |
| 2011/0246566 | A1 | 10/2011 | Kashef et al. |
| 2011/0268281 | A1 | 11/2011 | Florencio et al. |
| 2011/0286601 | A1 | 11/2011 | Fukui et al. |
| 2011/0293123 | A1 | 12/2011 | Neumeyer et al. |
| 2012/0010890 | A1 | 1/2012 | Koverzin |
| 2012/0032928 | A1 | 2/2012 | Alberth et al. |
| 2012/0051558 | A1 | 3/2012 | Kim et al. |
| 2012/0057724 | A1 | 3/2012 | Rabinowitz et al. |
| 2012/0063615 | A1 | 3/2012 | Crockett et al. |
| 2012/0093320 | A1 | 4/2012 | Flaks et al. |
| 2012/0114152 | A1 | 5/2012 | Nguyen et al. |
| 2012/0127831 | A1 | 5/2012 | Gicklhorn et al. |
| 2012/0140936 | A1 | 6/2012 | Bonnick et al. |
| 2012/0183156 | A1 | 7/2012 | Schlessinger et al. |
| 2012/0184335 | A1 | 7/2012 | Kim et al. |
| 2012/0213391 | A1 | 8/2012 | Usami et al. |
| 2012/0215530 | A1 | 8/2012 | Harsch |
| 2012/0237037 | A1 | 9/2012 | Ninan et al. |
| 2012/0243697 | A1 | 9/2012 | Frye et al. |
| 2012/0263325 | A1 | 10/2012 | Freeman et al. |
| 2012/0268145 | A1 | 10/2012 | Chandra et al. |
| 2012/0269356 | A1 | 10/2012 | Sheerin et al. |
| 2012/0270653 | A1 | 10/2012 | Kareemi et al. |
| 2012/0275613 | A1 | 11/2012 | Soulodre |
| 2012/0283593 | A1 | 11/2012 | Searchfield et al. |
| 2012/0288124 | A1 | 11/2012 | Fejzo et al. |
| 2013/0003981 | A1 | 1/2013 | Lane |
| 2013/0010970 | A1 | 1/2013 | Hegarty et al. |
| 2013/0019193 | A1 | 1/2013 | Rhee et al. |
| 2013/0024880 | A1 | 1/2013 | Moloney-Egnatios et al. |
| 2013/0028443 | A1 | 1/2013 | Pance et al. |
| 2013/0051572 | A1 | 2/2013 | Goh et al. |
| 2013/0108055 | A1 | 5/2013 | Hanna et al. |
| 2013/0129102 | A1 | 5/2013 | Li et al. |
| 2013/0129122 | A1 | 5/2013 | Johnson et al. |
| 2013/0166227 | A1 | 6/2013 | Hermann et al. |
| 2013/0171930 | A1 | 7/2013 | Anand et al. |
| 2013/0173794 | A1 | 7/2013 | Agerbak et al. |
| 2013/0179535 | A1 | 7/2013 | Baalu et al. |
| 2013/0202131 | A1 | 8/2013 | Kemmochi et al. |
| 2013/0211843 | A1 | 8/2013 | Clarkson |
| 2013/0216071 | A1 | 8/2013 | Maher et al. |
| 2013/0223642 | A1 | 8/2013 | Warren et al. |
| 2013/0230175 | A1 | 9/2013 | Bech et al. |
| 2013/0259254 | A1 | 10/2013 | Xiang et al. |
| 2013/0279706 | A1 | 10/2013 | Marti et al. |
| 2013/0294618 | A1 | 11/2013 | Lyubachev |
| 2013/0305152 | A1 | 11/2013 | Griffiths et al. |
| 2013/0308794 | A1 | 11/2013 | Jochim et al. |
| 2013/0315405 | A1 | 11/2013 | Kanishima et al. |
| 2013/0317783 | A1 | 11/2013 | Tennant |
| 2013/0346559 | A1 | 12/2013 | Van Erven et al. |
| 2014/0003622 | A1 | 1/2014 | Ikizyan et al. |
| 2014/0003623 | A1 | 1/2014 | Lang |
| 2014/0003626 | A1 | 1/2014 | Holman et al. |
| 2014/0006587 | A1 | 1/2014 | Kusano |
| 2014/0016784 | A1 | 1/2014 | Sen et al. |
| 2014/0016786 | A1 | 1/2014 | Sen |
| 2014/0016802 | A1 | 1/2014 | Sen |
| 2014/0023196 | A1 | 1/2014 | Xiang et al. |
| 2014/0029201 | A1 | 1/2014 | Yang et al. |
| 2014/0032709 | A1 | 1/2014 | Saussy et al. |
| 2014/0037097 | A1 | 2/2014 | Labosco |
| 2014/0037107 | A1 | 2/2014 | Marino, Jr. et al. |
| 2014/0052770 | A1 | 2/2014 | Gran et al. |
| 2014/0079242 | A1 | 3/2014 | Nguyen et al. |
| 2014/0084014 | A1 | 3/2014 | Sim et al. |
| 2014/0086423 | A1 | 3/2014 | Domingo et al. |
| 2014/0093093 | A1 | 4/2014 | Dusan et al. |
| 2014/0112481 | A1 | 4/2014 | Li et al. |
| 2014/0112502 | A1 | 4/2014 | Lee |
| 2014/0119551 | A1 | 5/2014 | Bharitkar et al. |
| 2014/0122092 | A1 | 5/2014 | Goldstein |
| 2014/0126730 | A1 | 5/2014 | Crawley et al. |
| 2014/0161265 | A1 | 6/2014 | Chaikin et al. |
| 2014/0169569 | A1 | 6/2014 | Toivanen et al. |
| 2014/0170979 | A1 | 6/2014 | Samanta Singhar |
| 2014/0180684 | A1 | 6/2014 | Strub |
| 2014/0180697 | A1 | 6/2014 | Torok et al. |
| 2014/0201635 | A1 | 7/2014 | Kumar et al. |
| 2014/0210728 | A1 | 7/2014 | Busse et al. |
| 2014/0219456 | A1 | 8/2014 | Morrell et al. |
| 2014/0219483 | A1 | 8/2014 | Hong |
| 2014/0226823 | A1 | 8/2014 | Sen et al. |
| 2014/0226837 | A1 | 8/2014 | Grokop |
| 2014/0242913 | A1 | 8/2014 | Pang |
| 2014/0244267 | A1 | 8/2014 | Levi |
| 2014/0253676 | A1 | 9/2014 | Nagase et al. |
| 2014/0267148 | A1 | 9/2014 | Luna et al. |
| 2014/0270202 | A1 | 9/2014 | Ivanov et al. |
| 2014/0270248 | A1 | 9/2014 | Ivanov et al. |
| 2014/0273859 | A1 | 9/2014 | Luna et al. |
| 2014/0274212 | A1 | 9/2014 | Zurek et al. |
| 2014/0279889 | A1 | 9/2014 | Luna |
| 2014/0285313 | A1 | 9/2014 | Luna et al. |
| 2014/0286496 | A1 | 9/2014 | Luna et al. |
| 2014/0294200 | A1 | 10/2014 | Baumgarte et al. |
| 2014/0294201 | A1 | 10/2014 | Johnson et al. |
| 2014/0310269 | A1 | 10/2014 | Zhang et al. |
| 2014/0321670 | A1 | 10/2014 | Nystrom et al. |
| 2014/0323036 | A1 | 10/2014 | Daley et al. |
| 2014/0334644 | A1 | 11/2014 | Selig et al. |
| 2014/0341399 | A1 | 11/2014 | Dusse |
| 2014/0344689 | A1 | 11/2014 | Scott et al. |
| 2014/0355768 | A1 | 12/2014 | Sen et al. |
| 2014/0355794 | A1 | 12/2014 | Morrell et al. |
| 2014/0364056 | A1 | 12/2014 | Belk et al. |
| 2014/0369519 | A1 | 12/2014 | Leschka et al. |

(56) References Cited

U.S. PATENT DOCUMENTS

| | | | |
|---|---|---|---|
| 2015/0011195 | A1 | 1/2015 | Li |
| 2015/0023509 | A1 | 1/2015 | Devantier et al. |
| 2015/0031287 | A1 | 1/2015 | Pang et al. |
| 2015/0032844 | A1 | 1/2015 | Tarr et al. |
| 2015/0036847 | A1 | 2/2015 | Donaldson |
| 2015/0036848 | A1 | 2/2015 | Donaldson |
| 2015/0043736 | A1 | 2/2015 | Olsen et al. |
| 2015/0051723 | A1 | 2/2015 | Bates et al. |
| 2015/0063610 | A1 | 3/2015 | Mossner |
| 2015/0078586 | A1 | 3/2015 | Ang et al. |
| 2015/0078596 | A1 | 3/2015 | Sprogis |
| 2015/0100991 | A1 | 4/2015 | Risberg et al. |
| 2015/0112689 | A1 | 4/2015 | Nandy et al. |
| 2015/0146886 | A1 | 5/2015 | Baumgarte |
| 2015/0149943 | A1 | 5/2015 | Nguyen et al. |
| 2015/0154954 | A1 | 6/2015 | Sharifi |
| 2015/0161360 | A1 | 6/2015 | Paruchuri et al. |
| 2015/0195666 | A1 | 7/2015 | Massey et al. |
| 2015/0201274 | A1 | 7/2015 | Ellner et al. |
| 2015/0208184 | A1 | 7/2015 | Tan et al. |
| 2015/0208188 | A1 | 7/2015 | Carlsson et al. |
| 2015/0215382 | A1 | 7/2015 | Arora et al. |
| 2015/0220558 | A1 | 8/2015 | Snibbe et al. |
| 2015/0221322 | A1 | 8/2015 | Iyengar et al. |
| 2015/0223002 | A1 | 8/2015 | Mehta et al. |
| 2015/0223004 | A1 | 8/2015 | Deprez et al. |
| 2015/0229699 | A1 | 8/2015 | Liu |
| 2015/0237454 | A1 | 8/2015 | Scheirer et al. |
| 2015/0248885 | A1 | 9/2015 | Koulomzin |
| 2015/0260754 | A1 | 9/2015 | Perotti et al. |
| 2015/0263692 | A1 | 9/2015 | Bush |
| 2015/0264023 | A1 | 9/2015 | Reno |
| 2015/0271616 | A1 | 9/2015 | Kechichian et al. |
| 2015/0271620 | A1 | 9/2015 | Lando et al. |
| 2015/0279351 | A1 | 10/2015 | Nguyen et al. |
| 2015/0281866 | A1 | 10/2015 | Williams et al. |
| 2015/0286360 | A1 | 10/2015 | Wachter |
| 2015/0289064 | A1 | 10/2015 | Jensen et al. |
| 2015/0293744 | A1 | 10/2015 | Bae et al. |
| 2015/0350766 | A1 | 12/2015 | Schobel et al. |
| 2015/0356968 | A1 | 12/2015 | Rice et al. |
| 2015/0358756 | A1 | 12/2015 | Harma et al. |
| 2015/0365762 | A1 | 12/2015 | Truon et al. |
| 2016/0011846 | A1 | 1/2016 | Sheen |
| 2016/0011848 | A1 | 1/2016 | Wilberding et al. |
| 2016/0011850 | A1 | 1/2016 | Sheen et al. |
| 2016/0014509 | A1 | 1/2016 | Hansson et al. |
| 2016/0014510 | A1 | 1/2016 | Sheen |
| 2016/0014511 | A1 | 1/2016 | Sheen et al. |
| 2016/0014534 | A1 | 1/2016 | Sheen |
| 2016/0014535 | A1 | 1/2016 | Wilberding et al. |
| 2016/0021473 | A1 | 1/2016 | Riggi et al. |
| 2016/0021481 | A1 | 1/2016 | Johnson et al. |
| 2016/0027467 | A1 | 1/2016 | Proud |
| 2016/0036404 | A1 | 2/2016 | Fleischmann et al. |
| 2016/0036881 | A1 | 2/2016 | Tembey et al. |
| 2016/0037277 | A1 | 2/2016 | Matsumoto et al. |
| 2016/0061597 | A1 | 3/2016 | De Bruijn et al. |
| 2016/0070525 | A1 | 3/2016 | Sheen et al. |
| 2016/0073210 | A1 | 3/2016 | Sheen |
| 2016/0077574 | A1 | 3/2016 | Bansal et al. |
| 2016/0078864 | A1 | 3/2016 | Palanisamy et al. |
| 2016/0088438 | A1 | 3/2016 | O'Keeffe |
| 2016/0119730 | A1 | 4/2016 | Virtanen |
| 2016/0140969 | A1 | 5/2016 | Srinivasan et al. |
| 2016/0142849 | A1 | 5/2016 | Satheesh et al. |
| 2016/0165297 | A1 | 6/2016 | Jamal-Syed et al. |
| 2016/0192098 | A1 | 6/2016 | Oishi et al. |
| 2016/0192100 | A1 | 6/2016 | Rabinowitz et al. |
| 2016/0212535 | A1 | 7/2016 | Le Nerriec et al. |
| 2016/0234615 | A1 | 8/2016 | Lambourne |
| 2016/0241907 | A1 | 8/2016 | Pearson |
| 2016/0246449 | A1 | 8/2016 | Jarske |
| 2016/0254696 | A1 | 9/2016 | Plumb et al. |
| 2016/0260140 | A1 | 9/2016 | Shirley et al. |
| 2016/0295340 | A1 | 10/2016 | Baker et al. |
| 2016/0309276 | A1 | 10/2016 | Ridihalgh et al. |
| 2016/0316502 | A1 | 10/2016 | DeCicco |
| 2016/0323863 | A1 | 11/2016 | Park et al. |
| 2016/0330562 | A1 | 11/2016 | Crockett |
| 2016/0342201 | A1 | 11/2016 | Jehan |
| 2016/0353018 | A1 | 12/2016 | Anderson et al. |
| 2016/0366517 | A1 | 12/2016 | Chandran et al. |
| 2016/0373860 | A1 | 12/2016 | Leschka et al. |
| 2016/0378430 | A1 | 12/2016 | Mccarthy |
| 2016/0379632 | A1 | 12/2016 | Hoffmeister et al. |
| 2017/0069338 | A1 | 3/2017 | Elliot et al. |
| 2017/0070826 | A1 | 3/2017 | Pedersen et al. |
| 2017/0083279 | A1 | 3/2017 | Sheen |
| 2017/0086003 | A1 | 3/2017 | Rabinowitz et al. |
| 2017/0105084 | A1 | 4/2017 | Holman |
| 2017/0142532 | A1 | 5/2017 | Pan |
| 2017/0162198 | A1 | 6/2017 | Chakladar et al. |
| 2017/0207762 | A1 | 7/2017 | Porter et al. |
| 2017/0215017 | A1 | 7/2017 | Hartung et al. |
| 2017/0223447 | A1 | 8/2017 | Johnson et al. |
| 2017/0230772 | A1 | 8/2017 | Johnson et al. |
| 2017/0257722 | A1 | 9/2017 | Kerdranvat et al. |
| 2017/0273024 | A1 | 9/2017 | Xu et al. |
| 2017/0280265 | A1 | 9/2017 | Po |
| 2017/0286052 | A1 | 10/2017 | Hartung et al. |
| 2017/0287496 | A1 | 10/2017 | Heitkamp et al. |
| 2017/0303039 | A1 | 10/2017 | Iyer et al. |
| 2017/0311108 | A1 | 10/2017 | Patel |
| 2017/0330429 | A1 | 11/2017 | Tak et al. |
| 2017/0330566 | A1 | 11/2017 | Trott et al. |
| 2017/0337932 | A1 | 11/2017 | Iyengar et al. |
| 2017/0358305 | A1 | 12/2017 | Kudurshian et al. |
| 2017/0358313 | A1 | 12/2017 | Shih |
| 2017/0374482 | A1 | 12/2017 | McPherson et al. |
| 2018/0011685 | A1 | 1/2018 | Weingartner |
| 2018/0014989 | A1 | 1/2018 | Levine |
| 2018/0025732 | A1 | 1/2018 | Lepauloux et al. |
| 2018/0096460 | A1 | 4/2018 | Tripp |
| 2018/0121432 | A1 | 5/2018 | Parson et al. |
| 2018/0176713 | A1 | 6/2018 | Linsky et al. |
| 2018/0181741 | A1 | 6/2018 | Whaley |
| 2018/0211667 | A1 | 7/2018 | Haubrich et al. |
| 2018/0240463 | A1 | 8/2018 | Perotti |
| 2018/0253281 | A1 | 9/2018 | Jarvis et al. |
| 2018/0278999 | A1 | 9/2018 | David et al. |
| 2018/0293974 | A1 | 10/2018 | Georges et al. |
| 2018/0315429 | A1 | 11/2018 | Taple et al. |
| 2018/0330589 | A1 | 11/2018 | Horling |
| 2018/0336449 | A1 | 11/2018 | Adan et al. |
| 2018/0376268 | A1 | 12/2018 | Kerdranvat et al. |
| 2019/0007232 | A1 | 1/2019 | Kim et al. |
| 2019/0013021 | A1 | 1/2019 | Chang et al. |
| 2019/0020761 | A1 | 1/2019 | Golden et al. |
| 2019/0025878 | A1 | 1/2019 | Shin et al. |
| 2019/0037328 | A1 | 1/2019 | McPherson et al. |
| 2019/0058942 | A1 | 2/2019 | Garner et al. |
| 2019/0074008 | A1 | 3/2019 | Beckhardt et al. |
| 2019/0147860 | A1 | 5/2019 | Chen et al. |
| 2019/0147905 | A1 | 5/2019 | Mai |
| 2019/0156818 | A1 | 5/2019 | Piersol et al. |
| 2019/0172461 | A1 | 6/2019 | Jin |
| 2019/0207777 | A1 | 7/2019 | Patel et al. |
| 2019/0214023 | A1 | 7/2019 | Ihara |
| 2019/0221205 | A1 | 7/2019 | Czyryba et al. |
| 2019/0222756 | A1 | 7/2019 | Moloney et al. |
| 2019/0237069 | A1 | 8/2019 | Zhao et al. |
| 2019/0237071 | A1 | 8/2019 | Wang et al. |
| 2019/0259381 | A1 | 8/2019 | Ebenezer |
| 2019/0295533 | A1 | 9/2019 | Wang et al. |
| 2019/0311719 | A1 | 10/2019 | Adams |
| 2019/0320278 | A1 | 10/2019 | McPherson et al. |
| 2019/0355384 | A1 | 11/2019 | Sereshki et al. |
| 2019/0371327 | A1 | 12/2019 | Quinn et al. |
| 2019/0392834 | A1 | 12/2019 | Yi et al. |
| 2019/0392837 | A1 | 12/2019 | Jung et al. |
| 2020/0005830 | A1 | 1/2020 | Wasada et al. |
| 2020/0043494 | A1 | 2/2020 | Maeng |
| 2020/0089464 | A1 | 3/2020 | Curtis |

(56) References Cited

U.S. PATENT DOCUMENTS

| | | | |
|---|---|---|---|
| 2020/0089469 | A1 | 3/2020 | Wilberding et al. |
| 2020/0090643 | A1 | 3/2020 | Shin et al. |
| 2020/0090646 | A1 | 3/2020 | Smith et al. |
| 2020/0128317 | A1 | 4/2020 | Feldman |
| 2020/0167597 | A1 | 5/2020 | Nguyen et al. |
| 2020/0194001 | A1 | 6/2020 | Smith et al. |
| 2020/0249346 | A1 | 8/2020 | Lim et al. |
| 2020/0258512 | A1 | 8/2020 | Smith et al. |
| 2020/0258513 | A1 | 8/2020 | Smith et al. |
| 2020/0275250 | A1 | 8/2020 | Choi et al. |
| 2020/0280800 | A1 | 9/2020 | Wilberding et al. |
| 2020/0312315 | A1 | 10/2020 | Li et al. |
| 2020/0364026 | A1 | 11/2020 | Lee et al. |
| 2020/0382888 | A1 | 12/2020 | McPherson et al. |
| 2021/0005199 | A1 | 1/2021 | Gella et al. |
| 2021/0043198 | A1 | 2/2021 | Tanaka et al. |
| 2021/0074317 | A1 | 3/2021 | Sereshki et al. |
| 2021/0082435 | A1 | 3/2021 | Lebeau et al. |
| 2021/0084589 | A1 | 3/2021 | Yu |
| 2021/0090578 | A1 | 3/2021 | Trapp et al. |
| 2021/0134280 | A1 | 5/2021 | Kurtz |
| 2021/0141050 | A1 | 5/2021 | Janssen et al. |
| 2021/0157542 | A1 | 5/2021 | De Assis et al. |
| 2021/0174794 | A1 | 6/2021 | Mont-Reynaud |
| 2021/0174812 | A1 | 6/2021 | Gao |
| 2021/0193132 | A1 | 6/2021 | Hanes et al. |
| 2021/0210085 | A1 | 7/2021 | Smith |
| 2021/0239831 | A1 | 8/2021 | Shin et al. |
| 2021/0241759 | A1 | 8/2021 | Yang et al. |
| 2021/0256974 | A1 | 8/2021 | Boettger et al. |
| 2021/0287670 | A1 | 9/2021 | Regan et al. |
| 2021/0295833 | A1 | 9/2021 | Rastrow et al. |
| 2021/0318849 | A1 | 10/2021 | Artsiom |
| 2021/0326099 | A1 | 10/2021 | Hirsch et al. |
| 2021/0358496 | A1 | 11/2021 | Sukumar |
| 2021/0366476 | A1 | 11/2021 | Smith et al. |
| 2021/0382679 | A1 | 12/2021 | Kuivalainen et al. |
| 2021/0383794 | A1 | 12/2021 | Kim et al. |
| 2022/0020388 | A1 | 1/2022 | Trim et al. |
| 2022/0027051 | A1 | 1/2022 | Kant et al. |
| 2022/0035514 | A1 | 2/2022 | Shin et al. |
| 2022/0208186 | A1 | 6/2022 | Smith |
| 2022/0386945 | A1 | 12/2022 | Wu et al. |
| 2023/0215433 | A1 | 7/2023 | Myers et al. |
| 2023/0237997 | A1 | 7/2023 | Ramic et al. |
| 2023/0237998 | A1 | 7/2023 | Smith et al. |
| 2023/0274738 | A1 | 8/2023 | Smith et al. |
| 2023/0362566 | A1 | 11/2023 | Bush |
| 2023/0382349 | A1 | 11/2023 | Ham |
| 2024/0001077 | A1 | 1/2024 | D'Amato et al. |
| 2024/0096348 | A1 | 3/2024 | Sereshki et al. |
| 2024/0265921 | A1 | 8/2024 | Dureau |
| 2024/0373161 | A1 | 11/2024 | Singleton et al. |
| 2024/0412729 | A1 | 12/2024 | Smith |

FOREIGN PATENT DOCUMENTS

| | | | |
|---|---|---|---|
| CN | 1622694 | A | 6/2005 |
| CN | 1984507 | A | 6/2007 |
| CN | 101032187 | A | 9/2007 |
| CN | 101047777 | A | 10/2007 |
| CN | 101366177 | A | 2/2009 |
| CN | 101473636 | A | 7/2009 |
| CN | 101478296 | A | 7/2009 |
| CN | 101491116 | A | 7/2009 |
| CN | 101569093 | A | 10/2009 |
| CN | 101681219 | A | 3/2010 |
| CN | 101754087 | A | 6/2010 |
| CN | 101800051 | A | 8/2010 |
| CN | 102004823 | A | 4/2011 |
| CN | 102318325 | A | 1/2012 |
| CN | 102823277 | A | 12/2012 |
| CN | 102893633 | A | 1/2013 |
| CN | 103491397 | A | 1/2014 |
| CN | 103811010 | A | 5/2014 |
| CN | 103988523 | A | 8/2014 |
| CN | 104219604 | A | 12/2014 |
| CN | 104247461 | A | 12/2014 |
| CN | 104284291 | A | 1/2015 |
| CN | 104584061 | A | 4/2015 |
| CN | 104967953 | A | 10/2015 |
| CN | 105163221 | A | 12/2015 |
| CN | 109243452 | A | 1/2019 |
| CN | 110349579 | A | 10/2019 |
| DE | 102007032281 | A1 | 1/2009 |
| EP | 0505949 | A1 | 9/1992 |
| EP | 0772374 | A2 | 5/1997 |
| EP | 1133896 | B1 | 8/2002 |
| EP | 1349427 | A2 | 10/2003 |
| EP | 1612999 | A1 | 1/2006 |
| EP | 2043381 | A2 | 4/2009 |
| EP | 1349427 | B1 | 12/2009 |
| EP | 2161950 | A2 | 3/2010 |
| EP | 2194471 | A1 | 6/2010 |
| EP | 2197220 | A2 | 6/2010 |
| EP | 2288178 | A1 | 2/2011 |
| EP | 2429155 | A1 | 3/2012 |
| EP | 1825713 | B1 | 10/2012 |
| EP | 2613573 | A1 | 7/2013 |
| EP | 2591617 | B1 | 6/2014 |
| EP | 2747081 | A1 | 6/2014 |
| EP | 2835989 | A2 | 2/2015 |
| EP | 2860992 | A1 | 4/2015 |
| EP | 2874413 | A1 | 5/2015 |
| EP | 2974382 | B1 | 4/2017 |
| EP | 2986034 | B1 | 5/2017 |
| EP | 3618074 | A1 | 3/2020 |
| EP | 3832643 | A1 | 6/2021 |
| JP | H02280199 | A | 11/1990 |
| JP | H05199593 | A | 8/1993 |
| JP | H05211700 | A | 8/1993 |
| JP | H06327089 | A | 11/1994 |
| JP | H0723490 | A | 1/1995 |
| JP | H1069280 | A | 3/1998 |
| JP | H10307592 | A | 11/1998 |
| JP | 2002502193 | A | 1/2002 |
| JP | 2002067815 | A | 3/2002 |
| JP | 2002101500 | A | 4/2002 |
| JP | 2003143252 | A | 5/2003 |
| JP | 2003304590 | A | 10/2003 |
| JP | 2005086686 | A | 3/2005 |
| JP | 2005217559 | A | 8/2005 |
| JP | 2005538633 | A | 12/2005 |
| JP | 2006017893 | A | 1/2006 |
| JP | 2006180039 | A | 7/2006 |
| JP | 2006191562 | A | 7/2006 |
| JP | 2006340285 | A | 12/2006 |
| JP | 2007068125 | A | 3/2007 |
| JP | 2007271802 | A | 10/2007 |
| JP | 2007325073 | A | 12/2007 |
| JP | 2008035254 | A | 2/2008 |
| JP | 2008228133 | A | 9/2008 |
| JP | 2009188474 | A | 8/2009 |
| JP | 2009288260 | A | 12/2009 |
| JP | 2010056970 | A | 3/2010 |
| JP | 2010081124 | A | 4/2010 |
| JP | 2010141892 | A | 6/2010 |
| JP | 2011123376 | A | 6/2011 |
| JP | 2011130212 | A | 6/2011 |
| JP | 2011164166 | A | 8/2011 |
| JP | 2011215378 | A | 10/2011 |
| JP | 2011217068 | A | 10/2011 |
| JP | 2013247456 | A | 12/2013 |
| JP | 2013253884 | A | 12/2013 |
| JP | 2014519274 | A | 8/2014 |
| JP | 2014523165 | A | 9/2014 |
| JP | 2016024652 | A | 2/2016 |
| JP | 2016524193 | A | 8/2016 |
| JP | 6356331 | B2 | 7/2018 |
| JP | 6567735 | B2 | 8/2019 |
| JP | 2021032906 | A | 3/2021 |
| KR | 1020060116383 | | 11/2006 |
| KR | 1020080011831 | | 2/2008 |
| KR | 20120111130 | A | 10/2012 |

(56) References Cited

FOREIGN PATENT DOCUMENTS

| | | | |
|---|---|---|---|
| KR | 20160005045 | A | 1/2016 |
| KR | 20160007527 | A | 1/2016 |
| KR | 20160101198 | A | 8/2016 |
| KR | 20160145634 | A | 12/2016 |
| KR | 20210080788 | A | 7/2021 |
| WO | 9731437 | A1 | 8/1997 |
| WO | 200182650 | A2 | 11/2001 |
| WO | 2004066673 | A1 | 8/2004 |
| WO | 2005013047 | A2 | 2/2005 |
| WO | 2007016465 | A2 | 2/2007 |
| WO | 2011139502 | A1 | 11/2011 |
| WO | 2013006323 | A2 | 1/2013 |
| WO | 2013016500 | A1 | 1/2013 |
| WO | 2013089236 | A1 | 6/2013 |
| WO | 2013126603 | A1 | 8/2013 |
| WO | 2014032709 | A1 | 3/2014 |
| WO | 2014036121 | A1 | 3/2014 |
| WO | 2014040667 | A1 | 3/2014 |
| WO | 2015024881 | A1 | 2/2015 |
| WO | 2015108794 | A1 | 7/2015 |
| WO | 2016040324 | A1 | 3/2016 |
| WO | 2016054090 | A1 | 4/2016 |
| WO | 2016118327 | A1 | 7/2016 |
| WO | 2016189285 | A1 | 12/2016 |
| WO | 2017049169 | A1 | 3/2017 |
| WO | 2017147081 | A1 | 8/2017 |
| WO | 2018064362 | A1 | 4/2018 |
| WO | 2019005112 | A1 | 1/2019 |
| WO | 2020006410 | A1 | 1/2020 |
| WO | 2020061439 | A1 | 3/2020 |
| WO | 2020068795 | A1 | 4/2020 |
| WO | 2020102991 | A1 | 5/2020 |
| WO | 2020132298 | A1 | 6/2020 |
| WO | 2020163679 | A1 | 8/2020 |
| WO | 2020218650 | A1 | 10/2020 |
| WO | 2020252163 | A1 | 12/2020 |
| WO | 2021127578 | A1 | 6/2021 |

OTHER PUBLICATIONS

Notice of Allowance mailed on Dec. 7, 2015, issued in connection with U.S. Appl. No. 14/216,325, filed Mar. 17, 2014, 7 pages.

Notice of Allowance mailed on Mar. 7, 2025, issued in connection with U.S. Appl. No. 17/340,590, filed Jun. 7, 2021, 12 pages.

Notice of Allowance mailed on Oct. 7, 2025, issued in connection with U.S. Appl. No. 18/338,996, filed Jun. 21, 2023, 05 pages.

Notice of Allowance mailed on Dec. 8, 2022, issued in connection with U.S. Appl. No. 17/340,353, filed Jun. 7, 2021, 9 pages.

Notice of Allowance mailed on Feb. 8, 2023, issued in connection with U.S. Appl. No. 17/664,556, filed May 23, 2022, 9 pages.

Notice of Allowance mailed on Apr. 9, 2025, issued in connection with U.S. Appl. No. 18/398,489, filed Dec. 28, 2023, 7 pages.

Notice of Allowance mailed on Dec. 9, 2024, issued in connection with U.S. Appl. No. 18/449,244, filed Aug. 14, 2023, 8 pages.

Notice of Allowance mailed on Nov. 9, 2016, issued in connection with U.S. Appl. No. 14/805,340, filed Jul. 21, 2015, 13 pages.

Notice of Allowance mailed on Feb. 1, 2018, issued in connection with U.S. Appl. No. 15/480,265, filed Apr. 5, 2017, 8 pages.

Notice of Allowance mailed on Mar. 1, 2023, issued in connection with U.S. Appl. No. 17/445,272, filed Aug. 17, 2021, 8 pages.

Notice of Allowance mailed on Nov. 1, 2021, issued in connection with U.S. Appl. No. 17/103,556, filed Nov. 24, 2020, 5 pages.

Notice of Allowance mailed on Apr. 10, 2015, issued in connection with U.S. Appl. No. 13/536,493, filed Jun. 28, 2012, 8 pages.

Notice of Allowance mailed on Aug. 10, 2018, issued in connection with U.S. Appl. No. 15/785,088, filed Oct. 16, 2017, 6 pages.

Notice of Allowance mailed on Jan. 10, 2024, issued in connection with U.S. Appl. No. 18/069,042, filed Dec. 20, 2022, 18 pages.

Notice of Allowance mailed on Jul. 10, 2018, issued in connection with U.S. Appl. No. 15/673,170, filed Aug. 9, 2017, 2 pages.

Notice of Allowance mailed on Jul. 10, 2024, issued in connection with U.S. Appl. No. 18/309,939, filed May 1, 2023, 5 pages.

Notice of Allowance mailed on Jun. 10, 2020, issued in connection with U.S. Appl. No. 16/713,858, filed Dec. 13, 2019, 8 pages.

Notice of Allowance mailed on Jun. 10, 2025, issued in connection with U.S. Appl. No. 18/649,847, filed Apr. 29, 2024, 09 pages.

Notice of Allowance mailed on Dec. 11, 2018, issued in connection with U.S. Appl. No. 15/909,327, filed Mar. 1, 2018, 10 pages.

Notice of Allowance mailed on Dec. 11, 2024, issued in connection with U.S. Appl. No. 18/313,859, filed May 8, 2023, 07 pages.

Notice of Allowance mailed on Feb. 11, 2019, issued in connection with U.S. Appl. No. 15/588,186, filed May 5, 2017, 5 pages.

Notice of Allowance mailed on Jul. 11, 2017, issued in connection with U.S. Appl. No. 14/678,248, filed Apr. 3, 2015, 11 pages.

Notice of Allowance mailed on Mar. 11, 2015, issued in connection with U.S. Appl. No. 13/340,126, filed Dec. 29, 2011, 7 pages.

Notice of Allowance mailed on May 11, 2023, issued in connection with U.S. Appl. No. 17/804,372, filed May 27, 2022, 8 pages.

Notice of Allowance mailed on Apr. 12, 2016, issued in connection with U.S. Appl. No. 14/681,465, filed Apr. 8, 2015, 13 pages.

Notice of Allowance mailed on Apr. 12, 2024, issued in connection with U.S. Appl. No. 18/358,710, filed Jul. 25, 2023, 9 pages.

Notice of Allowance mailed on Aug. 12, 2019, issued in connection with U.S. Appl. No. 16/416,648, filed May 20, 2019, 7 pages.

Notice of Allowance mailed on Dec. 12, 2016, issued in connection with U.S. Appl. No. 14/805,140, filed Jul. 21, 2015, 24 pages.

Notice of Allowance mailed on Dec. 12, 2017, issued in connection with U.S. Appl. No. 14/481,505, filed Sep. 9, 2014, 9 pages.

Notice of Allowance mailed on Feb. 12, 2025, issued in connection with U.S. Appl. No. 17/650,441, filed Feb. 9, 2022, 15 pages.

Notice of Allowance mailed on Jan. 12, 2022, issued in connection with U.S. Appl. No. 16/994,627, filed Aug. 16, 2020, 7 pages.

Notice of Allowance mailed on Nov. 12, 2019, issued in connection with U.S. Appl. No. 15/955,545, filed Apr. 17, 2018, 9 pages.

Notice of Allowance mailed on Nov. 12, 2024, issued in connection with U.S. Appl. No. 18/192,452, filed Oct. 20, 2020, 2 pages.

Notice of Allowance mailed on Sep. 12, 2016, issued in connection with U.S. Appl. No. 15/066,072, filed Mar. 10, 2016, 7 pages.

Notice of Allowance mailed on Sep. 12, 2017, issued in connection with U.S. Appl. No. 15/207,682, filed Jul. 12, 2016, 8 pages.

Notice of Allowance mailed on Apr. 13, 2020, issued in connection with U.S. Appl. No. 16/181,865, filed Nov. 6, 2018, 10 pages.

Notice of Allowance mailed on Apr. 13, 2023, issued in connection with U.S. Appl. No. 18/058,639, filed Nov. 23, 2022, 15 pages.

Notice of Allowance mailed on Feb. 13, 2017, issued in connection with U.S. Appl. No. 14/864,506, filed Sep. 24, 2015, 8 pages.

Notice of Allowance mailed on Feb. 13, 2023, issued in connection with U.S. Appl. No. 17/543,430, filed Dec. 6, 2021, 10 pages.

Notice of Allowance mailed on Feb. 13, 2025, issued in connection with U.S. Appl. No. 18/396,279, filed Dec. 26, 2023, 8 pages.

Notice of Allowance mailed on Jul. 13, 2022, issued in connection with U.S. Appl. No. 17/033,821, filed Sep. 27, 2020, 8 pages.

Notice of Allowance mailed on Mar. 13, 2024, issued in connection with U.S. Appl. No. 18/449,254, filed Aug. 14, 2023, 10 pages.

Notice of Allowance mailed on Mar. 13, 2025, issued in connection with U.S. Appl. No. 18/484,198, filed Oct. 10, 2023, 13 pages.

Notice of Allowance mailed on Nov. 13, 2017, issued in connection with U.S. Appl. No. 14/726,921, filed Jun. 1, 2015, 8 pages.

Notice of Allowance mailed on Sep. 13, 2023, issued in connection with U.S. Appl. No. 17/543,014, filed Dec. 6, 2021, 9 pages.

Notice of Allowance mailed on Dec. 14, 2023, issued in connection with U.S. Appl. No. 17/722,661, filed Apr. 18, 2022, 12 pages.

Notice of Allowance mailed on Jul. 14, 2020, issued in connection with U.S. Appl. No. 16/556,297, filed Aug. 30, 2019, 11 pages.

Notice of Allowance mailed on Jun. 14, 2023, issued in connection with U.S. Appl. No. 17/816,238, filed Jul. 29, 2022, 11 pages.

Notice of Allowance mailed on Mar. 14, 2019, issued in connection with U.S. Appl. No. 15/343,996, filed Nov. 4, 2016, 8 pages.

Notice of Allowance mailed on Oct. 14, 2021, issued in connection with U.S. Appl. No. 16/115,525, filed Aug. 28, 2018, 5 pages.

Notice of Allowance mailed on Dec. 15, 2023, issued in connection with U.S. Appl. No. 18/157,937, filed Jan. 23, 2023, 8 pages.

(56) References Cited

OTHER PUBLICATIONS

Notice of Allowance mailed on Jan. 15, 2019, issued in connection with U.S. Appl. No. 16/115,524, filed Aug. 28, 2018, 8 pages.
Notice of Allowance mailed on Jun. 15, 2017, issued in connection with U.S. Appl. No. 15/096,827, filed Apr. 12, 2016, 5 pages.
Notice of Allowance mailed on Mar. 15, 2017, issued in connection with U.S. Appl. No. 14/826,856, filed Aug. 14, 2015, 7 pages.
Notice of Allowance mailed on Mar. 15, 2023, issued in connection with U.S. Appl. No. 16/949,973, filed Nov. 23, 2020, 21 pages.
Notice of Allowance mailed on May 15, 2019, issued in connection with U.S. Appl. No. 16/113,032, filed Aug. 27, 2018, 9 pages.
Notice of Allowance mailed on Nov. 15, 2021, issued in connection with U.S. Appl. No. 16/994,874, filed Aug. 17, 2020, 9 pages.
Notice of Allowance mailed on Oct. 15, 2018, issued in connection with U.S. Appl. No. 15/716,313, filed Sep. 26, 2017, 10 pages.
Notice of Allowance mailed on Oct. 15, 2025, issued in connection with U.S. Appl. No. 18/461,409, filed Sep. 5, 2023, 09 pages.
Notice of Allowance mailed on Sep. 15, 2022, issued in connection with U.S. Appl. No. 17/033,818, filed Sep. 27, 2020, 7 pages.
Notice of Allowance mailed on Feb. 16, 2022, issued in connection with U.S. Appl. No. 16/919,467, filed Jul. 2, 2020, 9 pages.
Notice of Allowance mailed on Jan. 16, 2024, issued in connection with U.S. Appl. No. 17/810,549, filed Jul. 1, 2022, 7 pages.
Notice of Allowance mailed on Jul. 16, 2020, issued in connection with U.S. Appl. No. 16/530,324, filed Aug. 2, 2019, 9 pages.
Notice of Allowance mailed on Jun. 16, 2017, issued in connection with U.S. Appl. No. 14/884,001, filed Oct. 15, 2015, 8 pages.
Notice of Allowance mailed on May 16, 2019, issued in connection with U.S. Appl. No. 16/181,213, filed Nov. 5, 2018, 10 pages.
Notice of Allowance mailed on May 16, 2025, issued in connection with U.S. Appl. No. 18/659,707, filed May 9, 2024, 07 pages.
Notice of Allowance mailed on Oct. 16, 2017, issued in connection with U.S. Appl. No. 15/478,770, filed Apr. 4, 2017, 10 pages.
Notice of Allowance mailed on Oct. 16, 2019, issued in connection with U.S. Appl. No. 16/401,981, filed May 2, 2019, 8 pages.
Notice of Allowance mailed on Sep. 16, 2016, issued in connection with U.S. Appl. No. 15/066,049, filed Mar. 10, 2016, 7 pages.
Notice of Allowance mailed on Sep. 16, 2024, issued in connection with U.S. Appl. No. 18/432,733, filed Feb. 5, 2024, 1 page.
Notice of Allowance mailed on Apr. 17, 2024, issued in connection with U.S. Appl. No. 18/088,976, filed Dec. 27, 2022, 7 pages.
Notice of Allowance mailed on Apr. 17, 2024, issued in connection with U.S. Appl. No. 18/471,693, filed Sep. 21, 2023, 12 pages.
Notice of Allowance mailed on Aug. 17, 2022, issued in connection with U.S. Appl. No. 17/316,371, filed May 10, 2021, 9 pages.
Notice of Allowance mailed on Dec. 17, 2018, issued in connection with U.S. Appl. No. 16/055,884, filed Aug. 6, 2018, 5 pages.
Notice of Allowance mailed on Jul. 17, 2024, issued in connection with U.S. Appl. No. 18/310,025, filed May 1, 2023, 7 pages.
Notice of Allowance mailed on May 17, 2017, issued in connection with U.S. Appl. No. 15/339,260, filed Oct. 31, 2016, 7 pages.
Notice of Allowance mailed on Oct. 17, 2019, issued in connection with U.S. Appl. No. 16/542,433, filed Aug. 16, 2019, 9 pages.
Notice of Allowance mailed on Oct. 17, 2024, issued in connection with U.S. Appl. No. 18/460,141, filed Sep. 1, 2023, 2 pages.
Notice of Allowance mailed on Oct. 17, 2024, issued in connection with U.S. Appl. No. 18/520,531, filed Nov. 27, 2023, 10 pages.
Notice of Allowance mailed on Aug. 18, 2022, issued in connection with U.S. Appl. No. 17/660,185, filed Apr. 21, 2022, 11 pages.
Notice of Allowance mailed on Dec. 18, 2024, issued in connection with U.S. Appl. No. 17/450,925, filed Oct. 14, 2021, 10 pages.
Notice of Allowance mailed on Dec. 18, 2024, issued in connection with U.S. Appl. No. 18/410,120, filed Jan. 11, 2024, 07 pages.
Notice of Allowance mailed on Jan. 18, 2024, issued in connection with U.S. Appl. No. 18/352,394, filed Jul. 14, 2023, 7 pages.
Notice of Allowance mailed on Mar. 18, 2019, issued in connection with U.S. Appl. No. 16/056,862, filed Aug. 7, 2018, 12 pages.
Notice of Allowance mailed on Mar. 18, 2021, issued in connection with U.S. Appl. No. 15/005,496, filed Jan. 25, 2016, 8 pages.
Notice of Allowance mailed on Oct. 18, 2021, issued in connection with U.S. Appl. No. 16/570,679, filed Sep. 13, 2019, 9 pages.
Notice of Allowance mailed on Sep. 18, 2024, issued in connection with U.S. Appl. No. 17/532,744, filed Nov. 22, 2021, 13 pages.
Notice of Allowance mailed on Sep. 18, 2024, issued in connection with U.S. Appl. No. 18/455,415, filed Aug. 24, 2023, 16 pages.
Notice of Allowance mailed on Apr. 19, 2023, issued in connection with U.S. Appl. No. 17/113,799, filed Dec. 7, 2020, 7 pages.
Notice of Allowance mailed on Aug. 19, 2016, issued in connection with U.S. Appl. No. 14/644,136, filed Mar. 10, 2015, 12 pages.
Notice of Allowance mailed on Aug. 19, 2024, issued in connection with U.S. Appl. No. 18/345,588, filed Jun. 30, 2023, 20 pages.
Notice of Allowance mailed on Jan. 19, 2022, issued in connection with U.S. Appl. No. 17/399,294, filed Aug. 11, 2021, 11 pages.
Notice of Allowance mailed on Jul. 19, 2019, issued in connection with U.S. Appl. No. 16/123,928, filed Sep. 6, 2018, 8 pages.
Notice of Allowance mailed on Jul. 19, 2024, issued in connection with U.S. Appl. No. 18/328,932, filed Jun. 5, 2023, 9 pages.
Notice of Allowance mailed on Jun. 19, 2017, issued in connection with U.S. Appl. No. 14/793,190, filed Jul. 7, 2015, 5 pages.
Notice of Allowance mailed on Sep. 19, 2017, issued in connection with U.S. Appl. No. 14/793,205, filed Jul. 7, 2015, 16 pages.
Notice of Allowance mailed on Sep. 19, 2018, issued in connection with U.S. Appl. No. 14/864,393, filed Sep. 24, 2015, 10 pages.
Notice of Allowance mailed on Feb. 2, 2022, issued in connection with U.S. Appl. No. 16/949,951, filed Nov. 20, 2020, 8 pages.
Notice of Allowance mailed on Mar. 2, 2020, issued in connection with U.S. Appl. No. 16/213,552, filed Dec. 7, 2018, 9 pages.
Non-Final Office Action mailed on Jun. 20, 2017, issued in connection with U.S. Appl. No. 15/207,682, filed Jul. 12, 2016, 17 pages.
Non-Final Office Action mailed on Jun. 20, 2024, issued in connection with U.S. Appl. No. 18/007,415, filed Jan. 30, 2023, 12 pages.
Non-Final Office Action mailed on Jun. 20, 2024, issued in connection with U.S. Appl. No. 18/520,336, filed Nov. 27, 2023, 20 pages.
Non-Final Office Action mailed on Mar. 20, 2025, issued in connection with U.S. Appl. No. 18/338,996, filed Jun. 21, 2023, 11 pages.
Non-Final Office Action mailed on May 20, 2024, issued in connection with U.S. Appl. No. 18/600,044, filed Mar. 8, 2024, 24 pages.
Non-Final Office Action mailed on Nov. 20, 2024, issued in connection with U.S. Appl. No. 18/395,386, filed Dec. 22, 2023, 30 pages.
Non-Final Office Action mailed on Dec. 21, 2018, issued in connection with U.S. Appl. No. 16/181,213, filed Nov. 5, 2018, 13 pages.
Non-Final Office Action mailed on Jun. 21, 2016, issued in connection with U.S. Appl. No. 14/678,248, filed Apr. 3, 2015, 10 pages.
Non-Final Office Action mailed on Jun. 21, 2019, issued in connection with U.S. Appl. No. 16/181,865, filed Nov. 6, 2018, 12 pages.
Non-Final Office Action mailed on Nov. 21, 2014, issued in connection with U.S. Appl. No. 13/536,493, filed Jun. 28, 2012, 20 pages.
Non-Final Office Action mailed on Nov. 21, 2023, issued in connection with U.S. Appl. No. 18/088,976, filed Dec. 27, 2022, 9 pages.
Non-Final Office Action mailed on Nov. 21, 2024, issued in connection with U.S. Appl. No. 18/048,034, filed Oct. 20, 2022, 11 pages.
Non-Final Office Action mailed on Nov. 21, 2024, issued in connection with U.S. Appl. No. 18/508,105, filed Nov. 13, 2023, 16 pages.
Non-Final Office Action mailed on Sep. 21, 2023, issued in connection with U.S. Appl. No. 18/352,394, filed Jul. 14, 2023, 6 pages.
Non-Final Office Action mailed on Jun. 22, 2018, issued in connection with U.S. Appl. No. 15/217,399, filed Jul. 22, 2016, 33 pages.

(56) References Cited

OTHER PUBLICATIONS

Non-Final Office Action mailed on Jun. 22, 2020, issued in connection with U.S. Appl. No. 16/555,832, filed Aug. 29, 2019, 15 pages.
Non-Final Office Action mailed on Oct. 22, 2019, issued in connection with U.S. Appl. No. 16/416,619, filed May 20, 2019, 12 pages.
Non-Final Office Action mailed on Oct. 22, 2021, issued in connection with U.S. Appl. No. 16/949,951, filed Nov. 20, 2020, 10 pages.
Non-Final Office Action mailed on Jan. 23, 2019, issued in connection with U.S. Appl. No. 16/113,032, filed Aug. 27, 2018, 8 pages.
Non-Final Office Action mailed on Jun. 23, 2023, issued in connection with U.S. Appl. No. 18/189,869, filed Mar. 24, 2023, 13 pages.
Non-Final Office Action mailed on Apr. 24, 2024, issued in connection with U.S. Appl. No. 18/461,430, filed Sep. 5, 2023, 22 pages.
Non-Final Office Action mailed on Apr. 24, 2025, issued in connection with U.S. Appl. No. 18/331,710, filed Jun. 8, 2023, 20 pages.
Non-Final Office Action mailed on Jan. 24, 2024, issued in connection with U.S. Appl. No. 18/189,863, filed Mar. 24, 2023, 28 pages.
Non-Final Office Action mailed on Jun. 24, 2022, issued in connection with U.S. Appl. No. 17/373,179, filed Jul. 12, 2021, 8 pages.
Non-Final Office Action mailed on May 24, 2019, issued in connection with U.S. Appl. No. 16/401,981, filed May 2, 2019, 14 pages.
Non-Final Office Action mailed on May 24, 2023, issued in connection with U.S. Appl. No. 18/175,283, filed Feb. 27, 2023, 13 pages.
Non-Final Office Action mailed on Feb. 25, 2022, issued in connection with U.S. Appl. No. 17/107,157, filed Nov. 30, 2020, 30 pages.
Non-Final Office Action mailed on Jan. 25, 2023, issued in connection with U.S. Appl. No. 17/816,238, filed Jul. 29, 2022, 10 pages.
Non-Final Office Action mailed on Oct. 25, 2016, issued in connection with U.S. Appl. No. 14/864,506, filed Sep. 24, 2015, 9 pages.
Non-Final Office Action mailed on Oct. 25, 2023, issued in connection with U.S. Appl. No. 18/308,065, filed Apr. 27, 2023, 15 pages.
Non-Final Office Action mailed on Apr. 26, 2024, issued in connection with U.S. Appl. No. 18/310,025, filed May 1, 2023, 9 pages.
Non-Final Office Action mailed on Jan. 26, 2024, issued in connection with U.S. Appl. No. 17/450,925, filed Oct. 14, 2021, 9 pages.
Non-Final Office Action mailed on Jun. 26, 2023, issued in connection with U.S. Appl. No. 17/543,014, filed Dec. 6, 2021, 17 pages.
Non-Final Office Action mailed on Nov. 26, 2024, issued in connection with U.S. Appl. No. 18/398,489, filed Dec. 28, 2023, 08 pages.
Non-Final Office Action mailed on Sep. 26, 2018, issued in connection with U.S. Appl. No. 15/229,693, filed Aug. 5, 2016, 25 pages.
Non-Final Office Action mailed on Sep. 26, 2024, issued in connection with U.S. Appl. No. 18/595,934, filed Mar. 5, 2024, 13 pages.
Non-Final Office Action mailed on Aug. 27, 2025, issued in connection with U.S. Appl. No. 18/408,495, filed Jan. 9, 2024, 10 pages.
Non-Final Office Action mailed on Dec. 27, 2017, issued in connection with U.S. Appl. No. 15/357,520, filed Nov. 21, 2016, 28 pages.
Non-Final Office Action mailed on Feb. 27, 2018, issued in connection with U.S. Appl. No. 14/864,393, filed Sep. 24, 2015, 19 pages.
Non-Final Office Action mailed on Feb. 27, 2018, issued in connection with U.S. Appl. No. 15/718,556, filed Sep. 28, 2017, 19 pages.
Non-Final Office Action mailed on Feb. 27, 2023, issued in connection with U.S. Appl. No. 17/556,426, filed Dec. 20, 2021, 8 pages.
Non-Final Office Action mailed on Feb. 27, 2024, issued in connection with U.S. Appl. No. 18/343,487, filed Jun. 28, 2023, 42 pages.
Non-Final Office Action mailed on Jan. 27, 2025, issued in connection with U.S. Appl. No. 18/492,583, filed Oct. 23, 2023, 9 pages.
Non-Final Office Action mailed on Jul. 27, 2016, issued in connection with U.S. Appl. No. 14/696,014, filed Apr. 24, 2015, 11 pages.
Non-Final Office Action mailed on Mar. 27, 2017, issued in connection with U.S. Appl. No. 15/211,835, filed Jul. 15, 2016, 30 pages.
Non-Final Office Action mailed on Mar. 27, 2018, issued in connection with U.S. Appl. No. 15/785,088, filed Oct. 16, 2017, 11 pages.
Non-Final Office Action mailed on Sep. 27, 2023, issued in connection with U.S. Appl. No. 18/154,228, filed Jan. 13, 2023, 12 pages.
Non-Final Office Action mailed on Jul. 28, 2016, issued in connection with U.S. Appl. No. 14/884,001, filed Oct. 15, 2015, 8 pages.
Non-Final Office Action mailed on Mar. 28, 2024, issued in connection with U.S. Appl. No. 18/192,452, filed Mar. 29, 2023, 7 pages.
Non-Final Office Action mailed on May 28, 2021, issued in connection with U.S. Appl. No. 17/098,134, filed Nov. 13, 2020, 14 pages.
Non-Final Action mailed on Jan. 29, 2016, issued in connection with U.S. Appl. No. 14/481,511, filed Sep. 9, 2014, 10 pages.
Non-Final Office Action mailed Sep. 16, 2021, issued in connection with U.S. Appl. No. 17/098,134, filed Nov. 13, 2020, 10 pages.
Non-Final Office Action mailed Jul. 21, 2021, issued in connection with U.S. Appl. No. 16/570,679, filed Sep. 13, 2019, 18 pages.
Non-Final Office Action mailed Jul. 23, 2021, issued in connection with U.S. Appl. No. 16/665,154, filed Oct. 28, 2019, 8 pages.
Non-Final Office Action mailed Sep. 7, 2021, issued in connection with U.S. Appl. No. 16/994,627, filed Aug. 16, 2020, 11 pages.
Non-Final Office Action mailed on Mar. 1, 2017, issued in connection with U.S. Appl. No. 15/344,069, filed Nov. 4, 2016, 20 pages.
Non-Final Office Action mailed on Nov. 1, 2017, issued in connection with U.S. Appl. No. 15/235,598, filed Aug. 12, 2016, 15 pages.
Non-Final Office Action mailed on Jan. 2, 2025, issued in connection with U.S. Appl. No. 18/659,707, filed May 9, 2024, 13 pages.
Non-Final Office Action mailed on Jun. 2, 2014, issued in connection with U.S. Appl. No. 13/340,126, filed Dec. 29, 2011, 14 pages.
Non-Final Office Action mailed on Jun. 2, 2017, issued in connection with U.S. Appl. No. 15/229,693, filed Aug. 5, 2016, 18 pages.
Non-Final Office Action mailed on Nov. 2, 2017, issued in connection with U.S. Appl. No. 15/166,241, filed May 26, 2016, 12 pages.
Non-Final Office Action mailed on Oct. 2, 2017, issued in connection with U.S. Appl. No. 15/005,853, filed Jan. 25, 2016, 8 pages.
Non-Final Office Action mailed on Dec. 3, 2024, issued in connection with U.S. Appl. No. 17/222,950, filed Apr. 5, 2021, 10 pages.
Non-Final Office Action mailed on Dec. 3, 2024, issued in connection with U.S. Appl. No. 18/649,847, filed Apr. 29, 2024, 09 pages.
Non-Final Office Action mailed on Feb. 3, 2016, issued in connection with U.S. Appl. No. 14/481,522, filed Sep. 9, 2014, 12 pages.
Non-Final Office Action mailed on Jul. 3, 2018, issued in connection with U.S. Appl. No. 15/909,327, filed Mar. 1, 2018, 30 pages.
Non-Final Office Action mailed on Jan. 4, 2017, issued in connection with U.S. Appl. No. 15/207,682, filed Jul. 12, 2016, 6 pages.
Non-Final Office Action mailed on Nov. 4, 2016, issued in connection with U.S. Appl. No. 14/826,856, filed Aug. 14, 2015, 10 pages.
Non-Final Office Action mailed on Sep. 4, 2019, issued in connection with U.S. Appl. No. 16/213,552, filed Dec. 7, 2018, 16 pages.

(56) References Cited

OTHER PUBLICATIONS

Non-Final Office Action mailed on Jul. 5, 2017, issued in connection with U.S. Appl. No. 14/481,522, filed Sep. 9, 2014, 8 pages.
Non-Final Office Action mailed on Sep. 5, 2024, issued in connection with U.S. Appl. No. 18/410,407, filed Jan. 11, 2024, 18 pages.
Non-Final Office Action mailed on Aug. 6, 2025, issued in connection with U.S. Appl. No. 18/508,105, filed Nov. 13, 2023, 38 pages.
Non-Final Office Action mailed on Jul. 6, 2016, issued in connection with U.S. Appl. No. 15/070,160, filed Mar. 15, 2016, 6 pages.
Non-Final Office Action mailed on Jun. 6, 2018, issued in connection with U.S. Appl. No. 15/005,496, filed Jan. 25, 2016, 16 pages.
Non-Final Office Action mailed on Nov. 6, 2024, issued in connection with U.S. Appl. No. 18/623,602, filed Apr. 1, 2024, 08 pages.
Non-Final Office Action mailed on Oct. 6, 2016, issued in connection with U.S. Appl. No. 14/678,263, filed Apr. 3, 2015, 30 pages.
Non-Final Office Action mailed on Dec. 7, 2015, issued in connection with U.S. Appl. No. 14/921,762, filed Oct. 23, 2015, 5 pages.
Non-Final Office Action mailed on Jul. 7, 2016, issued in connection with U.S. Appl. No. 15/066,049, filed Mar. 10, 2016, 6 pages.
Non-Final Office Action mailed on Mar. 7, 2017, issued in connection with U.S. Appl. No. 14/481,514, filed Sep. 9, 2014, 24 pages.
Non-Final Office Action mailed on Sep. 7, 2016, issued in connection with U.S. Appl. No. 14/826,873, filed Aug. 14, 2015, 12 pages.
Non-Final Office Action mailed on Jul. 8, 2016, issued in connection with U.S. Appl. No. 15/066,072, filed Mar. 10, 2016, 6 pages.
Non-Final Office Action mailed on Nov. 8, 2024, issued in connection with U.S. Appl. No. 18/484,198, filed Oct. 10, 2023, 20 pages.
Non-Final Office Action mailed on Apr. 9, 2025, issued in connection with U.S. Appl. No. 18/461,430, filed Sep. 5, 2023, 21 pages.
Non-Final Office Action mailed on Dec. 9, 2016, issued in connection with U.S. Appl. No. 14/678,248, filed Apr. 3, 2015, 22 pages.
Non-Final Office Action mailed on Feb. 1, 2024, issued in connection with U.S. Appl. No. 18/313,013, filed May 5, 2023, 47 pages.
Non-Final Office Action mailed on May 1, 2024, issued in connection with U.S. Appl. No. 17/650,441, filed Feb. 9, 2022, 12 pages.
Non-Final Office Action mailed on Apr. 10, 2018, issued in connection with U.S. Appl. No. 15/909,529, filed Mar. 1, 2018, 8 pages.
Non-Final Office Action mailed on Apr. 10, 2025, issued in connection with U.S. Appl. No. 18/068,494, filed Dec. 19, 2022, 27 pages.
Non-Final Office Action mailed on Jul. 10, 2025, issued in connection with U.S. Appl. No. 18/520,336, filed Nov. 27, 2023, 24 pages.
Non-Final Office Action mailed on Mar. 10, 2017, issued in connection with U.S. Appl. No. 14/997,868, filed Jan. 18, 2016, 10 pages.
Non-Final Office Action mailed on Sep. 10, 2018, issued in connection with U.S. Appl. No. 15/056,553, filed Feb. 29, 2016, 8 pages.
Non-Final Office Action mailed on Sep. 10, 2024, issued in connection with U.S. Appl. No. 18/410,120, filed Jan. 11, 2024, 07 pages.
Non-Final Office Action mailed on Apr. 11, 2017, issued in connection with U.S. Appl. No. 15/088,994, filed Apr. 1, 2016, 13 pages.
Non-Final Office Action mailed on Apr. 11, 2017, issued in connection with U.S. Appl. No. 15/089,004, filed Apr. 1, 2016, 9 pages.
Non-Final Office Action mailed on Apr. 11, 2024, issued in connection with U.S. Appl. No. 18/456,941, filed Aug. 28, 2023, 10 pages.
Non-Final Office Action mailed on Apr. 11, 2025, issued in connection with U.S. Appl. No. 18/635,731, filed Apr. 15, 2024, 24 pages.
Non-Final Office Action mailed on Dec. 11, 2019, issued in connection with U.S. Appl. No. 16/556,297, filed Aug. 30, 2019, 9 pages.
Non-Final Office Action mailed on Dec. 11, 2019, issued in connection with U.S. Appl. No. 16/658,896, filed Oct. 21, 2019, 14 pages.
Non-Final Office Action mailed on Feb. 11, 2021, issued in connection with U.S. Appl. No. 17/104,466, filed Nov. 25, 2020, 39 pages.
Non-Final Office Action mailed on Jul. 11, 2024, issued in connection with U.S. Appl. No. 18/313,013, filed May 5, 2023, 18 pages.
Advisory Action mailed on Jul. 1, 2019, issued in connection with U.S. Appl. No. 15/229,693, filed Aug. 5, 2016, 2 pages.
Advisory Action mailed on Jul. 10, 2018, issued in connection with U.S. Appl. No. 15/056,553, filed Feb. 29, 2016, 3 pages.
Advisory Action mailed on Dec. 11, 2020, issued in connection with U.S. Appl. No. 15/005,496, filed Jan. 25, 2016, 3 pages.
Advisory Action mailed on Jul. 12, 2018, issued in connection with U.S. Appl. No. 15/166,241, filed May 26, 2016, 3 pages.
Advisory Action mailed on Jul. 12, 2018, issued in connection with U.S. Appl. No. 15/235,598, filed Aug. 12, 2016, 3 pages.
Advisory Action mailed on Nov. 12, 2024, issued in connection with U.S. Appl. No. 17/450,925, filed Oct. 14, 2021, 3 pages.
Advisory Action mailed on Dec. 13, 2023, issued in connection with U.S. Appl. No. 18/048,034, filed Oct. 20, 2022, 4 pages.
Advisory Action mailed on Aug. 16, 2017, issued in connection with U.S. Appl. No. 14/481,505, filed Sep. 9, 2014, 3 pages.
Advisory Action mailed on Jun. 19, 2018, issued in connection with U.S. Appl. No. 15/229,693, filed Aug. 5, 2016, 3 pages.
Advisory Action mailed on Sep. 19, 2017, issued in connection with U.S. Appl. No. 14/726,921, filed Jun. 1, 2015, 3 pages.
Advisory Action mailed on Nov. 22, 2021, issued in connection with U.S. Appl. No. 16/919,467, filed Jul. 2, 2020, 4 pages.
Advisory Action mailed on Apr. 24, 2024, issued in connection with U.S. Appl. No. 17/807,270, filed Jun. 16, 2022, 3 pages.
Advisory Action mailed on Oct. 25, 2024, issued in connection with U.S. Appl. No. 18/048,034, filed Oct. 20, 2022, 3 pages.
Advisory Action mailed on Feb. 26, 2024, issued in connection with U.S. Appl. No. 17/532,744, filed Nov. 22, 2021, 4 pages.
Advisory Action mailed on Jun. 3, 2020, issued in connection with U.S. Appl. No. 16/115,525, filed Aug. 28, 2018, 3 pages.
Advisory Action mailed on Apr. 30, 2019, issued in connection with U.S. Appl. No. 15/005,496, filed Jan. 25, 2016, 3 pages.
Advisory Action mailed on Feb. 7, 2019, issued in connection with U.S. Appl. No. 15/806,126, filed Nov. 7, 2017, 3 pages.
Amazon Ask Questions, "Q: Can Two Dots Listen to Separate Music in Different Rooms?," Sep. 2017, pp. 1-5 [retrieved from https://www.amazon.com/ask/questions/Tx199M38M3QKL18/1/ref=ask_al_psf_al_hza].
Amazon. "Multi-Agent Design Guide", Voice Interoperability Initiative: Multi-Agent Design Guide, 36 pages. [retrieved on Jan. 4, 2022], Retrieved from the Internet: URL: https://build.amazonalexadev.com/VII_Multi_Agent_Design_Guide.html.
An Overview of IEEE 1451.4 Transducer Electronic Data Sheets (TEDS) National Instruments, 19 pages.
"AuEQ for the iPhone," Mar. 25, 2015, retrieved from the internet: URL:https://web.archive.org/web20150325152629/http://www.hotto.de/mobileapps/iphoneaueq.html [retrieved on Jun. 24, 2016], 6 pages.
Australian Patent Office, Australian Examination Report Action mailed on Apr. 10, 2025, issued in connection with Australian Application No. 2020290464, 3 pages.
Australian Patent Office, Australian Examination Report Action mailed on Aug. 16, 2024, issued in connection with Australian Application No. 2023248160, 2 pages.
Australian Patent Office, Australian Examination Report Action mailed on Sep. 18, 2024, issued in connection with Australian Application No. 2020218258, 3 pages.
Australian Patent Office, Australian Examination Report Action mailed on Aug. 19, 2024, issued in connection with Australian Application No. 2023237094, 2 pages.
Australian Patent Office, Australian Examination Report Action mailed on Jun. 24, 2024, issued in connection with Australian Application No. 2019405936, 3 pages.
Australian Patent Office, Australian Examination Report Action mailed on Nov. 28, 2025, issued in connection with Australian Application No. 2020405200, 2 pages.

(56) References Cited

OTHER PUBLICATIONS

Australian Patent Office, Australian Examination Report Action mailed on Jul. 29, 2024, issued in connection with Australian Application No. 2023237192, 3 pages.
Australian Patent Office, Australian Examination Report Action mailed on Mar. 6, 2025, issued in connection with Australian Application No. 2023201078, 2 pages.
Australian Patent Office, Notice of Acceptance Action mailed on Oct. 7, 2025, issued in connection with Australian Application No. 2020290464, 3 pages.
"AV Amplifier DSP-Z7", Yamaha, 2008 [retrieved on Jan. 3, 2022]. Retrieved from the Internet: URL: https://de.yamaha.com/files/download/other_assets/6/318616/DSP-Z7_en.pdf, pp. 1-154.
BeoLab5 User Manual. Bang & Olufsen. Version 1.0, 20 pages [produced by Google in WDTX Case No. 6:20-cv-00881 Answer on Jan. 8, 2021].
Bohn, Dieter. The Verge. "Amazon Creates a Huge Alliance to Demand Voice Assistant Compatibility." Sep. 24, 2019, 15 pages. Retrieved from the Internet: URL: https://www.theverge.com/2019/9/24/20881321/amazon-voice-interoperability-initiative-alexa-microsoft-baidu-intel-qualcommspotify-assistants.
Burger, Dennis, "Automated Room Correction Explained," hometheaterreview.com, Nov. 18, 2013, http://hometheaterreview.com/automated-room-correction-explained/ Retrieved Oct. 10, 2014, 3 pages.
Canadian Patent Office, Canadian Examination Report mailed on Oct. 1, 2024, issued in connection with Canadian Application No. 3123601, 4 pages.
Canadian Patent Office, Canadian Examination Report mailed on Aug. 12, 2024, issued in connection with Canadian Application No. 3067776, 3 pages.
Canadian Patent Office, Canadian Examination Report mailed on Oct. 13, 2022, issued in connection with Canadian Application No. 3121516, 4 pages.
Canadian Patent Office, Canadian Examination Report mailed on Oct. 13, 2023, issued in connection with Canadian Application No. 3148021, 8 pages.
Canadian Patent Office, Canadian Examination Report mailed on Jun. 18, 2024, issued in connection with Canadian Application No. 3084279, 4 pages.
Canadian Patent Office, Canadian Examination Report mailed on Dec. 19, 2023, issued in connection with Canadian Application No. 3067776, 3 pages.
Canadian Patent Office, Canadian Examination Report mailed on Apr. 29, 2024, issued in connection with Canadian Application No. 3164558, 4 pages.
Canadian Patent Office, Canadian Examination Report mailed on Jan. 3, 2024, issued in connection with Canadian Application No. 3123601, 3 pages.
Canadian Patent Office, Canadian Examination Report mailed on Oct. 3, 2025, issued in connection with Canadian Application No. 3227238, 4 pages.
Canadian Patent Office, Canadian Examination Report mailed on May 8, 2024, issued in connection with Canadian Application No. 3146914, 5 pages.
Chen, Trista P. et al. VRAPS: Visual Rhythm-Based Audio Playback System. IEEE, Gracenote, Inc., 2010, pp. 721-722.
Chinese Patent Office, Chinese Office Action and Translation mailed on Apr. 1, 2021, issued in connection with Chinese Application No. 201910395715.4, 8 pages.
Chinese Patent Office, First Office Action and Translation mailed on Nov. 3, 2021, issued in connection with Chinese Application No. 202011278502.2, 10 pages.
Chinese Patent Office, First Office Action and Translation mailed on Jun. 19, 2019, issued in connection with Chinese Application No. 201680054189.X, 11 pages.
Chinese Patent Office, First Office Action and Translation mailed on Feb. 22, 2021, issued in connection with Chinese Application No. 202010187024.8, 11 pages.
Chinese Patent Office, First Office Action and Translation mailed on Apr. 23, 2024, issued in connection with Chinese Application No. 202110542908.5, 10 pages.
First Action Interview Pilot Program Pre-Interview Communication mailed on Oct. 7, 2015, issued in connection with U.S. Appl. No. 14/216,306, filed Mar. 17, 2014, 5 pages.
First Action Interview Pilot Program Pre-Interview Communication mailed on Feb. 16, 2016, issued in connection with U.S. Appl. No. 14/681,465, filed Apr. 8, 2015, 5 pages.
Gonzalez et al., "Simultaneous Measurement of Multichannel Acoustic Systems," J. Audio Eng. Soc., 2004, pp. 26-42, vol. 52, No. 1/2.
*Google LLC* v. *Sonos, Inc*., Declaration of Jeffery S. Vipperman, PHD. In Support of Petition for Inter Partes Review of U.S. Pat. No. 9,219,460, IPR2021-00475, Feb. 2, 2021, 92 pages.
*Google LLC* v. *Sonos, Inc*., Declaration of Michael T. Johnson, Ph.D. Exhibit 2016 in Patent Owner Response to Petition for Inter Partes Review of U.S. Pat. No. 9,219,460, IPR2021-00475, Jun. 13, 2022, 117 pages.
*Google LLC* v. *Sonos, Inc*., Deposition of Jeffrey S. Vipperman, Ph. D. Exhibit 2017 in Patent Owner Response to Petition for Inter Partes Review of U.S. Pat. No. 9,219,460, IPR2021-00475, Jun. 13, 2022, 183 pages.
*Google LLC* v. *Sonos, Inc*., File History of U.S. Appl. No. 61/601,529 Maher. Exhibit 2018 in Patent Owner Response to Petition for Inter Partes Review of U.S. Pat. No. 9,219,460, IPR2021-00475, Jun. 13, 2022, 14 pages.
*Google LLC* v. *Sonos, Inc*., Judgment. Final Written Decision Determining All Challenged Claims Unpatentable for IPR of U.S. Pat. No. 9,219,460, IPR2021-00475, Feb. 15, 2023, 45 pages.
*Google LLC* v. *Sonos, Inc*., Patent Owner Response to Petition for Inter Partes Review of U.S. Pat. No. 9,219,460, IPR2021-00475, Jun. 13, 2022, 49 pages.
*Google LLC* v. *Sonos, Inc*., Patent Owner Sur-Reply to Petitioner's Reply for Inter Partes Review of U.S. Pat. No. 9,219,460, IPR2021-00475, Oct. 12, 2022, 32 pages.
*Google LLC* v. *Sonos, Inc*., Petition for IPR of U.S. Pat. No. 9,219,460, IPR2021-00475, Feb. 5, 2021, 88 pages.
*Google LLC* v. *Sonos, Inc*., Petitioner's Reply for Inter Partes Review of U.S. Pat. No. 9,219,460, IPR2021-00475, Sep. 6, 2022, 30 pages.
*Google LLC* v. *Sonos, Inc*., Record of Oral Hearing for IPR of U.S. Pat. No. 9,219,460, IPR2021-00475, Dec. 14, 2022, 60 pages.
Indian Patent Office, Examination Report mailed on Feb. 28, 2024, issued in connection with Indian Patent Application No. 201847035625, 3 pages.
Indian Patent Office, Examination Report mailed on Dec. 5, 2023, issued in connection with Indian Patent Application No. 201847035625, 3 pages.
International Bureau, International Preliminary Report on Patentability and Written Opinion, mailed on Jan. 15, 2019, issued in connection with International Application No. PCT/US2017/042191, filed on Jul. 14, 2017, 10 pages.
International Bureau, International Preliminary Report on Patentability and Written Opinion, mailed on Mar. 20, 2018, issued in connection with International Application No. PCT/US2016/052264, filed on Sep. 16, 2016, 10 pages.
International Bureau, International Preliminary Report on Patentability and Written Opinion, mailed on Mar. 20, 2018, issued in connection with International Application No. PCT/US2016/052266, filed on Sep. 16, 2016, 7 pages.
International Bureau, International Preliminary Report on Patentability and Written Opinion, mailed on Dec. 22, 2022, issued in connection with International Application No. PCT/US2021/036386, filed on Jun. 8, 2021, 8 pages.
International Bureau, International Preliminary Report on Patentability and Written Opinion, mailed on Jan. 23, 2018, issued in connection with International Application No. PCT/US2016/043109, filed on Jul. 20, 2016, 7 pages.
International Bureau, International Preliminary Report on Patentability and Written Opinion, mailed on Jan. 23, 2018, issued in connection with International Application No. PCT/US2016/043116, filed on Jul. 20, 2016, 8 pages.

(56) References Cited

OTHER PUBLICATIONS

International Bureau, International Preliminary Report on Patentability and Written Opinion, mailed on Oct. 24, 2017, issued in connection with International Application No. PCT/US2016/028997, filed on Apr. 22, 2016, 7 pages.
International Bureau, International Preliminary Report on Patentability and Written Opinion, mailed on Apr. 6, 2023, issued in connection with International Application No. PCT/US2021/071598, filed on Sep. 25, 2021, 8 pages.
International Bureau, International Preliminary Report on Patentability and Written Opinion, mailed on Jan. 9, 2018, issued in connection with International Application No. PCT/US2016/041179, filed on Jul. 6, 2016, 6 pages.
International Bureau, International Preliminary Report on Patentability, mailed on Dec. 1, 2022, issued in connection with International Application No. PCT/US2021/070524, filed on May 10, 2021, 9 pages.
International Bureau, International Preliminary Report on Patentability, mailed on Apr. 11, 2024, issued in connection with International Application No. PCT/US2022/077107, filed on Sep. 27, 2022, 9 pages.
International Bureau, International Preliminary Report on Patentability, mailed on Mar. 2, 2021, issued in connection with International Application No. PCT/US2019/048366, filed on Aug. 27, 2019, 7 pages.
International Bureau, International Preliminary Report on Patentability, mailed on Mar. 2, 2021, issued in connection with International Application No. PCT/US2019/048569, filed on Aug. 28, 2019, 11 pages.
International Bureau, International Preliminary Report on Patentability, mailed on Aug. 22, 2024, issued in connection with International Application No. PCT/US2023/062179, filed on Feb. 8, 2023, 8 pages.
International Bureau, International Preliminary Report on Patentability, mailed on Sep. 24, 2015, issued in connection with International Application No. PCT/US2014/030560, filed on Mar. 17, 2014, 7 pages.
International Bureau, International Preliminary Report on Patentability mailed on Sep. 29, 2016, issued in connection with International Application No. PCT/US2015/020993, filed on Mar. 17, 2015, 8 pages.
International Bureau, International Preliminary Report on Patentability mailed on Sep. 29, 2016, issued in connection with International Application No. PCT/US2015/021000, filed on Mar. 17, 2015, 9 pages.
International Bureau, International Preliminary Report on Patentability, mailed on Apr. 4, 2024, issued in connection with International Application No. PCT/US2022/076972, filed on Sep. 23, 2022, 14 pages.
International Bureau, International Preliminary Report on Patentability, mailed on Aug. 9, 2018, issued in connection with International Application No. PCT/US2017/014596, filed on Jan. 23, 2017, 11 pages.
International Bureau, International Search Report and Written Opinion mailed on Dec. 15, 2020, issued in connection with International Application No. PCT/US2020/045746, filed on Aug. 11, 2020, 23 pages.
International Bureau, International Search Report and Written Opinion mailed on Dec. 19, 2022, issued in connection with International Application No. PCT/US2022/077107, filed on Sep. 27, 2022, 13 pages.
International Bureau, International Search Report and Written Opinion mailed on Mar. 23, 2023, issued in connection with International Application No. PCT/US2022/076972, filed on Sep. 23, 2022, 20 pages.
International Bureau, International Search Report and Written Opinion mailed on Apr. 25, 2023, issued in connection with International Application No. PCT/US2023/062179, filed on Feb. 8, 2023, 11 pages.
International Bureau, International Search Report and Written Opinion mailed on Nov. 25, 2019, issued in connection with International Application No. PCT/US2019/048569, filed on Aug. 28, 2019, 13 pages.
International Bureau, International Search Report and Written Opinion mailed on Nov. 7, 2019, issued in connection with International Application No. PCT/US2019/048366, filed on Aug. 27, 2019, 9 pages.
International Searching Authority, International Preliminary Report on Patentability mailed on Mar. 23, 2017, issued in connection with International Patent Application No. PCT/US2015/048944, filed on Sep. 8, 2015, 8 pages.
International Searching Authority, International Preliminary Report on Patentability mailed on Oct. 24, 2017, issued in connection with International Application No. PCT/US2016/028994 filed on Apr. 22, 2016, 7 pages.
International Searching Authority, International Search Report and Written Opinion mailed on Jul. 4, 2016, issued in connection with International Application No. PCT/US2016/028994, filed on Apr. 22, 2016, 12 pages.
International Searching Authority, International Search Report and Written Opinion mailed on Jul. 5, 2016, issued in connection with International Application No. PCT/US2016/028997, filed on Apr. 22, 2016, 13 pages.
International Searching Authority, International Search Report and Written Opinion mailed on Jun. 5, 2015, issued in connection with International Application No. PCT/US2015/021000, filed on Mar. 17, 2015, 12 pages.
International Searching Authority, International Search Report and Written Opinion mailed on Oct. 12, 2016, issued in connection with International Application No. PCT/US2016/041179 filed on Jul. 6, 2016, 9 pages.
International Searching Authority, International Search Report and Written Opinion mailed on Jun. 16, 2015, issued in connection with International Application No. PCT/US2015/020993, filed on Mar. 17, 2015, 11 pages.
International Searching Authority, International Search Report and Written Opinion mailed on Nov. 18, 2015, issued in connection with International Application No. PCT/US2015/048954, filed on Sep. 8, 2015, 11 pages.
International Searching Authority, International Search Report and Written Opinion mailed on Oct. 18, 2016, issued in connection with International Application No. PCT/US2016/043116, filed on Jul. 20, 2016, 14 pages.
International Searching Authority, International Search Report and Written Opinion mailed on Oct. 18, 2016, issued in connection with International Application No. PCT/US2016/043840, filed on Jul. 25, 2016, 14 pages.
Notice of Allowance mailed on Apr. 26, 2023, issued in connection with U.S. Appl. No. 18/058,667, filed Nov. 23, 2022, 8 pages.
Notice of Allowance mailed on Dec. 26, 2023, issued in connection with U.S. Appl. No. 18/066,077, filed Dec. 14, 2022, 6 pages.
Notice of Allowance mailed on Dec. 26, 2024, issued in connection with U.S. Appl. No. 17/532,744, filed Nov. 22, 2021, 10 pages.
Notice of Allowance mailed on Feb. 26, 2016, issued in connection with U.S. Appl. No. 14/921,762, filed Oct. 23, 2015, 7 pages.
Notice of Allowance mailed on Jul. 26, 2016, issued in connection with U.S. Appl. No. 14/481,511, filed Sep. 9, 2014, 12 pages.
Notice of Allowance mailed on Mar. 26, 2025, issued in connection with U.S. Appl. No. 18/048,034, filed Oct. 20, 2022, 08 pages.
Notice of Allowance mailed on May 26, 2023, issued in connection with U.S. Appl. No. 18/060,176, filed Nov. 30, 2023, 10 pages.
Notice of Allowance mailed on Oct. 26, 2016, issued in connection with U.S. Appl. No. 14/811,587, filed Jul. 28, 2015, 11 pages.
Notice of Allowance mailed on Sep. 26, 2024, issued in connection with U.S. Appl. No. 17/932,715, filed Sep. 16, 2022, 9 pages.
Notice of Allowance mailed on Feb. 27, 2017, issued in connection with U.S. Appl. No. 14/805,340, filed Jul. 21, 2015, 9 pages.
Notice of Allowance mailed on Feb. 27, 2023, issued in connection with U.S. Appl. No. 17/107,157, filed Nov. 30, 2020, 13 pages.
Notice of Allowance mailed on Jul. 27, 2017, issued in connection with U.S. Appl. No. 15/005,853, filed Jan. 25, 2016, 5 pages.

(56) References Cited

OTHER PUBLICATIONS

Notice of Allowance mailed on Jun. 27, 2017, issued in connection with U.S. Appl. No. 15/344,069, filed Nov. 4, 2016, 8 pages.
Notice of Allowance mailed on Mar. 27, 2024, issued in connection with U.S. Appl. No. 18/061,570, filed Dec. 5, 2022, 8 pages.
Notice of Allowance mailed on Oct. 27, 2020, issued in connection with U.S. Appl. No. 16/555,832, filed Aug. 29, 2019, 5 pages.
Notice of Allowance mailed on Oct. 27, 2021, issued in connection with U.S. Appl. No. 17/135,293, filed Dec. 28, 2020, 11 pages.
Notice of Allowance mailed on Aug. 28, 2017, issued in connection with U.S. Appl. No. 15/089,004, filed Apr. 1, 2016, 5 pages.
Notice of Allowance mailed on Aug. 28, 2024, issued in connection with U.S. Appl. No. 18/432,733, filed Feb. 5, 2024, 10 pages.
Notice of Allowance mailed on Feb. 28, 2024, issued in connection with U.S. Appl. No. 16/989,350, filed Aug. 10, 2020, 9 pages.
Notice of Allowance mailed on Jul. 28, 2017, issued in connection with U.S. Appl. No. 14/678,263, filed Apr. 3, 2015, 10 pages.
Notice of Allowance mailed on Jul. 28, 2017, issued in connection with U.S. Appl. No. 15/211,822, filed Jul. 15, 2016, 9 pages.
Notice of Allowance mailed on Jun. 28, 2023, issued in connection with U.S. Appl. No. 18/189,876, filed Mar. 24, 2023, 20 pages.
Notice of Allowance mailed on Mar. 28, 2018, issued in connection with U.S. Appl. No. 15/673,170, filed Aug. 9, 2017, 5 pages.
Notice of Allowance mailed on Mar. 28, 2023, issued in connection with U.S. Appl. No. 18/058,659, filed Nov. 23, 2022, 10 pages.
Notice of Allowance mailed on Mar. 28, 2024, issued in connection with U.S. Appl. No. 18/316,400, filed May 12, 2023, 8 pages.
Notice of Allowance mailed on Oct. 28, 2024, issued in connection with U.S. Appl. No. 18/460,141, filed Sep. 1, 2023, 2 pages.
Notice of Allowance mailed on Aug. 29, 2018, issued in connection with U.S. Appl. No. 15/357,520, filed Nov. 21, 2016, 11 pages.
Notice of Allowance mailed on Aug. 29, 2018, issued in connection with U.S. Appl. No. 15/718,556, filed Sep. 28, 2017, 8 pages.
Notice of Allowance mailed on Aug. 29, 2019, issued in connection with U.S. Appl. No. 16/185,906, filed Nov. 9, 2018, 8 pages.
Notice of Allowance mailed on Aug. 29, 2023, issued in connection with U.S. Appl. No. 17/804,372, filed May 27, 2022, 9 pages.
Notice of Allowance mailed on Dec. 29, 2017, issued in connection with U.S. Appl. No. 14/793,205, filed Jul. 7, 2015, 5 pages.
Notice of Allowance mailed on Jul. 29, 2016, issued in connection with U.S. Appl. No. 14/481,522, filed Sep. 9, 2014, 11 pages.
Notice of Allowance mailed on Jul. 29, 2024, issued in connection with U.S. Appl. No. 18/459,982, filed Sep. 1, 2023, 08 pages.
Notice of Allowance mailed on Mar. 29, 2023, issued in connection with U.S. Appl. No. 17/807,595, filed Jun. 17, 2022, 6 pages.
Notice of Allowance mailed on Oct. 29, 2015, issued in connection with U.S. Appl. No. 14/216,306, filed Mar. 17, 2014, 9 pages.
Notice of Allowance mailed on Sep. 29, 2021, issued in connection with U.S. Appl. No. 17/207,640, filed Mar. 20, 2021, 13 pages.
Notice of Allowance mailed on Jan. 3, 2024, issued in connection with U.S. Appl. No. 17/524,377, filed Nov. 11, 2021, 9 pages.
Notice of Allowance mailed on Jul. 3, 2024, issued in connection with U.S. Appl. No. 18/507,713, filed Nov. 13, 2023, 11 pages.
Notice of Allowance mailed on Mar. 3, 2021, issued in connection with U.S. Appl. No. 16/403,077, filed May 3, 2019, 6 pages.
Notice of Allowance mailed on Mar. 3, 2021, issued in connection with U.S. Appl. No. 17/078,382, filed Oct. 23, 2020, 9 pages.
Notice of Allowance mailed on Mar. 3, 2022, issued in connection with U.S. Appl. No. 17/135,308, filed Dec. 28, 2020, 7 pages.
Notice of Allowance mailed on May 3, 2019, issued in connection with U.S. Appl. No. 15/217,399, filed Jul. 22, 2016, 7 pages.
Notice of Allowance mailed on May 3, 2019, issued in connection with U.S. Appl. No. 16/181,583, filed Nov. 6, 2018, 7 pages.
Notice of Allowance mailed on May 3, 2024, issued in connection with U.S. Appl. No. 18/331,580, filed Jun. 8, 2023, 7 pages.
Notice of Allowance mailed on Aug. 30, 2017, issued in connection with U.S. Appl. No. 15/088,994, filed Apr. 1, 2016, 10 pages.
Notice of Allowance mailed on Dec. 30, 2016, issued in connection with U.S. Appl. No. 14/696,014, filed Apr. 24, 2015, 13 pages.
Notice of Allowance mailed on Jan. 30, 2017, issued in connection with U.S. Appl. No. 15/339,260, filed Oct. 31, 2016, 8 pages.
Notice of Allowance mailed on Aug. 31, 2018, issued in connection with U.S. Appl. No. 15/872,979, filed Jan. 16, 2018, 7 pages.
Notice of Allowance mailed on Aug. 31, 2018, issued in connection with U.S. Appl. No. 16/055,884, filed Aug. 6, 2018, 8 pages.
Notice of Allowance mailed on Aug. 31, 2021, issued in connection with U.S. Appl. No. 16/944,884, filed Jul. 31, 2020, 8 pages.
Chinese Patent Office, First Office Action and Translation mailed on Dec. 24, 2020, issued in connection with Chinese Application No. 201910978233.1, 15 pages.
Chinese Patent Office, First Office Action and Translation mailed on Jan. 28, 2021, issued in connection with Chinese Application No. 201680054164.X, 19 pages.
Chinese Patent Office, First Office Action and Translation mailed on Jun. 29, 2020, issued in connection with Chinese Application No. 201780057093.3, 11 pages.
Chinese Patent Office, First Office Action and Translation mailed on Feb. 3, 2021, issued in connection with Chinese Application No. 202010095178.4, 15 pages.
Chinese Patent Office, First Office Action and Translation mailed on Aug. 4, 2020, issued in connection with Chinese Application No. 201910395715.4, 22 pages.
Chinese Patent Office, First Office Action mailed on Aug. 11, 2017, issued in connection with Chinese Patent Application No. 201580013837.2, 8 pages.
Chinese Patent Office, First Office Action mailed on Nov. 20, 2018, issued in connection with Chinese Application No. 201580047998.3, 21 pages.
Chinese Patent Office, First Office Action mailed on Sep. 25, 2017, issued in connection with Chinese Patent Application No. 201580013894.0, 9 pages.
Chinese Patent Office, First Office Action mailed on Nov. 5, 2018, issued in connection with Chinese Application No. 201680044080.8, 5 pages.
Chinese Patent Office, Office Action mailed on Nov. 14, 2019, issued in connection with Chinese Application No. 201680040086.8, 9 pages.
Chinese Patent Office, Second Office Action and Translation mailed on Aug. 26, 2019, issued in connection with Chinese Application No. 201580047998.3, 25 pages.
Chinese Patent Office, Second Office Action mailed on Jan. 11, 2019, issued in connection with Chinese Application No. 201680044080.8, 4 pages.
Chinese Patent Office, Second Office Action mailed on Feb. 3, 2019, issued in connection with Chinese Application No. 201580048594.6, 11 pages.
Chinese Patent Office, Second Office Action mailed on May 6, 2020, issued in connection with Chinese Application No. 201680040086.8, 3 pages.
Chinese Patent Office, Second Office Action with Translation mailed on Jan. 9, 2018, issued in connection with Chinese Patent Application No. 201580013837.2, 10 pages.
Chinese Patent Office, Third Office Action mailed on Apr. 11, 2019, issued in connection with Chinese Application No. 201580048594.6, 4 pages.
Cho N., et al., "Voice Activation System Using Acoustic Event Detection and Keyword/speaker Recognition," 2011 IEEE International Conference on Consumer Electronics (ICCE), Las Vegas, NV, USA, 2011, pp. 21-22.
"Constellation Acoustic System: a revolutionary breakthrough in acoustical design," Meyer Sound Laboratories, Inc. 2012, 32 pages.
"Constellation Microphones," Meyer Sound Laboratories, Inc. 2013, 2 pages.
Corrected Notice of Allowability mailed on Jan. 19, 2017, issued in connection with U.S. Appl. No. 14/826,873, filed Aug. 14, 2015, 11 pages.
Corrected Notice of Allowance mailed on Sep. 5, 2025, issued in connection with U.S. Appl. No. 17/222,950, filed Apr. 5, 2021, 03 pages.
Corrected Notice of Allowance mailed on Jun. 17, 2025, issued in connection with U.S. Appl. No. 17/340,590, filed Jun. 7, 2021, 9 pages.

(56) References Cited

OTHER PUBLICATIONS

Corrected Notice of Allowance mailed on Dec. 20, 2024, issued in connection with U.S. Appl. No. 17/450,925, filed Oct. 14, 2021, 05 pages.
Corrected Notice of Allowance mailed on Dec. 20, 2024, issued in connection with U.S. Appl. No. 18/410,120, filed Jan. 11, 2024, 05 pages.
Daddy, B., "Calibrating Your Audio with a Sound Pressure Level (SPL) Meter," Blue-ray.com, Feb. 22, 2008 Retrieved Oct. 10, 2014, 15 pages.
European Patent Office, European EPC Article 94.3 and Rule 164(2)(b) mailed on Nov. 23, 2023, issued in connection with European Application No. 20761443.9, 15 pages.
European Patent Office, European EPC Article 94.3 mailed on Jan. 10, 2024, issued in connection with European Application No. 20757152.2, 6 pages.
European Patent Office, European EPC Article 94.3 mailed on Oct. 14, 2025, issued in connection with European Application No. 22797948.1, 12 pages.
European Patent Office, European EPC Article 94.3 mailed on Aug. 16, 2021, issued in connection with European Application No. 19765920.4, 5 pages.
European Patent Office, European EPC Article 94.3 mailed on Dec. 18, 2023, issued in connection with European Application No. 21703134.3, 7 pages.
European Patent Office, European EPC Article 94.3 mailed on Dec. 19, 2024, issued in connection with European Application No. 22153523, 4 pages.
European Patent Office, European EPC Article 94.3 mailed on Feb. 2, 2024, issued in connection with European Application No. 21171959.6, 9 pages.
European Patent Office, European EPC Article 94.3 mailed on Feb. 21, 2025, issued in connection with European Application No. 21703134.3, 7 pages.
European Patent Office, European EPC Article 94.3 mailed on Jan. 21, 2025, issued in connection with European Application No. 23188226.7, 11 pages.
European Patent Office, European EPC Article 94.3 mailed on Jul. 22, 2024, issued in connection with European Application No. 23188226.7, 9 pages.
European Patent Office, European EPC Article 94.3 mailed on Dec. 23, 2021, issued in connection with European Application No. 19197116.7, 5 pages.
European Patent Office, European EPC Article 94.3 mailed on Jan. 24, 2024, issued in connection with European Application No. 21180778.9, 8 pages.
European Patent Office, European EPC Article 94.3 mailed on Jan. 27, 2025, issued in connection with European Application No. 19780508.8, 5 pages.
European Patent Office, European EPC Article 94.3 mailed on Nov. 27, 2023, issued in connection with European Application No. 19780508.8, 7 pages.
European Patent Office, European EPC Article 94.3 mailed on Feb. 28, 2024, issued in connection with European Application No. 18306501, 7 pages.
European Patent Office, European EPC Article 94.3 mailed on Nov. 28, 2023, issued in connection with European Application No. 19731415.6, 9 pages.
European Patent Office, European EPC Article 94.3 mailed on Apr. 29, 2024, issued in connection with European Application No. 21195031.6, 4 pages.
European Patent Office, European EPC Article 94.3 mailed on Oct. 29, 2021, issued in connection with European Application No. 20196286.7, 5 pages.
European Patent Office, European EPC Article 94.3 mailed on Feb. 3, 2023, issued in connection with European Application No. 19765920.4, 5 pages.
European Patent Office, European EPC Article 94.3 mailed on Apr. 30, 2021, issued in connection with European Application No. 20196286.7, 5 pages.
European Patent Office, European EPC Article 94.3 mailed on Jun. 4, 2024, issued in connection with European Application No. 21180778.9, 5 pages.
European Patent Office, European EPC Article 94.3 mailed on Feb. 5, 2025, issued in connection with European Application No. 20842825, 8 pages.
European Patent Office, European EPC Article 94.3 mailed on Mar. 7, 2025, issued in connection with European Application No. 20185599.6, 6 pages.
European Patent Office, European Examination Report mailed on May 11, 2018, issued in connection with European Application No. 16748186.0, 6 pages.
European Patent Office, European Extended Search Report mailed on Dec. 6, 2024, issued in connection with European Application No. 24174559.5, 12 pages.
Notice of Allowance mailed on Oct. 2, 2023, issued in connection with U.S. Appl. No. 18/189,869, filed Mar. 24, 2023, 8 pages.
Notice of Allowance mailed on Sep. 2, 2021, issued in connection with U.S. Appl. No. 17/357,302, filed Jun. 24, 2021, 10 pages.
Notice of Allowance mailed on Apr. 20, 2017, issued in connection with U.S. Appl. No. 14/940,779, filed Nov. 13, 2015, 11 pages.
Notice of Allowance mailed on Apr. 20, 2022, issued in connection with U.S. Appl. No. 17/098,134, filed Nov. 13, 2020, 5 pages.
Notice of Allowance mailed on Nov. 20, 2017, issued in connection with U.S. Appl. No. 15/298,115, filed Oct. 19, 2016, 10 pages.
Notice of Allowance mailed on Sep. 20, 2017, issued in connection with U.S. Appl. No. 14/481,514, filed Sep. 9, 2014, 10 pages.
Notice of Allowance mailed on Dec. 21, 2016, issued in connection with U.S. Appl. No. 14/682,182, filed Apr. 9, 2015, 8 pages.
Notice of Allowance mailed on Feb. 21, 2018, issued in connection with U.S. Appl. No. 15/005,853, filed Jan. 25, 2016, 5 pages.
Notice of Allowance mailed on Jul. 21, 2017, issued in connection with U.S. Appl. No. 15/211,835, filed Jul. 15, 2016, 10 pages.
Notice of Allowance mailed on Jun. 21, 2019, issued in connection with U.S. Appl. No. 15/235,598, filed Aug. 12, 2016, 11 pages.
Notice of Allowance mailed on Jun. 21, 2023, issued in connection with U.S. Appl. No. 17/556,426, filed Dec. 20, 2021, 8 pages.
Notice of Allowance mailed on May 21, 2025, issued in connection with U.S. Appl. No. 18/404,254, filed Jan. 4, 2024, 2 pages.
Notice of Allowance mailed on Oct. 21, 2019, issued in connection with U.S. Appl. No. 16/182,886, filed Nov. 7, 2018, 10 pages.
Notice of Allowance mailed on Oct. 21, 2024, issued in connection with U.S. Appl. No. 18/503,971, filed Nov. 7, 2023, 7 pages.
Notice of Allowance mailed on Sep. 21, 2023, issued in connection with U.S. Appl. No. 17/567,311, filed Jan. 3, 2022, 8 pages.
Notice of Allowance mailed on Apr. 22, 2021, issued in connection with U.S. Appl. No. 16/812,618, filed Mar. 9, 2020, 12 pages.
Notice of Allowance mailed on Aug. 22, 2025, issued in connection with U.S. Appl. No. 17/222,950, filed Apr. 5, 2021, 07 pages.
Notice of Allowance mailed on Feb. 22, 2021, issued in connection with U.S. Appl. No. 16/944,884, filed Jul. 31, 2020, 9 pages.
Notice of Allowance mailed on Jun. 22, 2017, issued in connection with U.S. Appl. No. 14/644,136, filed Mar. 10, 2015, 12 pages.
Notice of Allowance mailed on Jun. 22, 2023, issued in connection with U.S. Appl. No. 17/407,793, filed Aug. 20, 2021, 10 pages.
Notice of Allowance mailed on Mar. 22, 2023, issued in connection with U.S. Appl. No. 17/662,282, filed May 6, 2022, 5 pages.
Notice of Allowance mailed on Oct. 22, 2025, issued in connection with U.S. Appl. No. 18/410,328, filed Jan. 11, 2024, 05 pages.
Notice of Allowance mailed on Aug. 23, 2018, issued in connection with U.S. Appl. No. 15/909,529, filed Mar. 1, 2018, 8 pages.
Notice of Allowance mailed on Aug. 23, 2023, issued in connection with U.S. Appl. No. 18/308,016, filed Apr. 27, 2023, 13 pages.
Notice of Allowance mailed on Feb. 23, 2021, issued in connection with U.S. Appl. No. 16/115,525, filed Aug. 28, 2018, 8 pages.
Notice of Allowance mailed on Jan. 23, 2025, issued in connection with U.S. Appl. No. 18/595,934, filed Mar. 5, 2024, 11 Pages.
Notice of Allowance mailed on Jun. 23, 2016, issued in connection with U.S. Appl. No. 14/921,781, filed Oct. 23, 2015, 8 pages.
Notice of Allowance mailed on Mar. 23, 2020, issued in connection with U.S. Appl. No. 16/542,418, filed Aug. 16, 2019, 5 pages.
Notice of Allowance mailed on May 23, 2018, issued in connection with U.S. Appl. No. 15/698,283, filed Sep. 7, 2017, 8 pages.

(56) References Cited

OTHER PUBLICATIONS

Notice of Allowance mailed on Nov. 23, 2020, issued in connection with U.S. Appl. No. 16/403,077, filed May 3, 2019, 6 pages.
Notice of Allowance mailed on Oct. 23, 2017, issued in connection with U.S. Appl. No. 14/481,522, filed Sep. 9, 2014, 16 pages.
Notice of Allowance mailed on Oct. 23, 2020, issued in connection with U.S. Appl. No. 16/555,846, filed Aug. 29, 2019, 5 pages.
Notice of Allowance mailed on Oct. 23, 2024, issued in connection with U.S. Appl. No. 17/650,441, filed Feb. 9, 2022, 16 pages.
Notice of Allowance mailed on Sep. 23, 2016, issued in connection with U.S. Appl. No. 15/070,160, filed Mar. 15, 2016, 7 pages.
Notice of Allowance mailed on Sep. 23, 2022, issued in connection with U.S. Appl. No. 17/373,179, filed Jul. 12, 2021, 5 pages.
Notice of Allowance mailed on Sep. 23, 2024, issued in connection with U.S. Appl. No. 18/313,013, filed May 5, 2023, 9 pages.
Notice of Allowance mailed on Jul. 24, 2019, issued in connection with U.S. Appl. No. 15/229,693, filed Aug. 5, 2016, 13 pages.
Notice of Allowance mailed on Jul. 24, 2020, issued in connection with U.S. Appl. No. 16/665,415, filed Oct. 28, 2019, 12 pages.
Notice of Allowance mailed on Jul. 24, 2024, issued in connection with U.S. Appl. No. 18/456,941, filed Aug. 28, 2023, 11 pages.
Notice of Allowance mailed on Jun. 24, 2025, issued in connection with U.S. Appl. No. 18/410,407, filed Jan. 11, 2024, 11 pages.
Notice of Allowance mailed on May 24, 2017, issued in connection with U.S. Appl. No. 14/997,868, filed Jan. 18, 2016, 5 pages.
Notice of Allowance mailed on May 24, 2024, issued in connection with U.S. Appl. No. 18/154,228, filed Jan. 13, 2023, 8 pages.
Notice of Allowance mailed on Nov. 24, 2017, issued in connection with U.S. Appl. No. 15/681,640, filed Aug. 21, 2017, 8 pages.
Notice of Allowance mailed on Nov. 24, 2023, issued in connection with U.S. Appl. No. 18/070,024, filed Nov. 28, 2022, 7 pages.
Notice of Allowance mailed on Apr. 25, 2017, issued in connection with U.S. Appl. No. 14/696,014, filed Apr. 24, 2015, 7 pages.
Notice of Allowance mailed on Apr. 25, 2017, issued in connection with U.S. Appl. No. 15/207,682, filed Jul. 12, 2016, 7 pages.
Notice of Allowance mailed on Apr. 25, 2019, issued in connection with U.S. Appl. No. 15/806,126, filed Nov. 7, 2017, 8 pages.
Notice of Allowance mailed on Jan. 25, 2021, issued in connection with U.S. Appl. No. 17/129,670, filed Dec. 21, 2020, 10 pages.
Notice of Allowance mailed on Mar. 25, 2025, issued in connection with U.S. Appl. No. 18/404,254, filed Jan. 4, 2024, 10 pages.
Notice of Allowance mailed on Oct. 25, 2016, issued in connection with U.S. Appl. No. 14/826,873, filed Aug. 14, 2015, 5 pages.
Notice of Allowance mailed on Jul. 31, 2024, issued in connection with U.S. Appl. No. 18/192,452, filed Mar. 29, 2023, 8 pages.
Notice of Allowance mailed on Jul. 31, 2024, issued in connection with U.S. Appl. No. 18/453,052, filed Aug. 21, 2023, 9 pages.
Notice of Allowance mailed on Mar. 31, 2020, issued in connection with U.S. Appl. No. 16/538,629, filed Aug. 12, 2019, 9 pages.
Notice of Allowance mailed on Apr. 4, 2017, issued in connection with U.S. Appl. No. 14/682,182, filed Apr. 9, 2015, 8 pages.
Notice of Allowance mailed on Feb. 4, 2019, issued in connection with U.S. Appl. No. 15/166,241, filed Aug. 26, 2016, 8 pages.
Notice of Allowance mailed on Feb. 4, 2019, issued in connection with U.S. Appl. No. 16/181,583, filed Nov. 6, 2018, 9 pages.
Notice of Allowance mailed on Feb. 4, 2020, issued in connection with U.S. Appl. No. 16/416,619, filed May 20, 2019, 7 pages.
Notice of Allowance mailed on Jan. 4, 2024, issued in connection with U.S. Appl. No. 17/493,430, filed Oct. 4, 2021, 9 pages.
Notice of Allowance mailed on Nov. 4, 2021, issued in connection with U.S. Appl. No. 16/665,154, filed Oct. 28, 2019, 8 pages.
Notice of Allowance mailed on Oct. 4, 2018, issued in connection with U.S. Appl. No. 15/166,241, filed May 26, 2016, 7 pages.
Notice of Allowance mailed on Apr. 5, 2018, issued in connection with U.S. Appl. No. 15/681,640, filed Aug. 21, 2017, 8 pages.
Notice of Allowance mailed on Apr. 5, 2023, issued in connection with U.S. Appl. No. 17/562,465, filed Dec. 27, 2021, 10 pages.
Notice of Allowance mailed on Apr. 5, 2024, issued in connection with U.S. Appl. No. 18/448,502, filed Aug. 11, 2023, 7 pages.
Notice of Allowance mailed on Feb. 5, 2021, issued in connection with U.S. Appl. No. 16/827,143, filed Mar. 23, 2020, 9 pages.
Notice of Allowance mailed on Jun. 5, 2019, issued in connection with U.S. Appl. No. 15/859,311, filed Dec. 29, 2017, 8 pages.
Notice of Allowance mailed on Jun. 5, 2019, issued in connection with U.S. Appl. No. 15/865,221, filed Jan. 8, 2018, 8 pages.
Notice of Allowance mailed on Mar. 5, 2019, issued in connection with U.S. Appl. No. 16/102,499, filed Aug. 13, 2018, 8 pages.
Notice of Allowance mailed on May 5, 2017, issued in connection with U.S. Appl. No. 14/826,873, filed Aug. 14, 2015, 5 pages.
Notice of Allowance mailed on May 5, 2022, issued in connection with U.S. Appl. No. 17/316,371, filed May 10, 2021, 10 pages.
Notice of Allowance mailed on Oct. 5, 2018, issued in connection with U.S. Appl. No. 16/115,524, filed Aug. 28, 2018, 10 pages.
Notice of Allowance mailed on Aug. 6, 2020, issued in connection with U.S. Appl. No. 16/564,684, filed Sep. 9, 2019, 8 pages.
Notice of Allowance mailed on Feb. 6, 2019, issued in connection with U.S. Appl. No. 15/996,878, filed Jun. 4, 2018, 8 pages.
Notice of Allowance mailed on Aug. 7, 2024, issued in connection with U.S. Appl. No. 18/478,241, filed Sep. 29, 2023, 10 pages.
Notice of Allowance mailed on Jun. 7, 2024, issued in connection with U.S. Appl. No. 18/316,434, filed May 12, 2023, 9 pages.
Notice of Allowance mailed on Apr. 8, 2019, issued in connection with U.S. Appl. No. 16/011,402, filed Jun. 18, 2018, 8 pages.
Notice of Allowance mailed on Jul. 8, 2019, issued in connection with U.S. Appl. No. 15/856,791, filed Dec. 28, 2017, 5 pages.
Notice of Allowance mailed on Jun. 8, 2020, issued in connection with U.S. Appl. No. 16/658,896, filed Oct. 21, 2019, 8 pages.
Notice of Allowance mailed on Jun. 8, 2021, issued in connection with U.S. Appl. No. 17/104,466, filed Nov. 25, 2020, 8 pages.
Notice of Allowance mailed on Mar. 8, 2024, issued in connection with U.S. Appl. No. 17/135,173, filed Dec. 28, 2020, 9 pages.
Notice of Allowance mailed on May 8, 2018, issued in connection with U.S. Appl. No. 15/650,386, filed Jul. 14, 2017, 13 pages.
Notice of Allowance mailed on Apr. 9, 2020, issued in connection with U.S. Appl. No. 16/416,593, filed May 20, 2019, 9 pages.
Notice of Allowance mailed on Jun. 9, 2020, issued in connection with U.S. Appl. No. 15/966,534, filed Apr. 30, 2018, 16 pages.
Notice of Allowance mailed on May 9, 2019, issued in connection with U.S. Appl. No. 15/996,878, filed Jun. 4, 2018, 7 pages.
Notice of Allowance mailed on Apr. 19, 2017, issued in connection with U.S. Appl. No. 14/481,511, filed Sep. 9, 2014, 10 pages.
Papp Istvan et al. "Adaptive Microphone Array for Unknown Desired Speaker's Transfer Function", The Journal of the Acoustical Society of America, American Institute of Physics for the Acoustical Society of America, New York, NY vol. 122, No. 2, Jul. 19, 2007, pp. 44-49.
Pre-Brief Appeal Conference Decision mailed on Mar. 19, 2019, issued in connection with U.S. Appl. No. 15/806,126, filed Nov. 7, 2017, 2 pages.
Preinterview First Office Action mailed on Oct. 6, 2016, issued in connection with U.S. Appl. No. 14/726,921, filed Jun. 1, 2015, 6 pages.
Preinterview First Office Action mailed on Jul. 12, 2017, issued in connection with U.S. Appl. No. 14/793,205, filed Jul. 7, 2015, 5 pages.
Preinterview First Office Action mailed on May 17, 2016, issued in connection with U.S. Appl. No. 14/481,505, filed Sep. 9, 2014, 7 pages.
Preinterview First Office Action mailed on May 25, 2016, issued in connection with U.S. Appl. No. 14/481,514, filed Sep. 9, 2014, 7 pages.
PRISMIQ, Inc., "PRISMIQ Media Player User Guide," 2003, 44 pages.
Rosenblatt, Jonathan et al. On the Optimality of Averaging in Distributed Statistical Learning. Information and Inference, Department of Computer Science and Applied Mathematics, Weizmann Institute of Science, vol. 5, No. 4, Jun. 16, 2015, 30 pages. Retrieved from the Internet: URL:https://arxiv.org/pdf/1407.2724.pdf.
Ross, Alex, "Wizards of Sound: Retouching acoustics, from the restaurant to the concert hall," The New Yorker, Feb. 23, 2015. Web. Feb. 26, 2015, 9 pages.

(56) References Cited

OTHER PUBLICATIONS

Rubenson, Aaron. Voice Interoperability Initiative Welcomes Facebook, Garmin and Xiaomi and Releases First Multi-AgentDesign Guide. VII Announcement New Members and Multi-Agent Design Guide, Sep. 9, 2020, 2 pages. [retrieved on Jan. 4, 2022], Retrieved from the Internet: URL: https://developer.amazon.com/en-US/blogs/alexa/device-makers/2020/09/vii-announcement-new-members-and-multi-agent-design-guide.
SmartThings.com, "Google Home Broadcasts" Oct. 2017, pp. 1-7 [retrieved from https://community.smartthings.eom/t/google-home-broadcasts/101416].
Soda S., et al., "Handsfree Voice Interface for Home Network Service Using a Microphone Array Network," 2012 Third International Conference on Networking and Computing, 2012, pp. 195-200.
*Sonos, Inc.* v. *Google LLC*, WDTX Case No. 6:20-cv-00881, Google's Answer and Counterclaims; dated Jan. 8, 2021, 39 pages.
Supplemental Notice of Allowability mailed on Oct. 27, 2016, issued in connection with U.S. Appl. No. 14/481,511, filed Sep. 9, 2014, 6 pages.
Varela O., et al., "Combining Pulse-based Features for Rejecting Far-field Speech in a Hmm-based Voice Activity Detector," Computers & Electrical Engineering, 2011, vol. 37(4), pp. 589-600.
Wikipedia, Server(Computing) https://web.archive.org/web/20160703173710/https://en.wikipedia.org/wiki/Server_(computing), published Jul. 3, 2016, 7 pages.
Non-Final Office Action mailed on Nov. 28, 2017, issued in connection with U.S. Appl. No. 15/673,170, filed Aug. 9, 2017, 7 pages.
Non-Final Office Action mailed on Sep. 28, 2018, issued in connection with U.S. Appl. No. 15/588,186, filed May 5, 2017, 12 pages.
Non-Final Office Action mailed on Sep. 28, 2018, issued in connection with U.S. Appl. No. 15/595,519, filed May 15, 2017, 12 pages.
Non-Final Office Action mailed on Feb. 29, 2024, issued in connection with U.S. Appl. No. 18/449,244, filed Aug. 14, 2023, 15 pages.
Non-Final Office Action mailed on Mar. 29, 2018, issued in connection with U.S. Appl. No. 15/716,313, filed Sep. 26, 2017, 16 pages.
Non-Final Office Action mailed on Sep. 29, 2022, issued in connection with U.S. Appl. No. 17/340,353, filed Jun. 7, 2021, 8 pages.
Non-Final Office Action mailed on Sep. 29, 2024, issued in connection with U.S. Appl. No. 18/404,254, filed Jan. 4, 2024, 14 pages.
Non-Final Office Action mailed on May 3, 2021, issued in connection with U.S. Appl. No. 16/564,766, filed Sep. 9, 2019, 16 pages.
Non-Final Office Action mailed on Apr. 30, 2025, issued in connection with U.S. Appl. No. 18/460,198, filed Sep. 1, 2023, 21 pages.
Non-Final Office Action mailed on Aug. 30, 2019, issued in connection with U.S. Appl. No. 16/115,525, filed Aug. 28, 2018, 13 pages.
Non-Final Office Action mailed on Aug. 30, 2024, issued in connection with U.S. Appl. No. 18/154,317, filed Jan. 13, 2023, 28 pages.
Non-Final Office Action mailed on Jul. 30, 2024, issued in connection with U.S. Appl. No. 17/994,577, filed Nov. 28, 2022, 13 pages.
Non-Final Office Action mailed on May 30, 2017, issued in connection with U.S. Appl. No. 15/478,770, filed Apr. 4, 2017, 9 pages.
Non-Final Office Action mailed on May 30, 2024, issued in connection with U.S. Appl. No. 18/503,971, filed Nov. 7, 2023, 8 pages.
Non-Final Office Action mailed on Sep. 30, 2022, issued in connection with U.S. Appl. No. 17/113,799, filed Dec. 7, 2020, 79 pages.
Non-Final Office Action mailed on Mar. 31, 2021, issued in connection with U.S. Appl. No. 16/919,467, filed Jul. 2, 2020, 10 pages.
Non-Final Office Action mailed on May 31, 2019, issued in connection with U.S. Appl. No. 16/185,906, filed Nov. 9, 2018, 7 pages.
Non-Final Office Action mailed on May 31, 2023, issued in connection with U.S. Appl. No. 17/810,549, filed Jul. 1, 2022, 19 pages.
Non-Final Office Action mailed on Oct. 31, 2025, issued in connection with U.S. Appl. No. 18/693,793, filed Mar. 20, 2024, 17 pages.
Non-Final Office Action mailed on Mar. 4, 2020, issued in connection with U.S. Appl. No. 15/966,534, filed Apr. 30, 2018, 11 pages.
Non-Final Office Action mailed on Jan. 5, 2021, issued in connection with U.S. Appl. No. 17/078,382, filed Oct. 23, 2020, 11 pages.
Non-Final Office Action mailed on Aug. 6, 2024, issued in connection with U.S. Appl. No. 18/313,859, filed May 8, 2023, 20 pages.
Non-Final Office Action mailed on Jul. 6, 2020, issued in connection with U.S. Appl. No. 16/812,618, filed Mar. 9, 2020, 15 pages.
Non-Final Office Action mailed on Nov. 6, 2018, issued in connection with U.S. Appl. No. 15/235,598, filed Aug. 12, 2016, 13 pages.
Non-Final Office Action mailed on Aug. 7, 2023, issued in connection with U.S. Appl. No. 17/807,270, filed Jun. 16, 2022, 20 pages.
Non-Final Office Action mailed on Aug. 7, 2024, issued in connection with U.S. Appl. No. 18/502,644, filed Nov. 6, 2023, 31 pages.
Non-Final Office Action mailed on Feb. 7, 2019, issued in connection with U.S. Appl. No. 15/859,311, filed Dec. 29, 2017, 9 pages.
Non-Final Office Action mailed on Feb. 7, 2019, issued in connection with U.S. Appl. No. 15/865,221, filed Jan. 8, 2018, 10 pages.
Non-Final Office Action mailed on Mar. 7, 2024, issued in connection with U.S. Appl. No. 17/458,673, filed Aug. 27, 2021, 26 pages.
Non-Final Office Action mailed on Mar. 7, 2024, issued in connection with U.S. Appl. No. 18/338,841, filed Jun. 21, 2023, 15 pages.
Non-Final Office Action mailed on Apr. 8, 2024, issued in connection with U.S. Appl. No. 18/459,982, filed Sep. 1, 2023, 16 pages.
Non-Final Office Action mailed on Jul. 8, 2024, issued in connection with U.S. Appl. No. 18/520,531, filed Nov. 27, 2023, 63 pages.
Non-Final Office Action mailed on Jun. 8, 2021, issued in connection with U.S. Appl. No. 17/207,640, filed Mar. 20, 2021, 17 pages.
Non-Final Office Action mailed on Dec. 9, 2022, issued in connection with U.S. Appl. No. 17/662,282, filed May 6, 2022, 12 pages.
Non-Final Office Action mailed on Jan. 9, 2018, issued in connection with U.S. Appl. No. 15/698,283, filed Sep. 7, 2017, 18 pages.
Non-Final Office Action mailed on Jan. 9, 2018, issued in connection with U.S. Appl. No. 15/727,913, filed Oct. 9, 2017, 8 pages.
Notice of Allowance mailed Jul. 21, 2021, issued in connection with U.S. Appl. No. 16/944,884, filed Jul. 31, 2020, 8 pages.
Notice of Allowance mailed Aug. 4, 2021, issued in connection with U.S. Appl. No. 17/104,466, filed Nov. 25, 2020, 9 pages.
Notice of Allowance mailed on May 1, 2017, issued in connection with U.S. Appl. No. 14/805,140, filed Jul. 21, 2015, 13 pages.
Notice of Allowance mailed on Oct. 1, 2024, issued in connection with U.S. Appl. No. 18/460,141, filed Sep. 1, 2023, 8 pages.
Notice of Allowance mailed on Oct. 1, 2025, issued in connection with U.S. Appl. No. 18/461,430, filed Sep. 5, 2023, 09 pages.
Notice of Allowance mailed on Nov. 2, 2016, issued in connection with U.S. Appl. No. 14/884,001, filed Oct. 15, 2015, 8 pages.
Notice of Allowance mailed on Feb. 3, 2025, issued in connection with U.S. Appl. No. 18/695,670, filed Mar. 26, 2024, 10 pages.
Notice of Allowance mailed on Jul. 3, 2025, issued in connection with U.S. Appl. No. 18/492,583, filed Oct. 23, 2023, 8 pages.
Notice of Allowance mailed on Jun. 3, 2016, issued in connection with U.S. Appl. No. 14/921,799, filed Oct. 23, 2015, 8 pages.
Notice of Allowance mailed on Nov. 3, 2025, issued in connection with U.S. Appl. No. 18/635,731, filed Apr. 15, 2024, 13 pages.
Notice of Allowance mailed on Nov. 4, 2016, issued in connection with U.S. Appl. No. 14/481,514, filed Sep. 9, 2014, 10 pages.
Notice of Allowance mailed on Sep. 5, 2025, issued in connection with U.S. Appl. No. 18/623,602, filed Apr. 1, 2024, 05 pages.
Notice of Allowance mailed on Feb. 6, 2025, issued in connection with U.S. Appl. No. 17/957,691, filed Sep. 30, 2022, 12 pages.
Notice of Allowance mailed on Jun. 6, 2018, issued in connection with U.S. Appl. No. 15/727,913, filed Oct. 9, 2017, 5 pages.
International Searching Authority, International Search Report and Written Opinion mailed on Nov. 23, 2015, issued in connection with International Application No. PCT/US2015/048942, filed on Sep. 8, 2015, 14 pages.

(56) References Cited

OTHER PUBLICATIONS

International Searching Authority, International Search Report and Written Opinion mailed on Nov. 23, 2015, issued in connection with International Application No. PCT/US2015/048944, filed on Sep. 8, 2015, 12 pages.
International Searching Authority, International Search Report and Written Opinion mailed on Nov. 23, 2016, issued in connection with International Patent Application No. PCT/US2016/052266, filed on Sep. 16, 2016, 11 pages.
International Searching Authority, International Search Report and Written Opinion mailed on Jan. 24, 2017, issued in connection with International Application No. PCT/US2016/052264, filed on Sep. 16, 2016, 17 pages.
International Searching Authority, International Search Report and Written Opinion mailed on Oct. 25, 2016, issued in connection with International Application No. PCT/US2016/043109, filed on Jul. 20, 2016, 12 pages.
International Searching Authority, International Search Report and Written Opinion mailed on Sep. 25, 2017, issued in connection with International Application No. PCT/US2017/042191, filed on Jul. 14, 2017, 16 pages.
International Searching Authority, International Search Report and Written Opinion mailed on Aug. 3, 2017, in connection with International Application No. PCT/US2017014596, 20 pages.
Japanese Patent Office, Decision to Grant a Patent and Translation mailed on May 20, 2025, issued in connection with Japanese Patent Application No. 2023-144387, 5 pages.
Japanese Patent Office, Decision to Grant a Patent and Translation mailed on Mar. 26, 2025, issued in connection with Japanese Patent Application No. 2023-144379, 5 pages.
Japanese Patent Office, Decision to Grant a Patent and Translation mailed on May 7, 2025, issued in connection with Japanese Patent Application No. 2023-149069, 5 pages.
Japanese Patent Office, Decision to Grant and Translation mailed on Mar. 5, 2025, issued in connection with Japanese Patent Application No. 2024-028691, 5 pages.
Japanese Patent Office, English Translation of Office Action mailed on May 8, 2018, issued in connection with Japanese Application No. 2017-513241, 4 pages.
Japanese Patent Office, Examination Report and Translation mailed on Dec. 7, 2021, issued in connection with Japanese Patent Application No. 2020-185230, 10 pages.
Japanese Patent Office, Japanese Office Action mailed on Oct. 3, 2017, issued in connection with Japanese Application No. 2017-501082, 7 pages.
Japanese Patent Office, Non-Final Office Action and Translation mailed on Dec. 10, 2019, issued in connection with Japanese Patent Application No. 2018-213477, 8 pages.
Japanese Patent Office, Non-Final Office Action mailed on Jan. 24, 2023, issued in connection with Japanese Patent Application No. 2021-194522, 6 pages.
Japanese Patent Office, Non-Final Office Action with Translation mailed on Apr. 25, 2017, issued in connection with Japanese Patent Application No. 2016-568888, 7 pages.
Japanese Patent Office, Non-Final Office Action with Translation mailed on Oct. 3, 2017, issued in connection with Japanese Patent Application No. 2017-501082, 3 pages.
Japanese Patent Office, Notice of Reasons for Refusal and Translation mailed on Dec. 10, 2024, issued in connection with Japanese Patent Application No. 2023-149069, 8 pages.
Japanese Patent Office, Notice of Reasons for Refusal and Translation mailed on Dec. 3, 2024, issued in connection with Japanese Patent Application No. 2023-144379, 12 pages.
Japanese Patent Office, Notice of Reasons for Refusal and Translation mailed on Dec. 3, 2024, issued in connection with Japanese Patent Application No. 2023-144387, 8 pages.
Japanese Patent Office, Notice of Reasons for Refusal and Translation mailed on Oct. 5, 2021, issued in connection with Japanese Patent Application No. 2020-134012, 10 pages.
Japanese Patent Office, Office Action and Translation mailed on Jun. 12, 2020, issued in connection with Japanese Patent Application No. 2019-056360, 6 pages.
Japanese Patent Office, Office Action and Translation mailed on Apr. 13, 2021, issued in connection with Japanese Patent Application No. 2020-048867, 4 pages.
Japanese Patent Office, Office Action and Translation mailed on Nov. 4, 2020, issued in connection with Japanese Patent Application No. 2019-141349, 6 pages.
Japanese Patent Office, Office Action and Translation mailed on Sep. 5, 2023, issued in connection with Japanese Application No. 2022-115789, 6 pages.
Japanese Patent Office, Office Action and Translation mailed on Mar. 7, 2023, issued in connection with Japanese Application No. 2022-001030, 11 pages.
Japanese Patent Office, Office Action and Translation mailed on Oct. 8, 2024, issued in connection with Japanese Patent Application No. 2023-118922, 9 pages.
Japanese Patent Office, Office Action mailed on Dec. 7, 2021, issued in connection with Japanese Patent Application No. 2020-185230, 8 pages.
Japanese Patent Office, Office Action mailed on Jun. 12, 2018, issued in connection with Japanese Application No. 2018-502729, 4 pages.
Japanese Patent Office, Office Action mailed on May 14, 2019, issued in connection with Japanese Patent Application No. 2018-500529, 8 pages.
Japanese Patent Office, Office Action mailed on Aug. 21, 2018, issued in connection with Japanese Application No. 2018-514418, 7 pages.
Japanese Patent Office, Office Action mailed on Jul. 24, 2018, issued in connection with Japanese Application No. 2018-514419, 5 pages.
Japanese Patent Office, Office Action mailed on Feb. 4, 2020, issued in connection with Japanese Patent Application No. 2018-500529, 6 pages.
Japanese Patent Office, Office Action mailed on Jun. 4, 2019, issued in connection with Japanese Patent Application No. 2018-112810, 4 pages.
Japanese Patent Office, Office Action mailed on May 8, 2018, issued in connection with Japanese Application No. 2017-513241, 8 pages.
Japanese Patent Office, Office Action with English Summary mailed on Jul. 18, 2017, issued in connection with Japanese Patent Application No. 2017-513171, 4 pages.
Japanese Patent Office, Translation of Office Action mailed on May 14, 2019, issued in connection with Japanese Patent Application No. 2018-500529, 5 pages.
John Mark and Paul Hufnagel "What is 1451.4, what are its uses and how does it work?" IEEE Standards Association, The IEEE 1451.4 Standard for Smart Transducers, 14pages.
Korean Patent Office, Korean Examination Report and Translation mailed on Jan. 16, 2026, issued in connection with Korean Application No. 10-2021-7028723, 20 pages.
Korean Patent Office, Korean Examination Report and Translation mailed on Jul. 17, 2024, issued in connection with Korean Application No. 10-2022-7024007, 10 pages.
Korean Patent Office, Korean Examination Report and Translation mailed on Aug. 5, 2024, issued in connection with Korean Application No. 10-2023-7031855, 10 pages.
Korean Patent Office, Korean Examination Report and Translation mailed on Nov. 6, 2024, issued in connection with Korean Application No. 10-2023-7032988, 13 pages.
Korean Patent Office, Korean Office Action and Translation mailed on Oct. 20, 2024, issued in connection with Korean Application No. 10-2023-7036702, 22 pages.
Korean Patent Office, Korean Preliminary Rejection and Translation mailed on Dec. 26, 2023, issued in connection with Korean Application No. 10-2023-7031855, 4 pages.
Korean Patent Office, Korean Preliminary Rejection and Translation mailed on Dec. 5, 2023, issued in connection with Korean Application No. 10-2023-7032988, 11 pages.
Lei et al. An Audio Frequency Acquision and Release System Based on TMS320VC5509, Instrumentation Technology, Editorial Department Email, Issue 02, 2007, 4 pages.

(56) References Cited

OTHER PUBLICATIONS

Microsoft Corporation, "Using Microsoft Outlook 2003," Cambridge College, 2003.
Motorola, "Simplefi, Wireless Digital Audio Receiver, Installation and User Guide," Dec. 31, 2001, 111 pages.
Mulcahy, John, "Room EQ Wizard: Room Acoustics Software," REW, 2014, retrieved Oct. 10, 2014, 4 pages.
Non-Final Office Action mailed on May 11, 2023, issued in connection with U.S. Appl. No. 17/458,673, filed Aug. 27, 2021, 18 pages.
Non-Final Office Action mailed on Oct. 11, 2017, issued in connection with U.S. Appl. No. 15/480,265, filed Apr. 5, 2017, 8 pages.
Non-Final Office Action mailed on Oct. 11, 2018, issued in connection with U.S. Appl. No. 15/856,791, filed Dec. 28, 2017, 13 pages.
Non-Final Office Action mailed on Dec. 12, 2024, issued in connection with U.S. Appl. No. 18/410,328, filed Jan. 11, 2024, 15 pages.
Non-Final Office Action mailed on Mar. 12, 2020, issued in connection with U.S. Appl. No. 16/796,496, filed Feb. 20, 2020, 13 pages.
Non-Final Office Action mailed on Sep. 12, 2016, issued in connection with U.S. Appl. No. 14/811,587, filed Jul. 28, 2015, 24 pages.
Non-Final Office Action mailed on Aug. 13, 2021, issued in connection with U.S. Appl. No. 16/994,874, filed Aug. 17, 2020, 10 pages.
Non-Final Office Action mailed on Dec. 13, 2023, issued in connection with U.S. Appl. No. 18/316,400, filed May 12, 2023, 6 pages.
Non-Final Office Action mailed on Dec. 13, 2023, issued in connection with U.S. Appl. No. 18/316,434, filed May 12, 2023, 29 pages.
Non-Final Office Action mailed on Jul. 13, 2016, issued in connection with U.S. Appl. No. 14/940,779, filed Nov. 13, 2015, 16 pages.
Non-Final Office Action mailed on Mar. 13, 2020, issued in connection with U.S. Appl. No. 15/005,496, filed Jan. 25, 2016, 20 pages.
Non-Final Office Action mailed on Mar. 13, 2024, issued in connection with U.S. Appl. No. 18/309,939, filed May 1, 2023, 15 pages.
Non-Final Office Action mailed on Dec. 14, 2016, issued in connection with U.S. Appl. No. 14/481,505, filed Sep. 9, 2014, 19 pages.
Non-Final Office Action mailed on Jul. 14, 2025, issued in connection with U.S. Appl. No. 18/461,457, filed Sep. 5, 2023, 13 pages.
Non-Final Office Action mailed on Mar. 14, 2017, issued in connection with U.S. Appl. No. 15/096,827, filed Apr. 12, 2016, 12 pages.
Non-Final Office Action mailed on May 14, 2019, issued in connection with U.S. Appl. No. 15/955,545, filed Apr. 17, 2018, 15 pages.
Non-Final Office Action mailed on Oct. 14, 2015, issued in connection with U.S. Appl. No. 14/216,325, filed Mar. 17, 2014, 7 pages.
Non-Final Office Action mailed on Dec. 15, 2022, issued in connection with U.S. Appl. No. 17/807,595, filed Jun. 17, 2022, 16 pages.
Non-Final Office Action mailed on May 15, 2018, issued in connection with U.S. Appl. No. 15/806,126, filed Nov. 7, 2017, 17 pages.
Non-Final Office Action mailed on May 15, 2023, issued in connection with U.S. Appl. No. 17/567,311, filed Jan. 3, 2022, 12 pages.
Non-Final Office Action mailed on Nov. 15, 2021, issued in connection with U.S. Appl. No. 17/135,308, filed Dec. 28, 2020, 19 pages.
Non-Final Office Action mailed on Oct. 15, 2024, issued in connection with U.S. Appl. No. 17/340,590, filed Jun. 7, 2021, 26 pages.
Non-Final Office Action mailed on Oct. 15, 2025, issued in connection with U.S. Appl. No. 18/502,644, filed Nov. 6, 2023, 41 pages.
Non-Final Office Action mailed on Jul. 16, 2025, issued in connection with U.S. Appl. No. 18/154,317, filed Jan. 13, 2023, 28 pages.
Non-Final Office Action mailed on Jun. 16, 2017, issued in connection with U.S. Appl. No. 15/005,496, filed Jan. 25, 2016, 15 pages.
Non-Final Office Action mailed on Nov. 16, 2018, issued in connection with U.S. Appl. No. 15/996,878, filed Jun. 4, 2018, 8 pages.
Non-Final Office Action mailed on Sep. 16, 2020, issued in connection with U.S. Appl. No. 16/115,525, filed Aug. 28, 2018, 11 pages.
Non-Final Office Action mailed on Jan. 17, 2023, issued in connection with U.S. Appl. No. 17/407,793, filed Aug. 20, 2021, 9 pages.
Non-Final Office Action mailed on Aug. 18, 2020, issued in connection with U.S. Appl. No. 16/827,143, filed Mar. 23, 2020, 8 pages.
Non-Final Office Action mailed on Dec. 18, 2018, issued in connection with U.S. Appl. No. 16/011,402, filed Jun. 18, 2018, 10 pages.
Non-Final Office Action mailed on Feb. 18, 2016, issued in connection with U.S. Appl. No. 14/644,136, filed Mar. 10, 2015, 10 pages.
Non-Final Office Action mailed on Jan. 18, 2019, issued in connection with U.S. Appl. No. 16/123,928, filed Sep. 6, 2018, 16 pages.
Non-Final Office Action mailed on Jan. 18, 2024, issued in connection with U.S. Appl. No. 18/048,034, filed Oct. 20, 2022, 10 pages.
Non-Final Office Action mailed on Jun. 18, 2019, issued in connection with U.S. Appl. No. 15/005,496, filed Jan. 25, 2016, 15 pages.
Non-Final Office Action mailed on Mar. 18, 2022, issued in connection with U.S. Appl. No. 17/033,818, filed Sep. 27, 2020, 12 pages.
Non-Final Office Action mailed on Mar. 18, 2024, issued in connection with U.S. Appl. No. 17/532,744, filed Nov. 22, 2021, 20 pages.
Non-Final Office Action mailed on Apr. 19, 2023, issued in connection with U.S. Appl. No. 17/807,270, filed Jun. 16, 2022, 19 pages.
Non-Final Office Action mailed on Aug. 19, 2021, issued in connection with U.S. Appl. No. 17/357,302, filed Jun. 24, 2021, 16 pages.
Non-Final Office Action mailed on Feb. 19, 2020, issued in connection with U.S. Appl. No. 16/665,415, filed Oct. 28, 2019, 53 pages.
Non-Final Office Action mailed on Jan. 19, 2024, issued in connection with U.S. Appl. No. 18/308,087, filed Apr. 27, 2023, 22 pages.
Non-Final Office Action mailed on Jan. 19, 2024, issued in connection with U.S. Appl. No. 18/331,580, filed Jun. 8, 2023, 11 pages.
Non-Final Office Action mailed on Jul. 19, 2023, issued in connection with U.S. Appl. No. 18/066,077, filed Dec. 14, 2022, 36 pages.
Non-Final Office Action mailed on Jun. 19, 2020, issued in connection with U.S. Appl. No. 16/403,077, filed May 3, 2019, 6 pages.
Non-Final Office Action mailed on Sep. 19, 2017, issued in connection with U.S. Appl. No. 15/056,553, filed Feb. 29, 2016, 7 pages.
Non-Final Office Action mailed on Apr. 2, 2018, issued in connection with U.S. Appl. No. 15/872,979, filed Jan. 16, 2018, 6 pages.
Non-Final Office Action mailed on Aug. 2, 2017, issued in connection with U.S. Appl. No. 15/298,115, filed Oct. 19, 2016, 22 pages.
Non-Final Office Action mailed on Feb. 2, 2024, issued in connection with U.S. Appl. No. 18/297,214, filed Apr. 7, 2023, 13 pages.
Non-Final Office Action mailed on Apr. 20, 2017, issued in connection with U.S. Appl. No. 15/005,853, filed Jan. 25, 2016, 8 pages.

(56) References Cited

OTHER PUBLICATIONS

Non-Final Office Action mailed on Feb. 20, 2025, issued in connection with U.S. Appl. No. 18/052,698, filed Nov. 4, 2022, 29 pages.
Non-Final Office Action mailed on Jul. 20, 2016, issued in connection with U.S. Appl. No. 14/682,182, filed Apr. 9, 2015, 13 pages.
European Patent Office, European Extended Search Report mailed on Jun. 10, 2022, issued in connection with European Application No. 22155834.9, 8 pages.
European Patent Office, European Extended Search Report mailed on Dec. 11, 2020, issued in connection with European Application No. 20196286.7, 6 pages.
European Patent Office, European Extended Search Report mailed on Jan. 14, 2022, issued in connection with European Application No. 21171959.6, 12 pages.
European Patent Office, European Extended Search Report mailed on Mar. 16, 2020, issued in connection with European Application No. 19209551.1, 7 pages.
European Patent Office, European Extended Search Report mailed on Oct. 16, 2018, issued in connection with European Application No. 17185193.4, 6 pages.
European Patent Office, European Extended Search Report mailed on Jul. 17, 2019, issued in connection with European Application No. 19167365.6, 7 pages.
European Patent Office, European Extended Search Report mailed on Dec. 18, 2025, issued in connection with European Application No. 25178570.5, 13 pages.
European Patent Office, European Extended Search Report mailed on Jan. 2, 2024, issued in connection with European Application No. 23188226.7, 10 pages.
European Patent Office, European Extended Search Report mailed on Nov. 21, 2025, issued in connection with European Application No. 25176873.5, 12 pages.
European Patent Office, European Extended Search Report mailed on Jun. 23, 2025, issued in connection with European Application No. 25162256.9, 8 pages.
European Patent Office, European Extended Search Report mailed on Mar. 25, 2020, issued in connection with European Application No. 19215348.4, 10 pages.
European Patent Office, European Extended Search Report mailed on Jun. 26, 2018, issued in connection with European Application No. 18171206.8, 9 pages.
European Patent Office, European Extended Search Report mailed on Sep. 8, 2017, issued in connection with European Application No. 17000460.0, 8 pages.
European Patent Office, European Extended Search Report mailed on Jul. 9, 2024, issued in connection with European Application No. 24162741.3, 12 pages.
European Patent Office, European Office Action mailed on Nov. 10, 2020, issued in connection with European Application No. 19168800.1, 5 pages.
European Patent Office, European Office Action mailed on Dec. 11, 2018, issued in connection with European Application No. 15778787.0, 6 pages.
European Patent Office, European Office Action mailed on Jul. 11, 2019, issued in connection with European Application No. 15778787.0, 10 pages.
European Patent Office, European Office Action mailed on Sep. 16, 2020, issued in connection with European Application No. 15778787.0, 7 pages.
European Patent Office, European Office Action mailed on Aug. 19, 2020, issued in connection with European Application No. 17754501.9, 6 pages.
European Patent Office, European Office Action mailed on Nov. 2, 2018, issued in connection with European Application No. 18171206.8, 6 pages.
European Patent Office, European Office Action mailed on Jan. 3, 2020, issued in connection with European Application No. 17703876.7, 8 pages.
European Patent Office, European Office Action mailed on Feb. 4, 2019, issued in connection with European Application No. 17703876.7, 9 pages.
European Patent Office, European Office Action mailed on Sep. 7, 2020, issued in connection with European Application No. 19161826.3, 6 pages.
European Patent Office, European Office Action mailed on Jul. 9, 2020, issued in connection with European Application No. 19167365.6, 4 pages.
European Patent Office, European Office Action mailed on May 9, 2019, issued in connection with European Application No. 18171206.8, 7 pages.
European Patent Office, European Partial Search Report mailed on Jun. 7, 2019, issued in connection with European Application No. 19161826.3, 17 pages.
European Patent Office, European Search Report mailed on Feb. 2, 2024, issued in connection with European Application No. 23200723.7, 5 pages.
European Patent Office, European Search Report mailed on Jun. 13, 2019, issued in connection with European Application No. 18204450.3, 11 pages.
European Patent Office, European Search Report mailed on Sep. 13, 2019, issued in connection with European Application No. 19161826.3, 13 pages.
European Patent Office, European Search Report mailed on Oct. 17, 2023, issued in connection with European Application No. 23178432.3, 8 pages.
European Patent Office, European Search Report mailed on Jan. 18, 2018, issued in connection with European Patent Application No. 17185193.4, 9 pages.
European Patent Office, European Search Report mailed on Jul. 9, 2019, issued in connection with European Application No. 19168800.1, 12 pages.
European Patent Office, Examination Report mailed on Jul. 12, 2021, issued in connection with European Patent Application No. 17754501.9 6 pages.
European Patent Office, Extended European Search Report mailed on Jan. 5, 2017, issued in connection with European Patent Application No. 15765555.6, 8 pages.
European Patent Office, Extended Search Report mailed on Jan. 25, 2017, issued in connection with European Application No. 15765548.1, 7 pages.
European Patent Office, Extended Search Report mailed on Apr. 26, 2017, issued in connection with European Application No. 15765548.1, 10 pages.
European Patent Office, Office Action mailed on Nov. 12, 2018, issued in connection with European Application No. 17000460.0, 6 pages.
European Patent Office, Office Action mailed on Jun. 13, 2017, issued in connection with European patent application No. 17000484.0, 10 pages.
European Patent Office, Office Action mailed on Dec. 15, 2016, issued in connection with European Application No. 15766998.7, 7 pages.
European Patent Office, Summons to Attend Oral Proceedings mailed on Nov. 15, 2018, issued in connection with European Application No. 16748186.0, 57 pages.
European Patent Office, Summons to Attend Oral Proceedings mailed on Apr. 22, 2022, issued in connection with European Application No. 15778787.0, 6 pages.
European Patent Office, Summons to Attend Oral Proceedings mailed on Sep. 24, 2019, issued in connection with European Application No. 17000460.0, 5 pages.
European Patent Office, Summons to Attend Oral Proceedings mailed on Jun. 26, 2024, issued in connection with European Application No. 19740292.8, 10 pages.
European Patent Office, Summons to Attend Oral Proceedings mailed on Nov. 29, 2024, issued in connection with European Application No. 21193616.6, 9 pages.
European Patent Office, Summons to Attend Oral Proceedings mailed on Aug. 6, 2024, issued in connection with European Application No. 18789515.6, 8 pages.

(56) References Cited

OTHER PUBLICATIONS

Ex Parte Quayle Office Action mailed on Apr. 15, 2019, issued in connection with U.S. Appl. No. 15/235,598, filed Aug. 12, 2016, 7 pages.
Ex Parte Quayle Office Action mailed on Dec. 26, 2019, issued in connection with U.S. Appl. No. 16/542,418, filed Aug. 16, 2019, 7 pages.
Excerpts from Andrew Tanenbaum, Computer Networks. 4th Edition. Copyright 2003, 87 pages [produced by Google in IPR of U.S. Pat. No. 9,219,460, IPR2021-00475 on Feb. 5, 2021].
Excerpts from Morfey, Christopher L., Dictionary of Acoustics. Copyright 2001, 4 pages [produced by Google in IPR of U.S. Pat. No. 9,219,460, IPR2021-00475 on Feb. 5, 2021].
Final Office Action mailed on Jul. 1, 2022, issued in connection with U.S. Appl. No. 17/033,818, filed Sep. 27, 2020, 13 pages.
Final Office Action mailed on Jul. 1, 2025, issued in connection with U.S. Appl. No. 18/410,328, filed Jan. 11, 2024, 09 pages.
Final Office Action mailed on Dec. 2, 2019, issued in connection with U.S. Appl. No. 15/005,496, filed Jan. 25, 2016, 19 pages.
Final Office Action mailed on Apr. 3, 2017, issued in connection with U.S. Appl. No. 14/678,248, filed Apr. 3, 2015, 22 pages.
Final Office Action mailed on Feb. 3, 2025, issued in connection with U.S. Appl. No. 18/154,317, filed Jan. 13, 2023, 29 pages.
Final Office Action mailed on Dec. 4, 2024, issued in connection with U.S. Appl. No. 18/007,415, filed Jan. 30, 2023, 14 pages.
Final Office Action mailed on Jan. 6, 2025, issued in connection with U.S. Appl. No. 18/461,430, filed Sep. 5, 2023, 26 pages.
Final Office Action mailed on Aug. 12, 2025, issued in connection with U.S. Appl. No. 18/052,698, filed Nov. 4, 2022, 31 pages.
Final Office Action mailed on Feb. 13, 2025, issued in connection with U.S. Appl. No. 18/502,644, filed Nov. 6, 2023, 34 pages.
Final Office Action mailed on Jul. 13, 2017, issued in connection with U.S. Appl. No. 14/726,921, filed Jun. 1, 2015, 10 pages.
Final Office Action mailed on Jun. 13, 2017, issued in connection with U.S. Appl. No. 14/481,505, filed Sep. 9, 2014, 22 pages.
Final Office Action mailed on Dec. 14, 2020, issued in connection with U.S. Appl. No. 16/812,618, filed Mar. 9, 2020, 17 pages.
Final Office Action mailed on Feb. 14, 2019, issued in connection with U.S. Appl. No. 15/005,496, filed Jan. 25, 2016, 16 pages.
Final Office Action mailed on Feb. 14, 2019, issued in connection with U.S. Appl. No. 15/217,399, filed Jul. 22, 2016, 37 pages.
Final Office Action mailed on May 14, 2025, issued in connection with U.S. Appl. No. 18/623,602, filed Apr. 1, 2024, 05 pages.
Final Office Action mailed on Oct. 14, 2016, issued in connection with U.S. Appl. No. 14/682,182, filed Apr. 9, 2015, 16 pages.
Final Office Action mailed on Oct. 17, 2016, issued in connection with U.S. Appl. No. 14/678,248, filed Apr. 3, 2015, 22 pages.
Final Office Action mailed on Sep. 17, 2021, issued in connection with U.S. Appl. No. 16/564,766, filed Sep. 9, 2019, 8 pages.
Final Office Action mailed on Apr. 18, 2017, issued in connection with U.S. Appl. No. 14/678,263, filed Apr. 3, 2015, 16 pages.
Final Office Action mailed on Apr. 18, 2018, issued in connection with U.S. Appl. No. 15/056,553, filed Feb. 29, 2016, 8 pages.
Final Office Action mailed on Dec. 18, 2014, issued in connection with U.S. Appl. No. 13/340,126, filed Dec. 29, 2011, 12 pages.
Final Office Action mailed on Jul. 18, 2024, issued in connection with U.S. Appl. No. 17/450,925, filed Oct. 14, 2021, 11 pages.
Final Office Action mailed on Jan. 19, 2017, issued in connection with U.S. Appl. No. 14/940,779, filed Nov. 13, 2015, 15 pages.
Final Office Action mailed on Apr. 2, 2018, issued in connection with U.S. Appl. No. 15/166,241, filed May 26, 2016, 14 pages.
Final Office Action mailed on Aug. 2, 2024, issued in connection with U.S. Appl. No. 18/048,034, filed Oct. 20, 2022, 7 pages.
Final Office Action mailed on Aug. 20, 2021, issued in connection with U.S. Appl. No. 16/919,467, filed Jul. 2, 2020, 22 pages.
Final Office Action mailed on Aug. 20, 2024, issued in connection with U.S. Appl. No. 18/449,244, filed Aug. 14, 2023, 17 pages.
Final Office Action mailed on Sep. 20, 2023, issued in connection with U.S. Appl. No. 17/810,549, filed Jul. 1, 2022, 18 pages.
Final Office Action mailed on Oct. 21, 2016, issued in connection with U.S. Appl. No. 14/696,014, filed Apr. 24, 2015, 13 pages.
Final Office Action mailed on Sep. 22, 2020, issued in connection with U.S. Appl. No. 15/005,496, filed Jan. 25, 2016, 17 pages.
Final Office Action mailed on Jan. 25, 2018, issued in connection with U.S. Appl. No. 15/005,496, filed Jan. 25, 2016, 17 pages.
Final Office Action mailed on Mar. 25, 2019, issued in connection with U.S. Appl. No. 15/856,791, filed Dec. 28, 2017, 11 pages.
Final Office Action mailed on Feb. 27, 2024, issued in connection with U.S. Appl. No. 17/340,590, filed Jun. 7, 2021, 28 pages.
Final Office Action mailed on Mar. 28, 2025, issued in connection with U.S. Appl. No. 18/395,386, filed Dec. 22, 2023, 35 pages.
Final Office Action mailed on Oct. 28, 2019, issued in connection with U.S. Appl. No. 16/181,865, filed Nov. 6, 2018, 17 pages.
Final Office Action mailed on Apr. 3, 2018, issued in connection with U.S. Appl. No. 15/235,598, filed Aug. 12, 2016, 12 pages.
Final Office Action mailed on Mar. 3, 2020, issued in connection with U.S. Appl. No. 16/115,525, filed Aug. 28, 2018, 13 pages.
Final Office Action mailed on Aug. 30, 2022, issued in connection with U.S. Appl. No. 17/107,157, filed Nov. 30, 2020, 32 pages.
Final Office Action mailed on Jan. 30, 2025, issued in connection with U.S. Appl. No. 18/410,407, filed Jan. 11, 2024, 16 Pages.
Final Office Action mailed on Jan. 30, 2025, issued in connection with U.S. Appl. No. 18/520,336, filed Nov. 27, 2023, 22 pages.
Final Office Action mailed on Oct. 30, 2023, issued in connection with U.S. Appl. No. 17/458,673, filed Aug. 27, 2021, 20 pages.
Final Office Action mailed on Oct. 30, 2025, issued in connection with U.S. Appl. No. 18/460,198, filed Sep. 1, 2023, 26 pages.
Final Office Action mailed on Feb. 5, 2018, issued in connection with U.S. Appl. No. 15/229,693, filed Aug. 5, 2016, 21 pages.
Final Office Action mailed on Mar. 5, 2019, issued in connection with U.S. Appl. No. 15/056,553, filed Feb. 29, 2016, 9 pages.
Final Office Action mailed on Dec. 6, 2018, issued in connection with U.S. Appl. No. 15/806,126, filed Nov. 7, 2017, 18 pages.
Final Office Action mailed on Jul. 8, 2024, issued in connection with U.S. Appl. No. 17/222,950, filed Apr. 5, 2021, 10 pages.
Final Office Action mailed on Apr. 9, 2019, issued in connection with U.S. Appl. No. 15/229,693, filed Aug. 5, 2016, 33 pages.
First Action Interview Office Action mailed on Mar. 3, 2017, issued in connection with U.S. Appl. No. 14/726,921, filed Jun. 1, 2015, 9 pages.
First Action Interview Office Action mailed on Jul. 12, 2016, issued in connection with U.S. Appl. No. 14/481,514, filed Sep. 9, 2014, 10 pages.
First Action Interview Office Action mailed on Jun. 30, 2016, issued in connection with U.S. Appl. No. 14/481,505, filed Sep. 9, 2014, 9 pages.
First Action Interview Pilot Program Pre-Interview Communication mailed on Apr. 5, 2017, issued in connection with U.S. Appl. No. 14/793,190, filed Jul. 7, 2015, 4 pages.

* cited by examiner

ARBITRATION-BASED VOICE RECOGNITION

CROSS-REFERENCE TO RELATED APPLICATIONS

This application claims priority under 35 U.S.C. § 120 to, and is a continuation of, U.S. patent application Ser. No. 18/449,254, filed on Aug. 14, 2023, entitled "Arbitration-Based Voice Recognition," which is a continuation of U.S. patent application Ser. No. 17/722,438, filed on Apr. 18, 2022, now U.S. Pat. No. 11,727,933, entitled "Arbitration-Based Voice Recognition," which is a continuation of U.S. patent application Ser. No. 16/841,116, filed on Apr. 6, 2020, now U.S. Pat. No. 11,308,961, entitled "Arbitration-Based Voice Recognition," which is a continuation of U.S. patent application Ser. No. 16/178,122, filed on Nov. 1, 2018, now U.S. Pat. No. 10,614,807, entitled "Arbitration-Based Voice Recognition," which is a continuation of U.S. patent application Ser. No. 15/297,627, filed on Oct. 19, 2016, now U.S. Pat. No. 10,181,323, entitled "Arbitration-Based Voice Recognition," the contents of each of which are hereby incorporated by reference in their entirety.

FIELD OF THE DISCLOSURE

The disclosure is related to consumer goods and, more particularly, to methods, systems, products, features, services, and other elements directed to media playback or some aspect thereof.

BACKGROUND

Options for accessing and listening to digital audio in an out-loud setting were limited until 2003, when SONOS, Inc. filed for one of its first patent applications, entitled "Method for Synchronizing Audio Playback between Multiple Networked Devices," and began offering a media playback system for sale in 2005. The Sonos Wireless HiFi System enables people to experience music from many sources via one or more networked playback devices. Through a software control application installed on a smartphone, tablet, or computer, one can play what he or she wants in any room that has a networked playback device. Additionally, using the controller, for example, different songs can be streamed to each room with a playback device, rooms can be grouped together for synchronous playback, or the same song can be heard in all rooms synchronously.

Given the ever growing interest in digital media, there continues to be a need to develop consumer-accessible technologies to further enhance the listening experience.

BRIEF DESCRIPTION OF THE DRAWINGS

Features, aspects, and advantages of the presently disclosed technology may be better understood with regard to the following description, appended claims, and accompanying drawings where:

Figure 1:
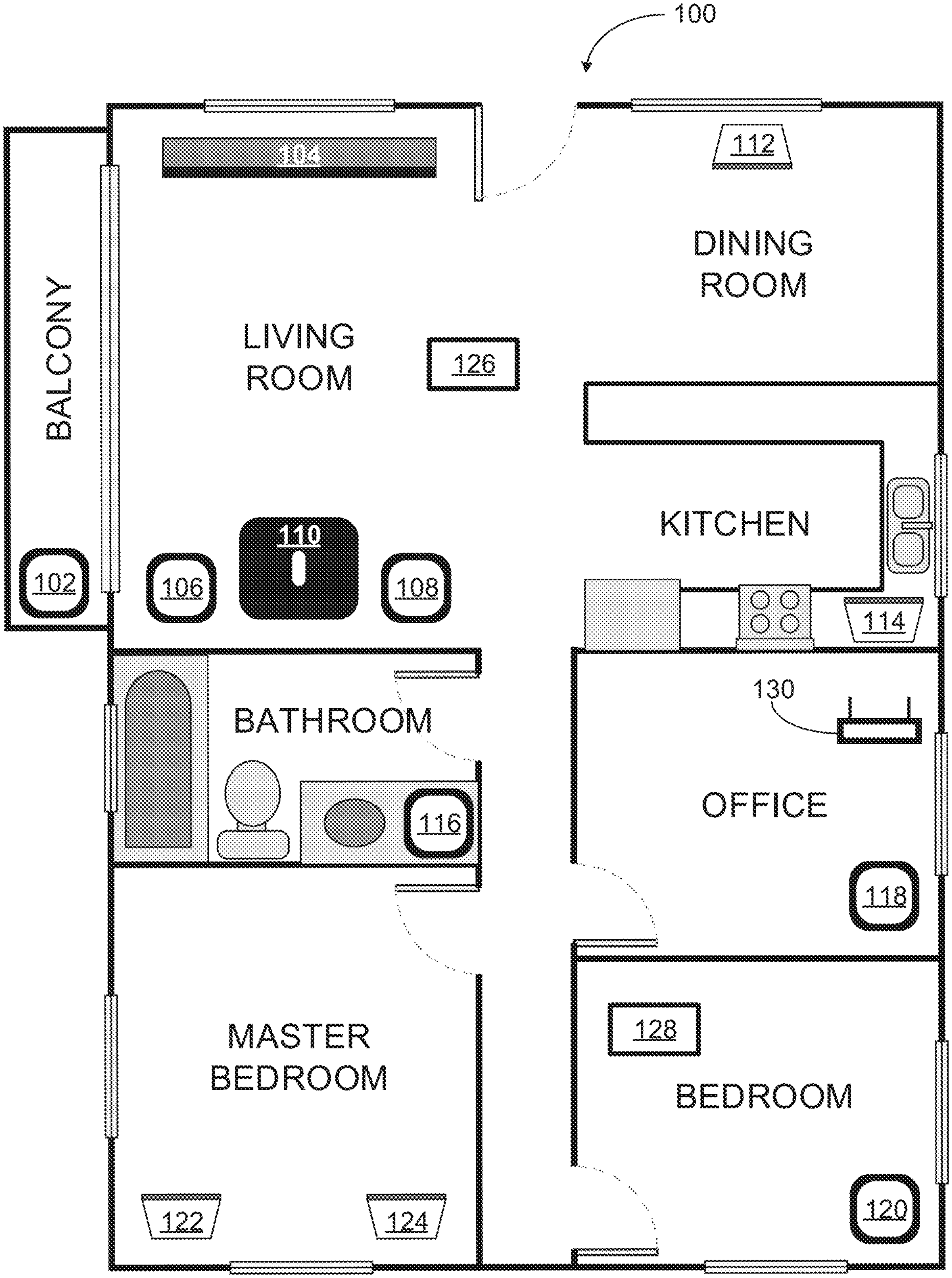
FIG. 1 shows an example media playback system configuration in which certain embodiments may be practiced.

The drawings are for the purpose of illustrating example embodiments, but it is understood that the inventions are not limited to the arrangements and instrumentality shown in the drawings.

DETAILED DESCRIPTION

I. Overview

Listening to media content out loud is a social activity which involves family, friends, and guests. The media content may include, for instance, talk radio, books, audio from television, music stored on a local drive, music from media sources (e.g., Pandora® Radio, Spotify®, Slacker®, Radio, Google Play™, iTunes Radio), and other audible material. For example, people may play music out loud at parties and other social gatherings. Further, the music may be played in one listening zone or multiple listening zones simultaneously, such that the music in each listening zone may be synchronized, without audible echoes or glitches.

A music experience may be enriched when voice inputs are used to control an audio playback device or system, among other devices (e.g., lights). For example, a user may wish to change audio content being played back, a playlist, a playback queue, or a listening zone, add a musi track to a playlist or playback queue, or change a playback setting (e.g., play, pause, next track, previous track, playback volume, and EQ settings, among others). The user may provide a voice input associated with control of the audio playback device, among other devices, which is received by a networked microphone device (NMD). The NMD may include a microphone to detect the voice input. An NMD may be, for example, a SONOS® playback device, server, or system capable of receiving voice input via a microphone to control the audio playback device or system, among other devices. Additionally, or alternatively, the NMD may be, for example, an AMAZON® ECHO®, APPLE® IPHONE® device, server, or system capable of receiving voice inputs via a microphone to control the audio playback device or system, among other devices. U.S. application Ser. No. 15/098,867 entitled, "Default Playback Device Designation," the contents of which is hereby incorporated by reference, provides examples of voice-enabled household architectures.

The voice input from the user may be composed of a wakeword followed by a voice command. The wakeword may indicate to the NMD that voice input in the form of the voice command follows. The wakeword may be a spoken voice input such as "Alexa", "OK Google", "Hey Sonos", or "Hey Siri", among other examples. The voice command may be a spoken voice input which indicates to the NMD that control of a media playback device or system, among other devices is requested. Example voice commands may include commands to modify any of the media playback playback settings such as playback volume, playback transport controls, music source selection, and grouping, among other possibilities. Alternatively, the voice command may be a spoken voice input requesting information such as "What is the volume setting?" or "What songs are in the playlist?" Multiple NMDs in a listening range may detect the wakeword and receive the voice command which follows the wakeword.

Embodiments described herein are directed to a method and system for arbitrating which NMD of multiple NMDs may send a voice input (e.g., voice command or wakeword and voice command) to a cloud-based computing device, e.g., server. The NMD may send the voice input to the cloud-based computing device so that the cloud-based computing device can perform voice recognition on the voice input. The voice recognition allows for identification of the requested control or information. For example, the arbitration process avoids having multiple NMDs send a same voice command to the cloud-based computing device, and thereby avoids potentially wasting bandwidth which could otherwise be used for other activities such as playing music.

The arbitration process may begin with the NMD detecting a wakeword. The NMD may identify the wakeword, e.g., whether the wakeword was "Alexa", "OK Google", "Hey Sonos", or "Hey Siri" and also determine a measure of confidence associated with how well the wakeword was detected. The NMD may also be playing back audio content when the wakeword is detected. In this case, the NMD may also adjust the audio being played back by the NMD so that the voice command which follows the wakeword can be clearly received over the audio being played back. The audio may be adjusted in a variety of manners including pausing the audio being played back or ducking the audio being played back.

In some embodiments, the NMD may define a time interval indicative of how long the NMD may wait before determining whether to send the voice command to the cloud-based computing device. The time interval may be a static parameter or a dynamic parameter. The time interval may be selected to balance needs of providing enough time to complete the arbitration described in more detail below and addressing latency concerns.

In some embodiments, the NMD may generate a message also referred to herein as arbitration message which is sent to other NMDs, e.g., in a household. The arbitration message may include one or more of the identifier of the wakeword which was received by the NMD, the measure of confidence of how well the wakeword was detected, and the time interval. Each of the other NMDs that detected the wakeword may send a similar arbitration message associated with detection of the wakeword to other NMDs.

If the NMD receives an arbitration message from another NMD, then the NMD may determine whether it wins the arbitration with the other NMD. The NMD may win the arbitration if the measure of confidence of the wakeword detected by the NMD is greater than that detected by the other NMD as indicated by the received arbitration message. The NMD which has a greater measure of confidence associated with the detected wakeword may be in a better position to clearly receive the voice command which follows the wakeword.

If the NMD loses the arbitration, then the NMD may restore the audio being played back by the NMD. For example, the NMD may unduck or unpause the audio. Alternatively, the audio may not be so adjusted until it is notified by the NMD which wins the arbitration, another NMD in a bonded zone with the NMD, or by the cloud-based computing device.

If the NMD establishes the time interval, the NMD may receive additional arbitration messages from other NMDs until the time interval expires. The NMD may perform arbitration on these additional arbitration messages. If the NMD continues to win arbitrations, then the NMD may send the received voice command to the cloud-based computing device when the time interval expires. The cloud-based computing device may perform voice recognition on the voice command. For example, the cloud-based computing device may convert the voice command to text, interpret the text, and then formulate a response based on the text. If the voice command is a request for information, then the response may be the requested information sent to the NMD in the form of text and converted to a voice response that is audibly played back by the NMD. Additionally, or alternatively, if the voice command is associated with control of a media playback system or device, then the response may be a command associated with the control of a media playback device or system such as play certain music content or change a setting of the playback device. The server may send the command to the NMD and the NMD may perform the command or instruct another network device to perform the command.

In some embodiments, arbitration may be performed by a centralized device rather than being performed locally at each NMD. The centralized device may be a designated NMD or other network device on a local area network. The centralized device may be arranged to determine which NMD of one or more NMDs which detected a wakeword should send the voice command following the wakeword to the cloud-based computing device. In this regard, the centralized device may receive an arbitration message from the one or more NMDs and identify based on the measure of confidence associated with the arbitration message which NMD should send its received voice command to the cloud-based computing device. For example, the centralized device may determine which NMD detected the wakeword with a largest measure of confidence. The centralized device may then cause the identified NMD to send the received voice command to the cloud-based computing device.

Moving on from the above illustration, an example embodiment includes a first network device comprising a processor; memory; and computer instructions stored in the memory and executable by the processor to cause the processor to: detect a first voice input; determine a first measure of confidence associated with the first voice input; receive a message, wherein the message comprises a second measure of confidence associated with detection of the first voice input by a second network device; determine whether the first measure of confidence is greater than the second measure of confidence; and based on the determination that the first measure of confidence is greater than the second measure of confidence, send a second voice input to a server. The first network device may further comprise computer instructions for adjusting a volume of audio playback in response to detecting the first voice input. The first network device may further comprise computer instructions for determining that the audio playback is music playback, and where adjusting the volume of the audio playback in response to detecting the first voice input comprises ducking the music playback. The first network device may further comprise computer instructions for determining that the audio playback is playback of an audio book, and where adjusting the volume of the audio playback in response to detecting the first voice input comprises pausing the playback of the audio book. The first network device may further comprise computer instructions for receiving a notification to return the volume of the audio playback to a volume setting before adjustment. The message may be a first message. The first network device may further comprise computer instructions for sending a second message which comprises the first measure of the confidence associated with the detected first voice input to the second network device. The first network device may further comprise computer instructions for waiting for expiration of a timer before sending the second voice input to the server. The response may be a voice response. The first network device may further comprise computer instructions for audibly playing the voice response. The first voice input may be a wakeword and the second voice input may be a voice command. The first voice input may be the same as the second voice input.

Another example embodiment may include a method comprising: detecting a first voice input; determining a first measure of confidence associated with the first voice input; receiving a message, wherein the message comprises a second measure of confidence associated with detection of the first voice input by a network device; determining whether the first measure of confidence is greater than the second measure of confidence; and based on the determination that the first measure of confidence is greater than the second measure of confidence, sending a second voice input to a server. The method may further comprise adjusting a volume of audio playback in response to detecting the voice input. The method may further comprise determining that the audio playback is music playback, and where adjusting the volume of the audio playback in response to detecting the voice input comprises ducking the music playback. The method may further comprise determining that the audio playback is playback of an audio book, and where adjusting the volume of the audio playback in response to detecting the voice input comprises pausing the playback of the audio book. The method may further comprise receiving a notification to return the volume of the audio playback to a volume setting before adjustment. The method may further comprise waiting for expiration of a timer before sending the second voice input to the server. The method may further comprise audibly playing the voice response. The message may be a first message. The method may further comprise sending a second message which comprises the first measure of the confidence associated with the detected first voice input to the network device. The first voice input may be a wakeword and the second voice input may be voice command.

Yet another example embodiment may include a tangible non-transitory computer readable storage medium including instructions for execution by a processor, the instructions, when executed, cause the processor to implement a method comprising: detecting a first voice input; determining a first measure of confidence associated with the first voice input; receiving a message, wherein the message comprises a second measure of confidence associated with detection of the first voice input by a network device; determining whether the first measure of confidence is greater than the second measure of confidence; and based on the determination that the first measure of confidence is greater than the second measure of confidence, sending a second voice input to a server.

While some examples described herein may refer to functions performed by given actors such as "users" and/or other entities, it should be understood that this is for purposes of explanation only. The claims should not be interpreted to require action by any such example actor unless explicitly required by the language of the claims themselves. It will be understood by one of ordinary skill in the art that this disclosure includes numerous other embodiments. Moreover, the examples described herein may extend to a multitude of embodiments formed by combining the example features in any suitable manner.

II. Example Operating Environment

FIG. 1 shows an example configuration of a media playback system 100 in which one or more embodiments disclosed herein may be practiced or implemented. The media playback system 100 as shown is associated with an example home environment having several rooms and spaces, such as for example, a master bedroom, an office, a dining room, and a living room. As shown in the example of FIG. 1, the media playback system 100 includes playback devices 102-124, control devices 126 and 128, and a wired or wireless network router 130.

Further discussions relating to the different components of the example media playback system 100 and how the different components may interact to provide a user with a media experience may be found in the following sections. While discussions herein may generally refer to the example media playback system 100, technologies described herein are not limited to applications within, among other things, the home environment as shown in FIG. 1. For instance, the technologies described herein may be useful in environments where multi-zone audio may be desired, such as, for example, a commercial setting like a restaurant, mall or airport, a vehicle like a sports utility vehicle (SUV), bus or car, a ship or boat, an airplane, and so on.

a. Example Playback Devices

Figure 2:
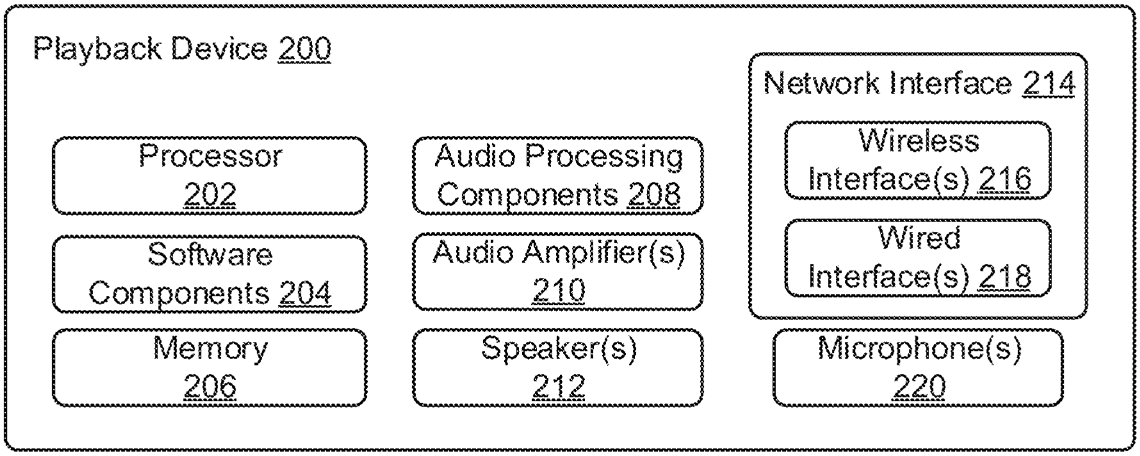
FIG. 2 shows a functional block diagram of an example playback device.

FIG. 2 shows a functional block diagram of an example playback device 200 that may be configured to be one or more of the playback devices 102-124 of the media playback system 100 of FIG. 1. The playback device 200 may include a processor 202, software components 204, memory 206, audio processing components 208, audio amplifier(s) 210, speaker(s) 212, a network interface 214 including wireless interface(s) 216 and wired interface(s) 218, and microphone(s) 220. In one case, the playback device 200 may not include the speaker(s) 212, but rather a speaker interface for connecting the playback device 200 to external speakers. In another case, the playback device 200 may include neither the speaker(s) 212 nor the audio amplifier(s) 210, but rather an audio interface for connecting the playback device 200 to an external audio amplifier or audio-visual receiver.

In one example, the processor 202 may be a clock-driven computing component configured to process input data according to instructions stored in the memory 206. The memory 206 may be a tangible computer-readable medium configured to store instructions executable by the processor 202. For instance, the memory 206 may be data storage that can be loaded with one or more of the software components 204 executable by the processor 202 to achieve certain functions. In one example, the functions may involve the playback device 200 retrieving audio data from an audio source or another playback device. In another example, the functions may involve the playback device 200 sending audio data to another device or playback device on a network. In yet another example, the functions may involve pairing of the playback device 200 with one or more playback devices to create a multi-channel audio environment.

Certain functions may involve the playback device 200 synchronizing playback of audio content with one or more other playback devices. During synchronous playback, a listener will preferably not be able to perceive time-delay differences between playback of the audio content by the playback device 200 and the one or more other playback devices. U.S. Pat. No. 8,234,395 entitled, "System and method for synchronizing operations among a plurality of independently clocked digital data processing devices," which is hereby incorporated by reference, provides in more detail some examples for audio playback synchronization among playback devices.

The memory 206 may further be configured to store data associated with the playback device 200, such as one or more zones and/or zone groups the playback device 200 is a part of, audio sources accessible by the playback device 200, or a playback queue that the playback device 200 (or some other playback device) may be associated with. The data may be stored as one or more state variables that are periodically updated and used to describe the state of the playback device 200. The memory 206 may also include the data associated with the state of the other devices of the media system, and shared from time to time among the devices so that one or more of the devices have the most recent data associated with the system. Other embodiments are also possible.

The audio processing components 208 may include one or more digital-to-analog converters (DAC), an audio preprocessing component, an audio enhancement component or a digital signal processor (DSP), and so on. In one embodiment, one or more of the audio processing components 208 may be a subcomponent of the processor 202. In one example, audio content may be processed and/or intentionally altered by the audio processing components 208 to produce audio signals. The produced audio signals may then be provided to the audio amplifier(s) 210 for amplification and playback through speaker(s) 212. Particularly, the audio amplifier(s) 210 may include devices configured to amplify audio signals to a level for driving one or more of the speakers 212. The speaker(s) 212 may include an individual transducer (e.g., a "driver") or a complete speaker system involving an enclosure with one or more drivers. A particular driver of the speaker(s) 212 may include, for example, a subwoofer (e.g., for low frequencies), a mid-range driver (e.g., for middle frequencies), and/or a tweeter (e.g., for high frequencies). In some cases, each transducer in the one or more speakers 212 may be driven by an individual corresponding audio amplifier of the audio amplifier(s) 210. In addition to producing analog signals for playback by the playback device 200, the audio processing components 208 may be configured to process audio content to be sent to one or more other playback devices for playback.

Audio content to be processed and/or played back by the playback device 200 may be received from an external source, such as via an audio line-in input connection (e.g., an auto-detecting 3.5 mm audio line-in connection) or the network interface 214.

The network interface 214 may be configured to facilitate a data flow between the playback device 200 and one or more other devices on a data network. As such, the playback device 200 may be configured to receive audio content over the data network from one or more other playback devices in communication with the playback device 200, network devices within a local area network, or audio content sources over a wide area network such as the Internet. In one example, the audio content and other signals transmitted and received by the playback device 200 may be transmitted in the form of digital packet data containing an Internet Protocol (IP)-based source address and IP-based destination addresses. In such a case, the network interface 214 may be configured to parse the digital packet data such that the data destined for the playback device 200 is properly received and processed by the playback device 200.

As shown, the network interface 214 may include wireless interface(s) 216 and wired interface(s) 218. The wireless interface(s) 216 may provide network interface functions for the playback device 200 to wirelessly communicate with other devices (e.g., other playback device(s), speaker(s), receiver(s), network device(s), control device(s) within a data network the playback device 200 is associated with) in accordance with a communication protocol (e.g., any wireless standard including IEEE 802.11a, 802.11b, 802.11g, 802.11n, 802.11ac, 802.15, 4G mobile communication standard, and so on). The wired interface(s) 218 may provide network interface functions for the playback device 200 to communicate over a wired connection with other devices in accordance with a communication protocol (e.g., IEEE 802.3). While the network interface 214 shown in FIG. 2 includes both wireless interface(s) 216 and wired interface(s) 218, the network interface 214 may in some embodiments include only wireless interface(s) or only wired interface(s).

The microphone(s) 220 may be arranged to detect sound in the environment of the playback device 200. For instance, the microphone(s) may be mounted on an exterior wall of a housing of the playback device. The microphone(s) may be any type of microphone now known or later developed such as a condenser microphone, electret condenser microphone, or a dynamic microphone. The microphone(s) may be sensitive to a portion of the frequency range of the speaker(s) 220. One or more of the speaker(s) 220 may operate in reverse as the microphone(s) 220. In some aspects, the playback device 200 might not include the microphone(s) 220.

In one example, the playback device 200 and one other playback device may be paired to play two separate audio components of audio content. For instance, playback device 200 may be configured to play a left channel audio component, while the other playback device may be configured to play a right channel audio component, thereby producing or enhancing a stereo effect of the audio content. The paired playback devices (also referred to as "bonded playback devices") may further play audio content in synchrony with other playback devices.

In another example, the playback device 200 may be sonically consolidated with one or more other playback devices to form a single, consolidated playback device. A consolidated playback device may be configured to process and reproduce sound differently than an unconsolidated playback device or playback devices that are paired, because a consolidated playback device may have additional speaker drivers through which audio content may be rendered. For instance, if the playback device 200 is a playback device designed to render low frequency range audio content (i.e. a subwoofer), the playback device 200 may be consolidated with a playback device designed to render full frequency range audio content. In such a case, the full frequency range playback device, when consolidated with the low frequency playback device 200, may be configured to render only the mid and high frequency components of audio content, while the low frequency range playback device 200 renders the low frequency component of the audio content. The consolidated playback device may further be paired with a single playback device or yet another consolidated playback device.

By way of illustration, SONOS, Inc. presently offers (or has offered) for sale certain playback devices including a "PLAY:1," "PLAY:3," "PLAY:5," "PLAYBAR," "CONNECT:AMP," "CONNECT," and "SUB." Any other past, present, and/or future playback devices may additionally or alternatively be used to implement the playback devices of example embodiments disclosed herein. Additionally, it is understood that a playback device is not limited to the example illustrated in FIG. 2 or to the SONOS product offerings. For example, a playback device may include a wired or wireless headphone. In another example, a playback device may include or interact with a docking station for personal mobile media playback devices. In yet another example, a playback device may be integral to another device or component such as a television, a lighting fixture, or some other device for indoor or outdoor use.

b. Example Playback Zone Configurations

Referring back to the media playback system 100 of FIG. 1, the environment may have one or more playback zones, each with one or more playback devices. The media playback system 100 may be established with one or more playback zones, after which one or more zones may be added, or removed to arrive at the example configuration shown in FIG. 1. Each zone may be given a name according to a different room or space such as an office, bathroom, master bedroom, bedroom, kitchen, dining room, living room, and/or balcony. In one case, a single playback zone may include multiple rooms or spaces. In another case, a single room or space may include multiple playback zones.

As shown in FIG. 1, the balcony, dining room, kitchen, bathroom, office, and bedroom zones each have one playback device, while the living room and master bedroom zones each have multiple playback devices. In the living room zone, playback devices 104, 106, 108, and 110 may be configured to play audio content in synchrony as individual playback devices, as one or more bonded playback devices, as one or more consolidated playback devices, or any combination thereof. Similarly, in the case of the master bedroom, playback devices 122 and 124 may be configured to play audio content in synchrony as individual playback devices, as a bonded playback device, or as a consolidated playback device.

In one example, one or more playback zones in the environment of FIG. 1 may each be playing different audio content. For instance, the user may be grilling in the balcony zone and listening to hip hop music being played by the playback device 102 while another user may be preparing food in the kitchen zone and listening to classical music being played by the playback device 114. In another example, a playback zone may play the same audio content in synchrony with another playback zone. For instance, the user may be in the office zone where the playback device 118 is playing the same rock music that is being playing by playback device 102 in the balcony zone. In such a case, playback devices 102 and 118 may be playing the rock music in synchrony such that the user may seamlessly (or at least substantially seamlessly) enjoy the audio content that is being played out-loud while moving between different playback zones. Synchronization among playback zones may be achieved in a manner similar to that of synchronization among playback devices, as described in previously referenced U.S. Pat. No. 8,234,395.

As suggested above, the zone configurations of the media playback system 100 may be dynamically modified, and in some embodiments, the media playback system 100 supports numerous configurations. For instance, if a user physically moves one or more playback devices to or from a zone, the media playback system 100 may be reconfigured to accommodate the change(s). For instance, if the user physically moves the playback device 102 from the balcony zone to the office zone, the office zone may now include both the playback device 118 and the playback device 102. The playback device 102 may be paired or grouped with the office zone and/or renamed if so desired via a control device such as the control devices 126 and 128. On the other hand, if the one or more playback devices are moved to a particular area in the home environment that is not already a playback zone, a new playback zone may be created for the particular area.

Further, different playback zones of the media playback system 100 may be dynamically combined into zone groups or split up into individual playback zones. For instance, the dining room zone and the kitchen zone 114 may be combined into a zone group for a dinner party such that playback devices 112 and 114 may render audio content in synchrony. On the other hand, the living room zone may be split into a television zone including playback device 104, and a listening zone including playback devices 106, 108, and 110, if the user wishes to listen to music in the living room space while another user wishes to watch television.

c. Example Control Devices

Figure 3:
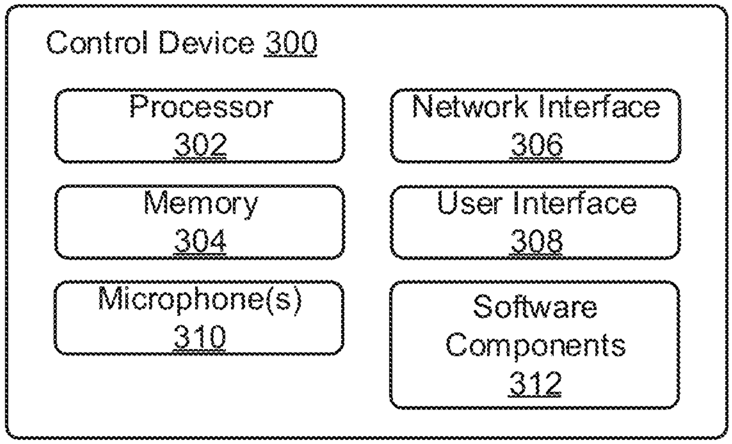
FIG. 3 shows a functional block diagram of an example control device.

FIG. 3 shows a functional block diagram of an example control device 300 that may be configured to be one or both of the control devices 126 and 128 of the media playback system 100. As shown, the control device 300 may include a processor 302, memory 304, a network interface 306, a user interface 308, microphone(s) 310, and software components 312. In one example, the control device 300 may be a dedicated controller for the media playback system 100. In another example, the control device 300 may be a network device on which media playback system controller application software may be installed, such as for example, an iPhone™, iPad™ or any other smart phone, tablet or network device (e.g., a networked computer such as a PC or Mac™).

The processor 302 may be configured to perform functions relevant to facilitating user access, control, and configuration of the media playback system 100. The memory 304 may be data storage that can be loaded with one or more of the software components executable by the processor 302 to perform those functions. The memory 304 may also be configured to store the media playback system controller application software and other data associated with the media playback system 100 and the user.

In one example, the network interface 306 may be based on an industry standard (e.g., infrared, radio, wired standards including IEEE 802.3, wireless standards including IEEE 802.11a, 802.11b, 802.11g, 802.11n, 802.11ac, 802.15, 4G mobile communication standard, and so on). The network interface 306 may provide a means for the control device 300 to communicate with other devices in the media playback system 100. In one example, data and information (e.g., such as a state variable) may be communicated between control device 300 and other devices via the network interface 306. For instance, playback zone and zone group configurations in the media playback system 100 may be received by the control device 300 from a playback device or another network device, or transmitted by the control device 300 to another playback device or network device via the network interface 306. In some cases, the other network device may be another control device.

Playback device control commands such as volume control and audio playback control may also be communicated from the control device 300 to a playback device via the network interface 306. As suggested above, changes to configurations of the media playback system 100 may also be performed by a user using the control device 300. The configuration changes may include adding/removing one or more playback devices to/from a zone, adding/removing one or more zones to/from a zone group, forming a bonded or consolidated player, separating one or more playback devices from a bonded or consolidated player, among others. Accordingly, the control device 300 may sometimes be referred to as a controller, whether the control device 300 is a dedicated controller or a network device on which media playback system controller application software is installed.

Control device 300 may include microphone(s) 310. Microphone(s) 310 may be arranged to detect sound in the environment of the control device 300. Microphone(s) 310 may be any type of microphone now known or later developed such as a condenser microphone, electret condenser microphone, or a dynamic microphone. The microphone(s) may be sensitive to a portion of a frequency range. Two or more microphones 310 may be arranged to capture location information of an audio source (e.g., voice, audible sound) and/or to assist in filtering background noise.

Figure 4:
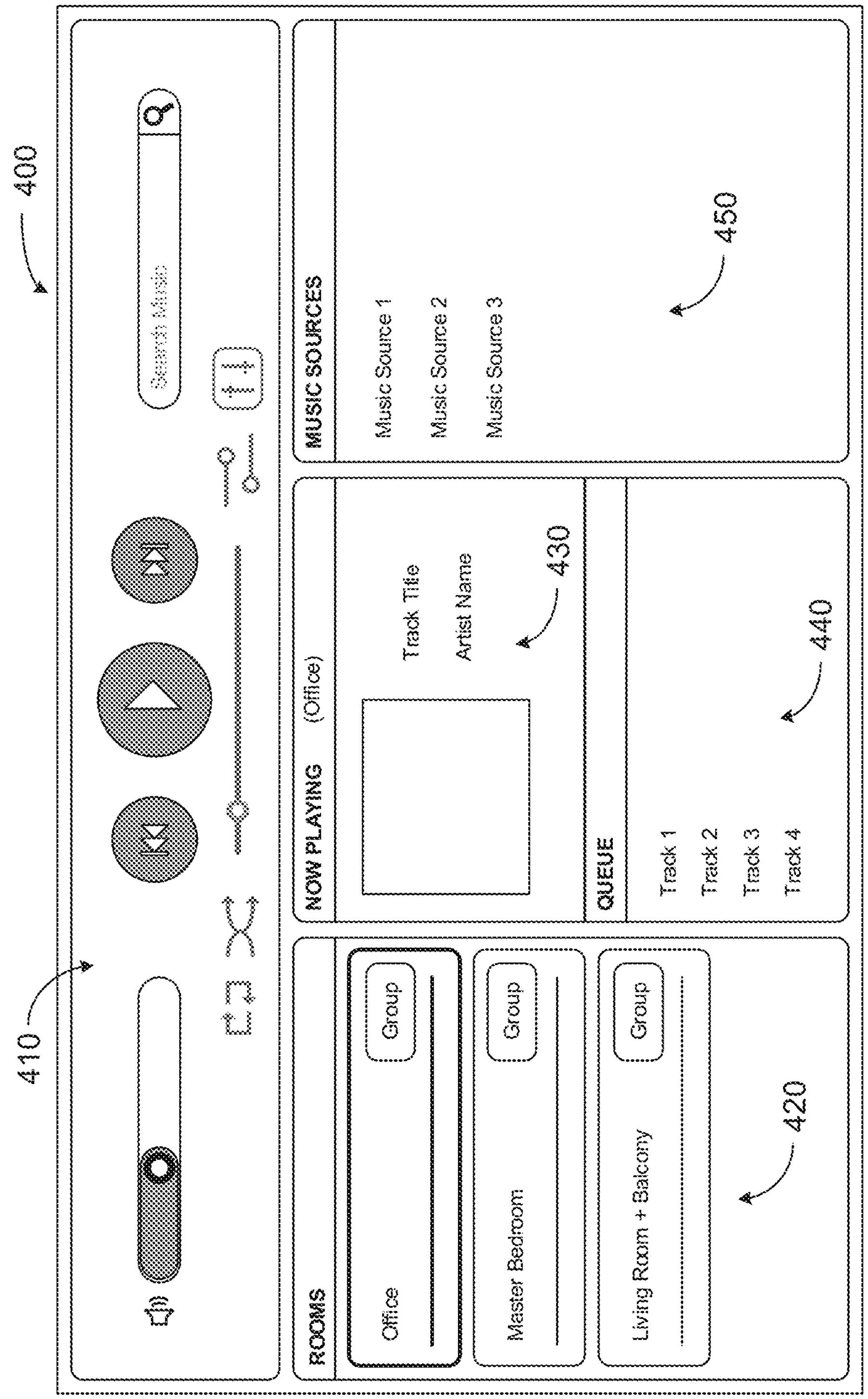
FIG. 4 shows an example controller interface.

The user interface 308 of the control device 300 may be configured to facilitate user access and control of the media playback system 100, by providing a controller interface such as the controller interface 400 shown in FIG. 4. The controller interface 400 includes a playback control region 410, a playback zone region 420, a playback status region 430, a playback queue region 440, and an audio content sources region 450. The user interface 400 as shown is just one example of a user interface that may be provided on a network device such as the control device 300 of FIG. 3 (and/or the control devices 126 and 128 of FIG. 1) and accessed by users to control a media playback system such as the media playback system 100. Other user interfaces of varying formats, styles, and interactive sequences may alternatively be implemented on one or more network devices to provide comparable control access to a media playback system.

The playback control region 410 may include selectable (e.g., by way of touch or by using a cursor) icons to cause playback devices in a selected playback zone or zone group to play or pause, fast forward, rewind, skip to next, skip to previous, enter/exit shuffle mode, enter/exit repeat mode, enter/exit cross fade mode. The playback control region 410 may also include selectable icons to modify equalization settings, and playback volume, among other possibilities.

The playback zone region 420 may include representations of playback zones within the media playback system 100. In some embodiments, the graphical representations of playback zones may be selectable to bring up additional selectable icons to manage or configure the playback zones in the media playback system, such as a creation of bonded zones, creation of zone groups, separation of zone groups, and renaming of zone groups, among other possibilities.

For example, as shown, a "group" icon may be provided within each of the graphical representations of playback zones. The "group" icon provided within a graphical representation of a particular zone may be selectable to bring up options to select one or more other zones in the media playback system to be grouped with the particular zone. Once grouped, playback devices in the zones that have been grouped with the particular zone will be configured to play audio content in synchrony with the playback device(s) in the particular zone. Analogously, a "group" icon may be provided within a graphical representation of a zone group. In this case, the "group" icon may be selectable to bring up options to deselect one or more zones in the zone group to be removed from the zone group. Other interactions and implementations for grouping and ungrouping zones via a user interface such as the user interface 400 are also possible. The representations of playback zones in the playback zone region 420 may be dynamically updated as playback zone or zone group configurations are modified.

The playback status region 430 may include graphical representations of audio content that is presently being played, previously played, or scheduled to play next in the selected playback zone or zone group. The selected playback zone or zone group may be visually distinguished on the user interface, such as within the playback zone region 420 and/or the playback status region 430. The graphical representations may include track title, artist name, album name, album year, track length, and other relevant information that may be useful for the user to know when controlling the media playback system via the user interface 400.

The playback queue region 440 may include graphical representations of audio content in a playback queue associated with the selected playback zone or zone group. In some embodiments, each playback zone or zone group may be associated with a playback queue containing information corresponding to zero or more audio items for playback by the playback zone or zone group. For instance, each audio item in the playback queue may comprise a uniform resource identifier (URI), a uniform resource locator (URL) or some other identifier that may be used by a playback device in the playback zone or zone group to find and/or retrieve the audio item from a local audio content source or a networked audio content source, possibly for playback by the playback device.

In one example, a playlist may be added to a playback queue, in which case information corresponding to each audio item in the playlist may be added to the playback queue. In another example, audio items in a playback queue may be saved as a playlist. In a further example, a playback queue may be empty, or populated but "not in use" when the playback zone or zone group is playing continuously streaming audio content, such as Internet radio that may continue to play until otherwise stopped, rather than discrete audio items that have playback durations. In an alternative embodiment, a playback queue can include Internet radio and/or other streaming audio content items and be "in use" when the playback zone or zone group is playing those items. Other examples are also possible.

When playback zones or zone groups are "grouped" or "ungrouped," playback queues associated with the affected playback zones or zone groups may be cleared or re-associated. For example, if a first playback zone including a first playback queue is grouped with a second playback zone including a second playback queue, the established zone group may have an associated playback queue that is initially empty, that contains audio items from the first playback queue (such as if the second playback zone was added to the first playback zone), that contains audio items from the second playback queue (such as if the first playback zone was added to the second playback zone), or a combination of audio items from both the first and second playback queues. Subsequently, if the established zone group is ungrouped, the resulting first playback zone may be re-associated with the previous first playback queue, or be associated with a new playback queue that is empty or contains audio items from the playback queue associated with the established zone group before the established zone group was ungrouped. Similarly, the resulting second playback zone may be re-associated with the previous second playback queue, or be associated with a new playback queue that is empty, or contains audio items from the playback queue associated with the established zone group before the established zone group was ungrouped. Other examples are also possible.

Referring back to the user interface 400 of FIG. 4, the graphical representations of audio content in the playback queue region 440 may include track titles, artist names, track lengths, and other relevant information associated with the audio content in the playback queue. In one example, graphical representations of audio content may be selectable to bring up additional selectable icons to manage and/or manipulate the playback queue and/or audio content represented in the playback queue. For instance, a represented audio content may be removed from the playback queue, moved to a different position within the playback queue, or selected to be played immediately, or after any currently playing audio content, among other possibilities. A playback queue associated with a playback zone or zone group may be stored in a memory on one or more playback devices in the playback zone or zone group, on a playback device that is not in the playback zone or zone group, and/or some other designated device.

The audio content sources region 450 may include graphical representations of selectable audio content sources from which audio content may be retrieved and played by the selected playback zone or zone group. Discussions pertaining to audio content sources may be found in the following section.

d. Example Audio Content Sources

As indicated previously, one or more playback devices in a zone or zone group may be configured to retrieve for playback audio content (e.g. according to a corresponding URI or URL for the audio content) from a variety of available audio content sources. In one example, audio content may be retrieved by a playback device directly from a corresponding audio content source (e.g., a line-in connection). In another example, audio content may be provided to a playback device over a network via one or more other playback devices or network devices.

Example audio content sources may include a memory of one or more playback devices in a media playback system such as the media playback system 100 of FIG. 1, local music libraries on one or more network devices (such as a control device, a network-enabled personal computer, or a networked-attached storage (NAS), for example), streaming audio services providing audio content via the Internet (e.g., the cloud), or audio sources connected to the media playback system via a line-in input connection on a playback device or network devise, among other possibilities.

In some embodiments, audio content sources may be regularly added or removed from a media playback system such as the media playback system 100 of FIG. 1. In one example, an indexing of audio items may be performed whenever one or more audio content sources are added, removed or updated. Indexing of audio items may involve scanning for identifiable audio items in all folders/directory shared over a network accessible by playback devices in the media playback system, and generating or updating an audio content database containing metadata (e.g., title, artist, album, track length, among others) and other associated information, such as a URI or URL for each identifiable audio item found. Other examples for managing and maintaining audio content sources may also be possible.

The above discussions relating to playback devices, controller devices, playback zone configurations, and media content sources provide only some examples of operating environments within which functions and methods described below may be implemented. Other operating environments and configurations of media playback systems, playback devices, and network devices not explicitly described herein may also be applicable and suitable for implementation of the functions and methods.

e. Example Plurality of Networked Devices

Figure 5:
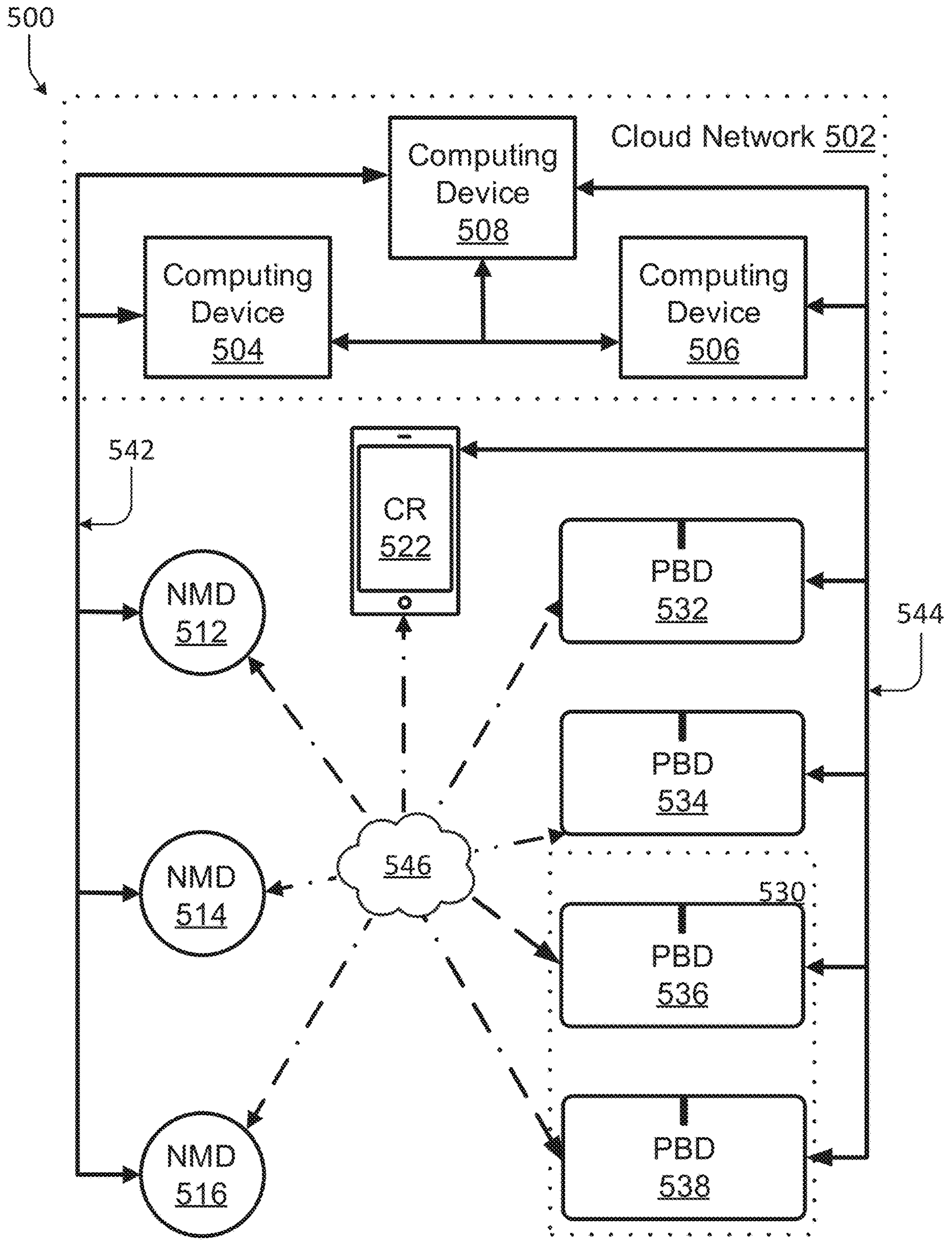
FIG. 5 shows an example plurality of network devices.

FIG. 5 shows an example plurality of devices 500 that may be configured to provide an audio playback experience based on voice control. One having ordinary skill in the art will appreciate that the devices shown in FIG. 5 are for illustrative purposes only, and variations including different and/or additional devices may be possible. As shown, the plurality of devices 500 includes computing devices 504, 506, and 508; network microphone devices (NMDs) 512, 514, and 516; playback devices (PBDs) 532, 534, 536, and 538; and a controller device (CR) 522.

Each of the plurality of devices 500 may be network-capable devices that can establish communication with one or more other devices in the plurality of devices according to one or more network protocols, such as NFC, Bluetooth, Ethernet, and IEEE 802.11, among other examples, over one or more types of networks, such as wide area networks (WAN), local area networks (LAN), and personal area networks (PAN), among other possibilities.

As shown, the computing devices 504, 506, and 508 may be part of a cloud network 502. The cloud network 502 may include additional computing devices. In one example, the computing devices 504, 506, and 508 may be different servers. In another example, two or more of the computing devices 504, 506, and 508 may be modules of a single server. Analogously, each of the computing device 504, 506, and 508 may include one or more modules or servers. For ease of illustration purposes herein, each of the computing devices 504, 506, and 508 may be configured to perform particular functions within the cloud network 502. For instance, computing device 508 may be a source of audio content for a streaming music service.

As shown, the computing device 504 may be configured to interface with NMDs 512, 514, and 516 via communication path 542. NMDs 512, 514, and 516 may be components of one or more "Smart Home" systems. In one case, NMDs 512, 514, and 516 may be physically distributed throughout a household, similar to the distribution of devices shown in FIG. 1. In another case, two or more of the NMDs 512, 514, and 516 may be physically positioned within relative close proximity of one another. Communication path 542 may comprise one or more types of networks, such as a WAN including the Internet, LAN, and/or PAN, among other possibilities.

In one example, one or more of the NMDs 512, 514, and 516 may be devices configured primarily for audio detection. In another example, one or more of the NMDs 512, 514, and 516 may be components of devices having various primary utilities. For instance, as discussed above in connection to FIGS. 2 and 3, one or more of NMDs 512, 514, and 516 may be the microphone(s) 220 of playback device 200 or the microphone(s) 310 of network device 300. Further, in some cases, one or more of NMDs 512, 514, and 516 may be the playback device 200 or network device 300. In an example, one or more of NMDs 512, 514, and/or 516 may include multiple microphones arranged in a microphone array.

As shown, the computing device 506 may be configured to interface with CR 522 and PBDs 532, 534, 536, and 538 via communication path 544. In one example, CR 522 may be a network device such as the network device 200 of FIG. 2. Accordingly, CR 522 may be configured to provide the controller interface 400 of FIG. 4. Similarly, PBDs 532, 534, 536, and 538 may be playback devices such as the playback device 300 of FIG. 3. As such, PBDs 532, 534, 536, and 538 may be physically distributed throughout a household as shown in FIG. 1. For illustration purposes, PBDs 536 and 538 may be part of a bonded zone 530, while PBDs 532 and 534 may be part of their own respective zones. As described above, the PBDs 532, 534, 536, and 538 may be dynamically bonded, grouped, unbonded, and ungrouped. Communication path 544 may comprise one or more types of networks, such as a WAN including the Internet, LAN, and/or PAN, among other possibilities.

In one example, as with NMDs 512, 514, and 516, CR522 and PBDs 532, 534, 536, and 538 may also be components of one or more "Smart Home" systems. In one case, PBDs 532, 534, 536, and 538 may be distributed throughout the same household as the NMDs 512, 514, and 516. Further, as suggested above, one or more of PBDs 532, 534, 536, and 538 may be one or more of NMDs 512, 514, and 516.

The NMDs 512, 514, and 516 may be part of a local area network, and the communication path 542 may include an access point that links the local area network of the NMDs 512, 514, and 516 to the computing device 504 over a WAN (communication path not shown). Likewise, each of the NMDs 512, 514, and 516 may communicate with each other via such an access point.

Similarly, CR 522 and PBDs 532, 534, 536, and 538 may be part of a local area network and/or a local playback network as discussed in previous sections, and the communication path 544 may include an access point that links the local area network and/or local playback network of CR 522 and PBDs 532, 534, 536, and 538 to the computing device 506 over a WAN. As such, each of the CR 522 and PBDs 532, 534, 536, and 538 may also communicate with each over such an access point.

In one example, a single access point may include communication paths 542 and 544. In an example, each of the NMDs 512, 514, and 516, CR 522, and PBDs 532, 534, 536, and 538 may access the cloud network 502 via the same access point for a household.

As shown in FIG. 5, each of the NMDs 512, 514, and 516, CR 522, and PBDs 532, 534, 536, and 538 may also directly communicate with one or more of the other devices via communication means 546. Communication means 546 as described herein may involve one or more forms of communication between the devices, according to one or more network protocols, over one or more types of networks, and/or may involve communication via one or more other network devices. For instance, communication means 546 may include one or more of for example, Bluetooth™ (IEEE 802.15), NFC, Wireless direct, and/or Proprietary wireless, among other possibilities.

In one example, CR 522 may communicate with NMD 512 over Bluetooth™, and communicate with PBD 534 over another local area network. In another example, NMD 514 may communicate with CR 522 over another local area network, and communicate with PBD 536 over Bluetooth. In a further example, each of the PBDs 532, 534, 536, and 538 may communicate with each other according to a spanning tree protocol over a local playback network, while each communicating with CR 522 over a local area network, different from the local playback network. Other examples are also possible.

In some cases, communication means between the NMDs 512, 514, and 516, CR 522, and PBDs 532, 534, 536, and 538 may change depending on types of communication between the devices, network conditions, and/or latency demands. For instance, communication means 546 may be used when NMD 516 is first introduced to the household with the PBDs 532, 534, 536, and 538. In one case, the NMD 516 may transmit identification information corresponding to the NMD 516 to PBD 538 via NFC, and PBD 538 may in response, transmit local area network information to NMD 516 via NFC (or some other form of communication). However, once NMD 516 has been configured within the household, communication means between NMD 516 and PBD 538 may change. For instance, NMD 516 may subsequently communicate with PBD 538 via communication path 542, the cloud network 502, and communication path 544. In another example, the NMDs and PBDs may never communicate via local communications means 546. In a further example, the NMDs and PBDs may communicate primarily via local communications means 546. Other examples are also possible.

In an illustrative example, NMDs 512, 514, and 516 may be configured to receive voice inputs to control PBDs 532, 534, 536, and 538. The available control commands may include any media playback system controls previously discussed, such as playback volume control, playback transport controls, music source selection, and grouping, among other possibilities. In one instance, NMD 512 may receive a voice input to control one or more of the PBDs 532, 534, 536, and 538. In response to receiving the voice input, NMD 512 may transmit via communication path 542, the voice input to computing device 504 for processing. In one example, the computing device 504 may convert the voice input to an equivalent text command, and parse the text command to identify a command. Computing device 504 may then subsequently transmit the text command to the computing device 506. In another example, the computing device 504 may convert the voice input to an equivalent text command, and then subsequently transmit the text command to the computing device 506. The computing device 506 may then parse the text command to identify one or more playback commands.

For instance, if the text command is "Play 'Track 1' by 'Artist 1' from 'Streaming Service 1' in 'Zone 1'," The computing device 506 may identify (i) a URL for "Track 1" by "Artist 1" available from "Streaming Service 1," and (ii) at least one playback device in "Zone 1." In this example, the URL for "Track 1" by "Artist 1" from "Streaming Service 1" may be a URL pointing to computing device 508, and "Zone 1" may be the bonded zone 530. As such, upon identifying the URL and one or both of PBDs 536 and 538, the computing device 506 may transmit via communication path 544 to one or both of PBDs 536 and 538, the identified URL for playback. One or both of PBDs 536 and 538 may responsively retrieve audio content from the computing device 508 according to the received URL, and begin playing "Track 1" by "Artist 1" from "Streaming Service 1."

One having ordinary skill in the art will appreciate that the above is just one illustrative example, and that other implementations are also possible. In one case, operations performed by one or more of the plurality of devices 500, as described above, may be performed by one or more other devices in the plurality of device 500. For instance, the conversion from voice input to the text command may be alternatively, partially, or wholly performed by another device or devices, such as NMD 512, computing device 506, PBD 536, and/or PBD 538. Analogously, the identification of the URL may be alternatively, partially, or wholly performed by another device or devices, such as NMD 512, computing device 504, PBD 536, and/or PBD 538.

f. Example Network Microphone Device

Figure 6:
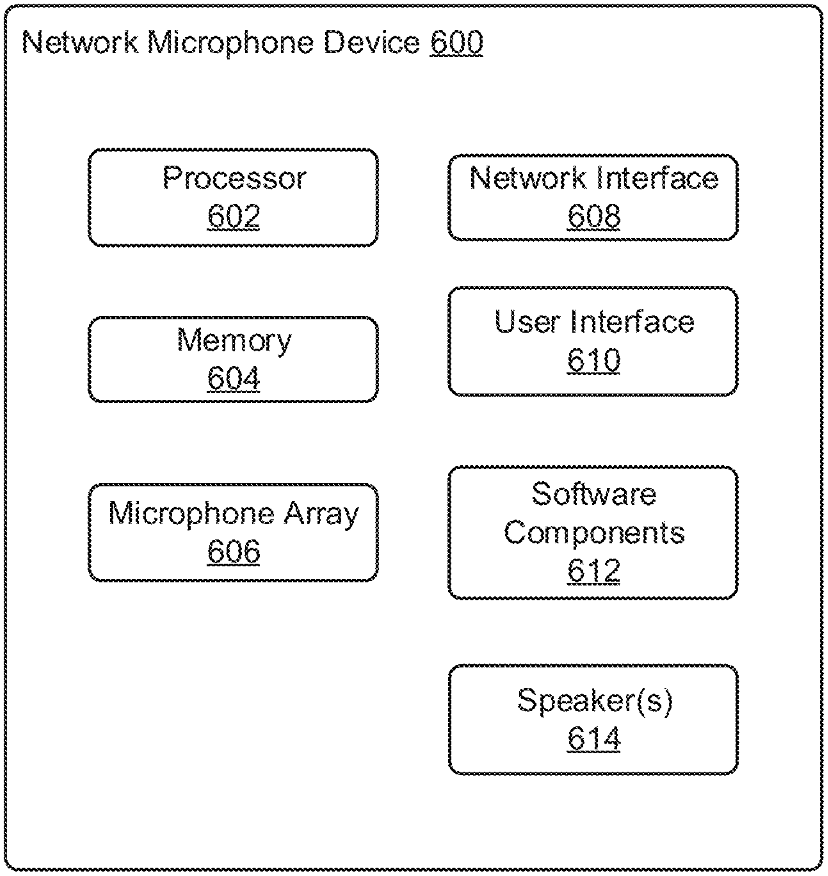
FIG. 6 shows a functional block diagram of an example network microphone device.

FIG. 6 shows a function block diagram of an example network microphone device 600 that may be configured to be one or more of NMDs 512, 514, and 516 of FIG. 5. As shown, the network microphone device 600 includes a processor 602, memory 604, a microphone array 606, a network interface 608, a user interface 610, software components 612, and speaker(s) 614. One having ordinary skill in the art will appreciate that other network microphone device configurations and arrangements are also possible. For instance, network microphone devices may alternatively exclude the speaker(s) 614 or have a single microphone instead of microphone array 606.

The processor 602 may include one or more processors and/or controllers, which may take the form of a general or special-purpose processor or controller. For instance, the processing unit 602 may include microprocessors, microcontrollers, application-specific integrated circuits, digital signal processors, and the like. The memory 604 may be data storage that can be loaded with one or more of the software components executable by the processor 602 to perform those functions. Accordingly, memory 604 may comprise one or more non-transitory computer-readable storage mediums, examples of which may include volatile storage mediums such as random access memory, registers, cache, etc. and non-volatile storage mediums such as read-only memory, a hard-disk drive, a solid-state drive, flash memory, and/or an optical-storage device, among other possibilities.

The microphone array 606 may be a plurality of microphones arranged to detect sound in the environment of the network microphone device 600. Microphone array 606 may include any type of microphone now known or later developed such as a condenser microphone, electret condenser microphone, or a dynamic microphone, among other possibilities. In one example, the microphone array may be arranged to detect audio from one or more directions relative to the network microphone device. The microphone array 606 may be sensitive to a portion of a frequency range. In one example, a first subset of the microphone array 606 may be sensitive to a first frequency range, while a second subset of the microphone array may be sensitive to a second frequency range. The microphone array 606 may further be arranged to capture location information of an audio source (e.g., voice, audible sound) and/or to assist in filtering background noise. Notably, in some embodiments the microphone array may consist of only a single microphone, rather than a plurality of microphones.

The network interface 608 may be configured to facilitate wireless and/or wired communication between various network devices, such as, in reference to FIG. 5, CR 522, PBDs 532-538, computing device 504-508 in cloud network 502, and other network microphone devices, among other possibilities. As such, network interface 608 may take any suitable form for carrying out these functions, examples of which may include an Ethernet interface, a serial bus interface (e.g., FireWire, USB 2.0, etc.), a chipset and antenna adapted to facilitate wireless communication, and/or any other interface that provides for wired and/or wireless communication. In one example, the network interface 608 may be based on an industry standard (e.g., infrared, radio, wired standards including IEEE 802.3, wireless standards including IEEE 802.11a, 802.11b, 802.11g, 802.11n, 802.11ac, 802.15, 4G mobile communication standard, and so on).

The user interface 610 of the network microphone device 600 may be configured to facilitate user interactions with the network microphone device. In one example, the user interface 608 may include one or more of physical buttons, graphical interfaces provided on touch sensitive screen(s) and/or surface(s), among other possibilities, for a user to directly provide input to the network microphone device 600. The user interface 610 may further include one or more of lights and the speaker(s) 614 to provide visual and/or audio feedback to a user. In one example, the network microphone device 600 may further be configured to playback audio content via the speaker(s) 614. In this case, the NMD 600 may also includes the functions and features associated with the playback device 200.

III. Example Systems and Methods for Arbitration-Based Voice Recognition

A plurality of NMDs may be communicatively coupled via the communication means 546. One or more of the plurality of NMDs may detect a wakeword associated with a voice command spoken by a speaker. The voice command may be a request for information such as "What is the volume setting?" or "What songs are in the playlist?" Alternatively, the voice commands may include commands to modify any of media playback playback settings such as playback volume, playback transport controls, music source selection, and grouping, among other possibilities. As more household devices become "smart" (e.g., by incorporating a network interface), voice commands may be used to control household devices other than media playback devices. The voice command may take other forms as well.

Embodiments described herein are directed to a method and system for arbitrating which NMD of multiple NMDs may send a voice input (e.g., voice command or wakeword and voice command) to a cloud-based computing device, e.g., server. The NMD may send the voice input to the cloud-based computing device so that the cloud-based computing device can perform voice recognition on the voice input. The voice recognition allows for identification of the requested control or information. For example, the arbitration process avoids having multiple NMDs send a same voice command to the cloud-based computing device, and thereby avoids potentially wasting bandwidth which could otherwise be used for other activities such as playing music.

Generally, it should be understood that one or more functions described herein may be performed by the NMD individually or in combination with the computing device 504-506, PBDs 532-538, NMDs 512-516, CR 522, or any other devices described herein.

Figure 7:
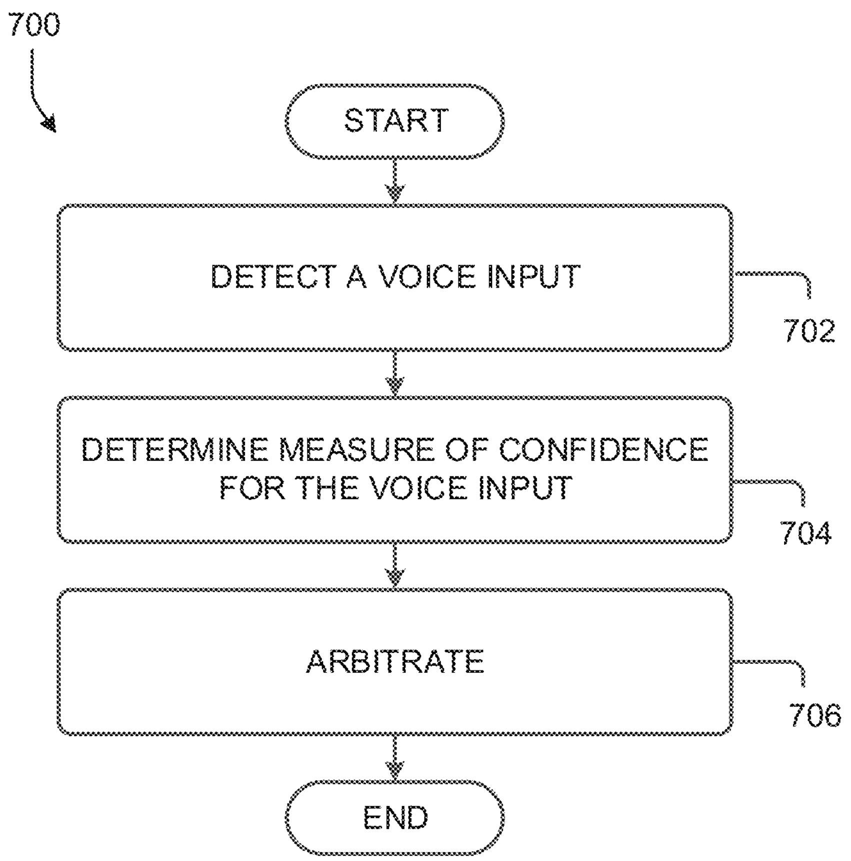
FIG. 7 shows a simplified flow diagram of functions associated with arbitration between network microphone devices.

Implementation 700 shown in FIG. 7 presents an embodiment of example techniques described herein. Briefly, at 702, a voice input may be detected. At 704, a measure of confidence may be determined for the voice input. At 706, an arbitration process may be performed. The arbitration process may involve determining whether the NMD is to send a received voice command or a received voice command and the voice input to a server for voice recognition. Multiple NMDs in the household may perform the functions described in FIG. 7.

Implementation 700 can be implemented within an operating environment including or involving, for example, the one or more NMDs 512-516 in the configuration shown in FIG. 5. The one or more of blocks 702-706 may include one or more operations, functions, or actions. Although the blocks are illustrated in sequential order, these blocks may also be performed in parallel, and/or in a different order than those described herein. Also, the various blocks may be combined into fewer blocks, divided into additional blocks, and/or removed based upon the desired implementation.

In addition, for the implementation 700 and other processes and methods disclosed herein, the flowchart shows functionality and operation of one possible implementation of some embodiments. In this regard, each block may represent a module, a segment, or a portion of program code, which includes one or more instructions executable by a processor for implementing specific logical functions or steps in the process. The program code may be stored on any type of computer readable medium, for example, such as a storage device including a disk or hard drive. The computer readable medium may include non-transitory computer readable medium, for example, such as tangible, non-transitory computer-readable media that stores data for short periods of time like register memory, processor cache and Random Access Memory (RAM). The computer readable medium may also include non-transitory media, such as secondary or persistent long term storage, like read only memory (ROM), optical or magnetic disks, compact-disc read only memory (CD-ROM), for example. The computer readable media may also be any other volatile or non-volatile storage systems. The computer readable medium may be considered a computer readable storage medium, for example, or a tangible storage device. In addition, for the implementation 700 and other processes and methods disclosed herein, each block in FIG. 7 may represent circuitry that is wired to perform the specific logical functions in the process.

Referring back to FIG. 7, at 702, the voice input may be detected. For example, an NMD may have one or more microphones to receive the voice input. In some embodiments, the voice input may take the form of the wakeword. The wakeword may be a spoken voice input such as "Alexa", "OK Google", "Hey Sonos", or "Hey Siri", among other examples.

The wakeword may be an indication for the NMD to "wake up" and start receiving a voice input which follows the wakeword. The voice input may be a voice command that is received by the NMD. The NMD may store a voice recording of the received voice command, e.g., in a ring or circular buffer, as the voice command is received. In this regard, the voice recording may be discarded unless the NMD sends the received voice command to the server for processing. The ring or circular buffer may be stored locally and/or remotely via any of the devices or servers described herein.

In some instances, NMD may also adjust audio being played back by the NMD so that the voice command which follows the wakeword is clearly received. The audio may be adjusted in a variety of manners. In one embodiment, the audio may be ducked. Ducking may involve lowering the volume of the audio, for example to a volume proportional to a volume of the detected wakeword. In another embodiment, the audio may be paused. Whether the audio is ducked or paused may depend on a type of the audio and a desired user experience. The NMD may determine the type of audio based on an indicator associated with the audio. For example, the NMD may duck audio in the form of music and the NMD may pause audio in the form of an audio book or podcast. In another example, and as explained further below, audio may be ducked or paused depending on an available processing power of the NMD. Other arrangements are also possible.

The NMD may adjust the audio itself. Additionally, or alternatively, the NMD may adjust the audio played back by audio playback devices in a bonded zone with the NMD, e.g., devices playing audio in stereo. For example, a notification may be sent to the bonded audio playback devices. In some instances, the notification may take the form of a Universal Plug and Play (UPnP) control request.

In some embodiments, the detection of the voice input may also trigger the start of a time interval indicative of how long the NMD waits before sending the received voice command to the server. At one extreme, the NMD may send the voice command as soon as the wakeword is detected. Minimal latency in voice recognition is introduced but arbitration might need to be performed by the server as between two or more NMDs which send a voice command. At another extreme, the NMD may send the voice command after a long time interval, e.g., 100 ms. The long time interval may permit sufficient time to arbitrate, but significant latency is introduced into the voice recognition. Accordingly, the selection of the time interval may balance interests of providing enough time to perform arbitration and minimizing latency in voice recognition.

In some embodiments, the time interval may be the same for all NMDs. In other embodiments, the time interval may be locally determined. For example, the time interval may be based on a number of NMDs connected to communication means 546. The time interval may be set longer if there are more NMDs connected to the communication means 546 and set shorter if there are less NMDs connected to the communication means 546. More NMDs may mean it takes longer for NMDs to communicate with each other to perform the arbitration and less NMDs may mean that it takes less time for NMDs to communicate with each other to perform the arbitration.

For example, the time interval may be set based on a proximity of NMDs to each other. The closer the NMDs are to each other, the shorter the time interval. Conversely, the further apart the NMDs are, the longer the time interval. Closer NMDs may mean it takes less time for NMDs to communicate with each other to perform the arbitration and NMDs spaced further apart may mean that it takes more time for NMDs to communicate with each other to perform the arbitration.

For example, the time interval may be set based on whether the NMDs are wired or wirelessly connected to each other. Wired connections may result in setting a shorter time interval to perform arbitration because the wired connection may be more reliable and require less retransmissions. Wireless connections may result in setting a longer time interval to perform arbitration because the wireless connections may be less reliable and require more retransmissions.

For example, the time interval may be set based on a type of network that connects the NMDs to each other, e.g., a WiFi network or a propriety network such as SonosNet. Networks with fewer number of hops between NMDs may result in setting a shorter time interval to perform arbitration. Conversely, networks with larger number of hops between NMDs may result in setting a longer time interval to perform arbitration. Less hops may mean it takes less time for NMDs to communicate with each other and more hops may mean that it takes more time for NMDs to communicate with each other.

In some embodiments, the time interval may be a static value. In other embodiments, the time interval may be a dynamic value. For example, the time interval may be tuned based on a learning algorithm which balances needs of providing enough time to perform the arbitration and addressing latency concerns. The learning algorithm may initially choose a time interval (e.g., 20 ms) indicative of how long the NMD will wait before deciding whether to send the received voice command to the server. Then, the time interval may be increased (e.g., to 40 ms) if a "mistake" is detected by the server. The mistake may be that two or more NMDs separately send the voice command which follows the wakeword to the server. In this case, the server may notify the NMD to increase its time interval. The learning algorithm may be applied to the household, a group of NMDs, or a single NMD.

At 704, a measure of confidence may be determined for the detected voice input. The measure of confidence may indicate how well the wakeword was detected. The NMD may determine a characteristic associated with the detected wakeword. In one example, the characteristic may take the form of an audio envelope of the wakeword. The audio envelope may define an amplitude and/or a duration of a wakeword in a time domain. In another example, the characteristic may take the form of a frequency spectrum of the wakeword. The frequency spectrum may define frequency content of a wakeword in a frequency domain. The NMD may store and/or receive from the computing device 504-508 an ideal characteristic for each wakeword that the NMD might receive. The ideal characteristic may be, for example, the audio envelope, duration, or frequency spectrum of a wakeword when no noise is present. A characteristic of the detected wakeword may be compared to a corresponding ideal characteristic. A high degree of correlation between the characteristic of the detected wakeword and an ideal characteristic may indicate that the detected wakeword is likely the wakeword associated with the ideal characteristic. The NMD may identify the wakeword with the highest degree of correlation.

In some embodiments, the measure of confidence may be indicative of this correlation. The measure of confidence might be, for example, a number from 0 to 1 or 0 to 100. For example, a detection with no background noise may receive a value of 1 (in the 0 to 1 range) indicating a high degree of confidence that a specific wakeword was detected while a detection with a lot of distortion or noise might receive a 0.1 (in the 0 to 1 range) indicating a low degree of confidence that the specific wakeword was detected. For example, a detection with no background noise may receive a value of 100 (in the 0 to 100 range) indicating a high degree of confidence that a specific wakeword was detected while a detection with a lot of distortion or noise might receive a 10 (in the 0 to 100 range) indicating a low degree of confidence that the specific wakeword was detected. For example, a detection with no background noise may receive a value of 10 (in the 0 to 100 range) indicating a high degree of confidence that a specific wakeword was detected while a detection with a lot of distortion or noise might receive a 100 (in the 0 to 100 range) indicating a low degree of confidence that the specific wakeword was detected. For example, a detection with no background noise may receive a value of 0.1 (in the 0 to 1 range) indicating a high degree of confidence that a specific wakeword was detected while a detection with a lot of distortion or noise might receive a 1 (in the 0 to 1 range) indicating a low degree of confidence that the specific wakeword was detected. In some instances, the measure of confidence may correlate to a relative distance between the NMD and the speaker. Other arrangements are also possible.

In some embodiments, the NMD may generate an arbitration message which is sent to other NMDs on the communication means 546, e.g., in the household. Each NMD in the household that also detected the wakeword may send an arbitration message to the other NMDs in the household. Typically, the NMDs which detected the wakeword may be within an audible range of the voice input.

Figure 8:
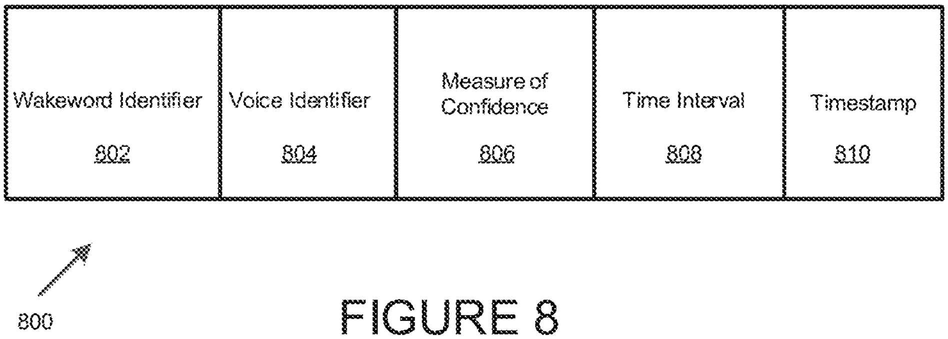
FIG. 8 shows an example arbitration message.

FIG. 8 illustrates an example of the arbitration message 800. The arbitration message 800 may identify one or more of a wakeword identifier 802, a voice identifier 804, measure of confidence 806, a time interval 808, and a time stamp 810. The arbitration message is illustrated as one message but may take the form of multiple messages and include more or less identifiers than represented by 802-810.

The household may support multiple wakewords. The wakeword identifier 802 may indicate which wakeword the NMD detected. For example, the wakeword identifier may indicate whether the NMD detected the wakeword "Alexa", "OK Google", "Hey Sonos", or "Hey Siri". The wakeword may take other forms as well.

Optionally, the arbitration message 800 may include a voice identifier 804. The voice identifier may identify the speaker of the wakeword. The identification may be who spoke the wakeword, e.g., Mary or Tom, whether the speaker was male or female, and/or whether the speaker was old or young. The NMD may learn, during a configuration process or be provided by a network device such as the server, a characteristic of each speaker that may use the NMD. The characteristic may help identify whether the wakeword was spoken by that speaker. For example, the characteristic might be a frequency spectrum of speech by the speaker. Then, when the NMD receives a wakeword, the NMD may determine whether the wakeword has the characteristic of the speaker. If the wakeword has the characteristic, then the voice identifier may identify the speaker associated with the characteristic, e.g., whether it is Mary or Tom who spoke the wakeword and/or whether it is a male or female who spoke the wakeword.

Additionally, or alternatively, the arbitration message 800 may include the measure of confidence 806 for the detected wakeword. The arbitration message may also identify the time interval 808 associated with how long the NMD will wait before sending the voice recording to the server. Including the time interval in the arbitration message may allow one NMD to learn what time interval another NMD is using. For example, one NMD may change its time interval based on that of another NMD. Additionally, the arbitration message may identify a timestamp 810 associated with the arbitration message. The timestamp may be used to identify retransmissions of arbitration messages, among other reasons.

At 706, an arbitration process based on one or more of the wakeword and the voice command may be performed to determine whether a voice input, e.g., the voice command that follows the wakeword or the wakeword and voice command, should be sent to one or more of computing device 504-508, e.g., a server. For example, the NMD may determine whether to send the voice command to the one or more computing devices based on the measure of confidence of the detected wakeword. For example, the NMD may determine whether to send the voice command to the one or more computing devices based on the received voice command (or portion thereof) and the measure of confidence of the detected wakeword. If the NMD does not send the voice command, then processing may end. If the NMD sends the voice command to the server, then the NMD may receive a response from the server. The response may be a voice response to the voice command that is to be played back by the NMD or another playback device. For example, a voice response may be "The next song will be Purple Rain" in response to the voice command "What is the next song in the playback queue?". The NMD may play the voice response. Further, if the audio played by the NMD is ducked or is to be ducked, then the NMD may mix the audio with the voice response for playback when the audio is ducked. In this regard, the NMD may duck audio in response to detecting a wakeword if it has sufficient processing power to perform mixing and pause audio if it does not have sufficient processing power to perform the mixing. Additionally, or alternatively, the response may be a command associated with control of a media playback device or system. Examples may include playing certain music content such as "When Doves Cry by Prince" indicated in the voice command or setting the volume of playback.

Figure 9:
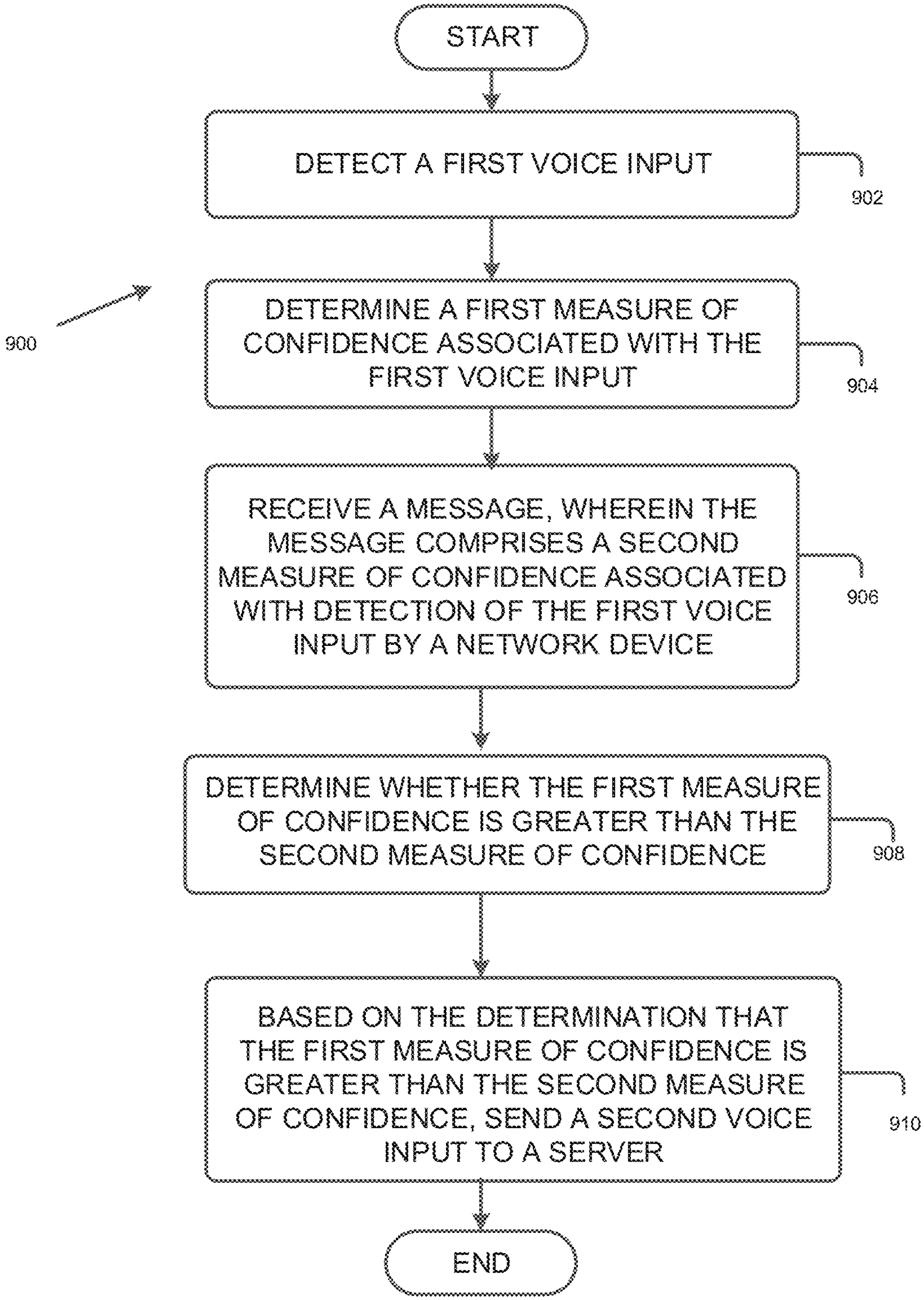
FIG. 9 shows a detailed flow diagram of functions associated with arbitration between network microphone devices in accordance with a first embodiment.

FIG. 9 shows a detailed flow diagram 900 of functions associated with the arbitration between one or more NMDs in accordance with a first embodiment. The first embodiment is based on an arbitration message being received from another NMD and a voice command being sent to a server based on the received arbitration message. The described functions may be performed by an NMD individually or in combination with the computing device 504-506, PBDs 532-538, NMDs 512-516, CR 522, or any other devices described herein.

At 902, a first voice input may be detected. The first voice input may be, for example, a wakeword. In some embodiments, the detection may trigger start of a time interval. At 904, a first measure of confidence associated with the first voice input may be determined. The measure of confidence may be how well the wakeword was detected. The first measure of confidence may be determined by the NMD itself. Additionally, or alternatively, the NMD may send the voice input to a computing device 504-508 or other network device and receive the measure of confidence from the computing device 504-508 or other network device.

At 906, a message may be received. The message may be an arbitration message sent from an NMD which detected the same wakeword. The message may comprise a second measure of confidence associated with detection of the first voice input.

In some embodiments, the NMD may also send an arbitration message which comprises the first measure of confidence associated with the first voice input to other NMDs. For example, the NMD may send an arbitration message to another NMD coupled to communication means 546. This way the other NMD, e.g., in a household, may perform arbitration as well based on the wakeword detected by the NMD.

At 908, a determination is made whether the first measure of confidence is greater than the second measure of confidence. If the first measure of confidence is greater than the second measure of confidence, then the NMD may win the arbitration. The greater measure of confidence indicates that the NMD may be in a better position to clearly receive the voice command which follows the wakeword.

The NMD may receive a plurality of arbitration messages from a plurality of NMDs during a time interval. The NMD may continue to compare the measure of confidence in each arbitration message to the measure of confidence associated with the detected first voice input until, for example, the time interval expires. So long as the measure of confidence of the detected first voice input is greater than the measure of confidence in any of the received arbitration messages, then the NMD may continue to win the arbitration.

In some embodiments, the NMD may wait for expiration of the time interval before performing any arbitration. At expiration of the time interval, the NMD may compare the measure of confidence associated with its detected wakeword with the measure of confidences indicated in the arbitration messages that have been received during the time interval. The NMD may determine whether the measure of confidence associated with its detected wakeword is the highest. Based on this determination, the NMD may send the second voice input to one or more of computing devices 504-508 at expiration of the time interval.

At 910, the second voice input may be sent to one or more of computing devices 504-508, e.g., server based on the determination that the first measure of confidence is greater than the second measure of confidence. In some embodiments, the second voice input may be a voice command that follows the first voice input, e.g., wakeword. In other embodiments, the second voice input may be the same as the first voice input to the extent that the first voice input is indicative of both a wakeword as well as a voice command. In yet other embodiments, the first voice input may also be sent with the second voice input to the one or more computing devices. The server may use the first voice input to arbitrate "in the cloud" as between two or more NMDs which send a voice command associated with a same wakeword to the server. The server may then determine which sent voice command to use for voice recognition.

The server may then send a response to the second voice input. The response may be a voice response which is played by the NMD or other network device or a command associated with control of a media playback device or system such as play certain music content or change a setting of the playback device.

Figure 10:
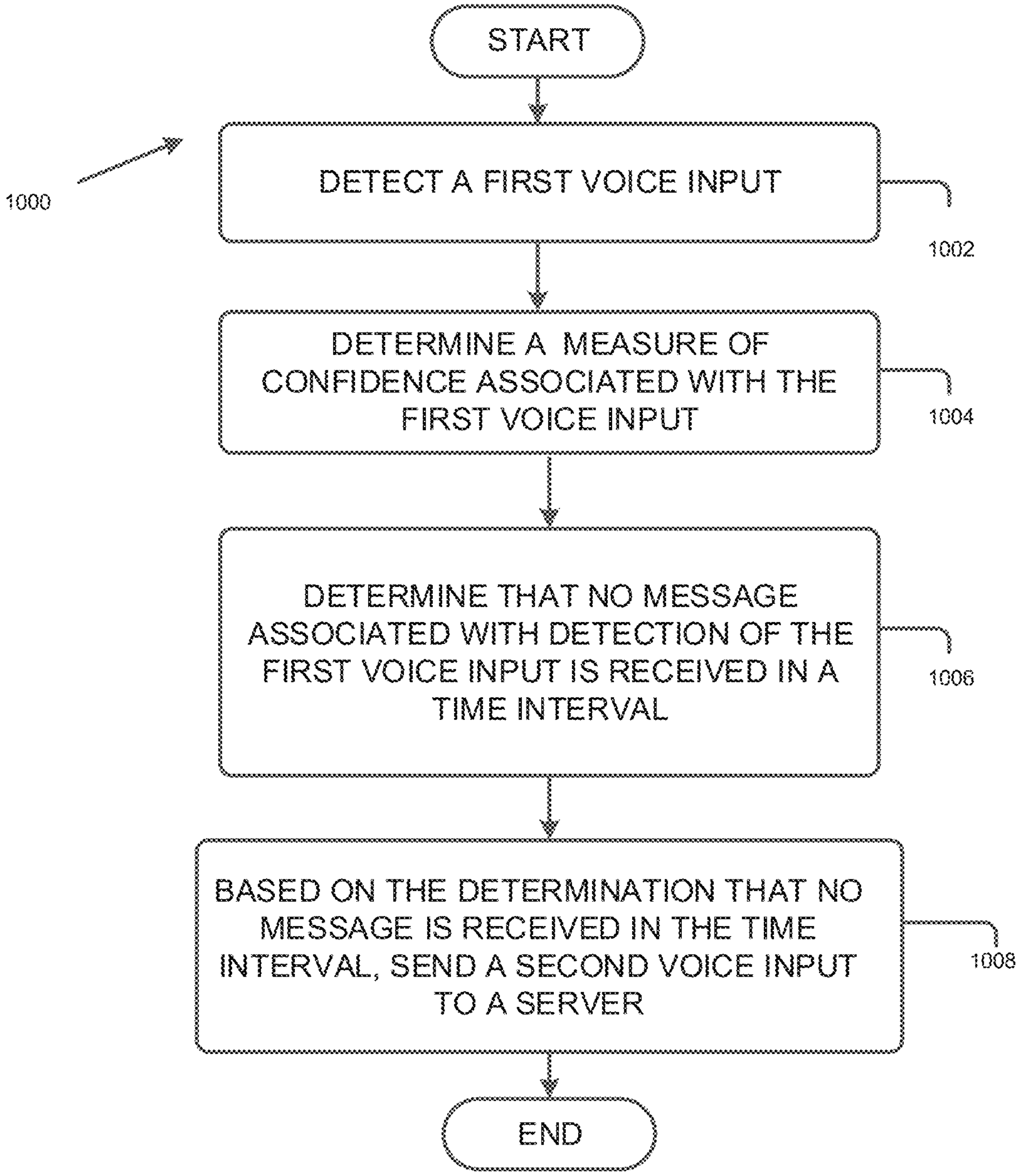
FIG. 10 shows a detailed flow diagram of functions associated with arbitration between network microphone devices in accordance with a second embodiment.

FIG. 10 shows a detailed flow diagram 1000 of functions associated with arbitration between network microphone devices in accordance with a second embodiment. The second embodiment illustrates a scenario where an arbitration message associated with detection of the wakeword is not received from any other NMD during a time interval and a voice command which follows a wakeword is sent to a server after the time interval expires. Again, the described functions may be performed by an NMD individually or in combination with the computing device 504-506, PBDs 532-538, NMDs 512-516, CR 522, or any other devices described herein.

At 1002, a first voice input may be detected. The first voice input may be, for example, a wakeword. The detection may trigger the start of a time interval. At 1004, a measure of confidence associated with the first voice input may be determined. The measure of confidence may be determined by the NMD itself. Additionally, or alternatively, the NMD may send the voice input to a computing device 504-508 or other network device and then receive the measure of confidence from the computing device 504-508 or other network device.

In some embodiments, a message, e.g., arbitration message, may be sent which comprises the first measure of confidence associated with the first voice input. For example, the NMD may send the arbitration message to other NMDs coupled to communication means 546, e.g., in a household. At 1006, a determination may be made that no message associated with detection of the first input by another NMD is received in the time interval. For example, the NMD may determine that it received no arbitration message from any other NMDs on the communication means 546. At 1008, based on the determination that no message is received, a second voice input may be sent to one or more of computing devices 504-508, e.g., server. The second voice input may be a voice command that the NMD received and which followed the voice input in the form of the wakeword.

The server may send a response to the second voice input. For example, the NMD which sent the second voice input may receive the response to the second voice input. The response may be a voice response to a request for information which is played by the NMD or other network device. Additionally, or alternatively, the response may be a command associated with control of a media playback device or system such as play certain music content or change a setting of the playback device. The NMD or another network device may perform the command defined by the response.

Figure 11:
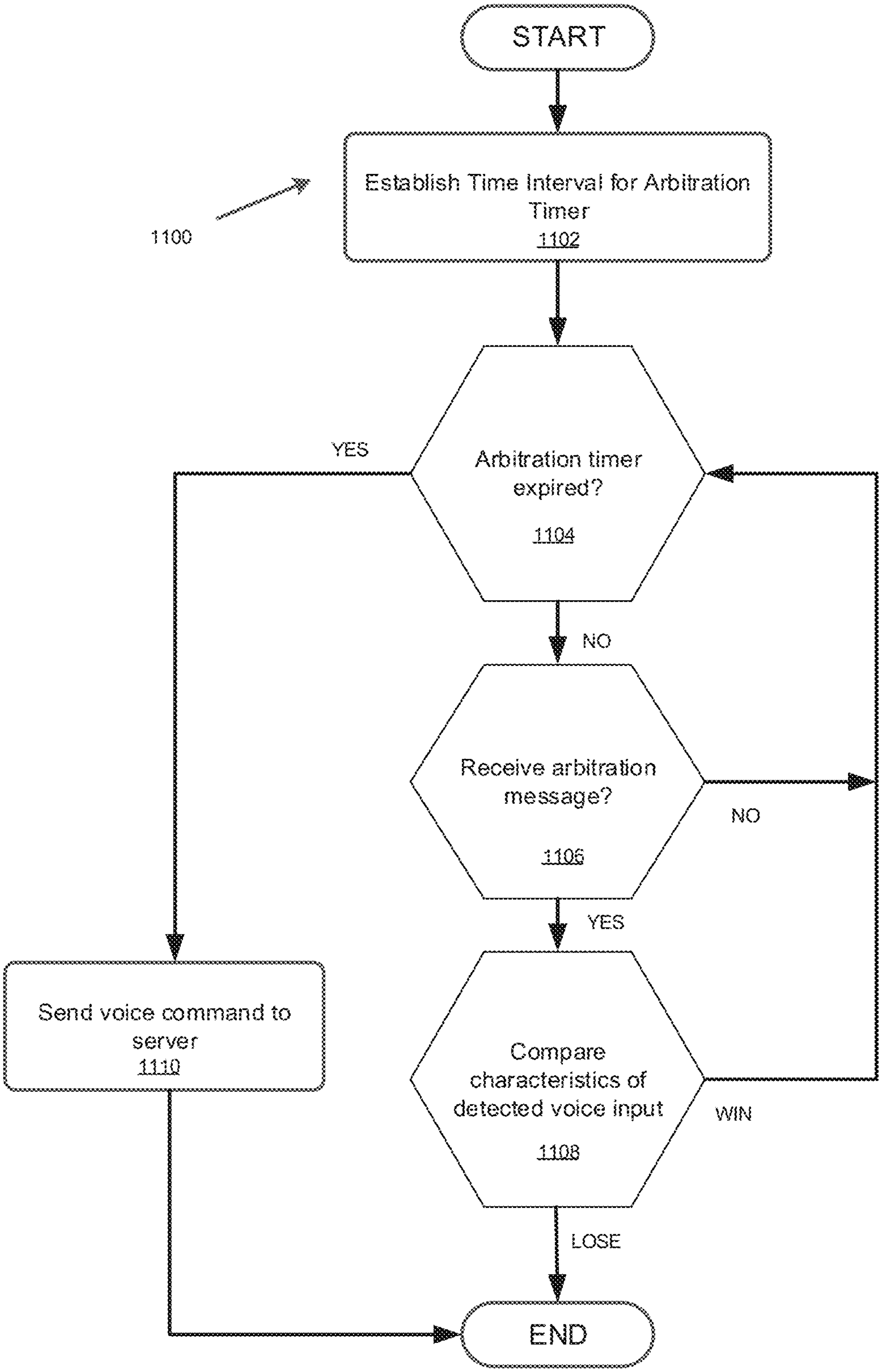
FIG. 11 shows a flow diagram of arbitration functions.

FIG. 11 is a flow chart 1100 which describes in more detail the functions associated with the arbitration process at 706 of FIG. 7. The described functions may be performed by an NMD individually or in combination with the computing device 504-506, PBDs 532-538, NMDs 512-516, CR 522, or any other devices described herein.

At 1102, the NMD may establish a time interval for an arbitration timer. The arbitration timer may be a clock-based timer. The arbitration timer may be initially set to a time interval indicative of how long the NMD should wait before sending a voice command which follows the wakeword to one or more of the computing devices, e.g., server. The length of time may be a configurable parameter, such as 0 to 100 ms. The time interval may be set in a manner so as to quickly arbitrate between NMDs without adding much latency to voice recognition.

At 1104, a determination is made whether the arbitration timer has expired. If the arbitration timer has not expired, then processing continues at 1106 to determine whether an arbitration message is received. The arbitration message may be message from another NMD which detected the same wakeword. If an arbitration message is not received, then processing may return back to 1104 to determine whether the arbitration timer expired. If an arbitration message is received, then at 1108, the NMD may compare characteristics of the voice input, e.g., wakeword, that it detected with the characteristics of the wakeword detected by the NMD which sent the arbitration message.

For example, the NMD may compare the measure of confidence of the wakeword it detected to the measure of confidence in the arbitration message that it received. For example, the NMD may compare the voice identifier of the wakeword it detected to the voice identifier in the arbitration message that it received. For example, the NMD may compare the wakeword identifier of the wakeword it detected to the wakeword indicator in the arbitration message that it received.

The NMD may determine whether it "wins" or "loses" the arbitration with the other NMD based on the comparison.

The NMD may win the arbitration based on one or more of the following determinations: (i) the measure of confidence determined by the NMD is larger than that associated with the received arbitration message; (ii) the voice identifier determined by the NMD is different from the voice identifier associated with the received arbitration message; (ii) the wakeword detected by the NMD is different from the wakeword identified in the received arbitration message. The NMD may win based on other criteria as well.

The NMD may lose the arbitration if the measure of confidence determined by the NMD is less than that associated with the received arbitration message for the same detected wakeword. If the NMD supports voice identification and the arbitration message also indicate a voice identifier, the NMD may lose the arbitration if the measure of confidence determined by the NMD is less than that associated with the received arbitration message for the same voice identifier and same detected wakeword. The NMD may lose based on other criteria as well.

If the NMD wins the arbitration, then processing may return to 1104. If the NMD loses the arbitration, then at 1108, the arbitration may terminate. The audio played back by the NMD may have been adjusted, e.g., ducked or paused, when a wakeword was detected so as to better receive the voice command which follows the wakeword. If the NMD loses the arbitration, then the NMD may adjust the audio back to where the audio was before the wakeword was detected and the audio was adjusted. For example, if the audio was paused, the audio may be unpaused, e.g., audio playback may continue from where it was stopped. For example, if the audio was ducked, then the audio may be unducked, e.g., the volume of the audio may be increased. For example, if the audio was ducked, the audio may be returned to a point in the audio prior to ducking. The NMD may store a position in the audio, e.g., time stamp, where the audio is ducked. Upon losing the arbitration, the audio may begin playback at the position in the audio, e.g., timestamp, where the audio was ducked. Other arrangements are also possible.

In yet another embodiment, if the NMD loses the arbitration, then the NMD may not adjust its audio to a level, e.g., volume, where it was before being adjusted until it receives a notification. In a first example, the notification may take the form of a message from the NMD which wins the arbitration. In a second example, the notification may take the form of a message from another playback device (or NMD) which is in a bonded zone with the NMD. The other playback device may be playing audio in synchrony with the NMD, win arbitration, provide the voice command to the server, and then send the notification to the NMD to adjust the audio back when voice recognition is complete. In a third example, the notification may take the form of presence or absence of a signal that is transmitted by the NMD which may have won arbitration. The signal may be output by the NMD via the speakers. For example, the signal may be outside a frequency range of music, e.g., outside a 20 Hz to 20 KHz frequency range, but still within an audible by the microphone of the NMD. Presence of this signal may indicate that the NMD should adjust the audio to a level where it was before a wakeword was detected. Alternatively, absence of this signal may indicate that the NMD should adjust the audio to a level where it was before a wakeword was detected. The notification may take other forms as well, such as Universal Plug and Play (UPnP) control requests.

If at 1104, the time interval expires, then at 1110 the NMD may send the received voice command to the server. The time interval may expire if the NMD continues to win arbitrations. Alternatively, the time interval may expire if the NMD does not receive any arbitration message associated with detection of the wakeword from any other NMD before the time interval expires. In embodiments, the voice command may be sent to the server by streaming the voice command to the server.

Figure 12:
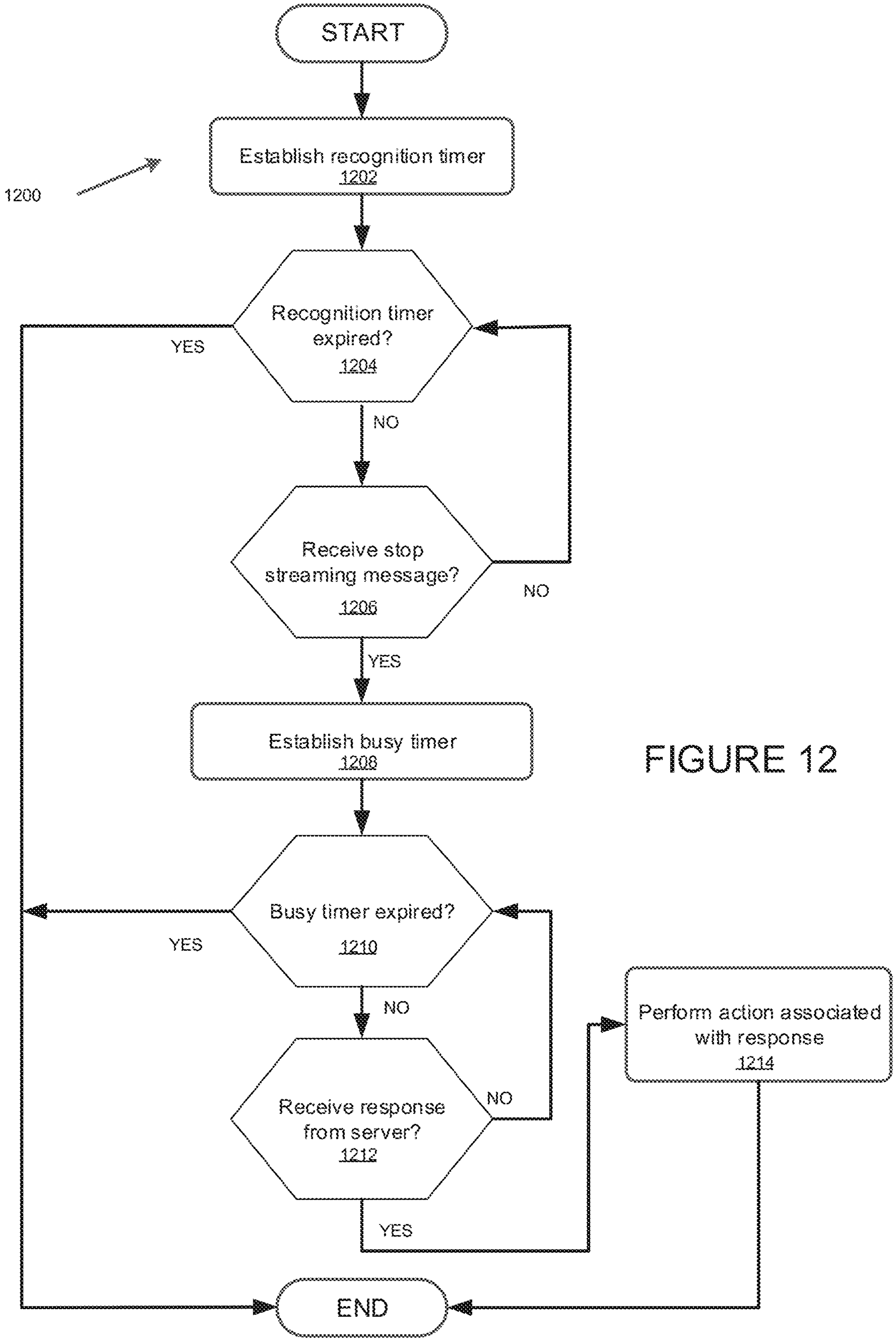
FIG. 12 shows a flow diagram associated with voice recognition between a network microphone device and a server.

FIG. 12 a flow diagram associated with voice recognition of the voice command as between a network microphone device and a computing device, e.g., server. The described functions may be performed by an NMD in combination with the computing device 504-506, PBDs 532-538, NMDs 512-516, CR 522, or any other devices described herein.

At 1202, a recognition timer may be established. The recognition timer may be a clock-based timer which defines a duration for which the NMD may send (e.g., stream) the voice command that the NMD receives to the server. For example, the duration may be set to 5-10 seconds and used to recover in the extent that the server does not notify the NMD to stop sending the voice command. The server may not notify the NMD to stop sending due to a communication problem over the communications means 546 or if the server fails to inform the NMD that the server decided to process the voice command received by another NMD. At 1204, a determination is made whether the recognition timer expires. If the recognition timer expires, then, the streaming of the voice command terminates. In some embodiments, the streaming of the voice command may also terminate if the server sends an abort message to terminate the voice command streaming. The abort message may indicate that another NMD won arbitration.

If the recovery timer does not expire, then at 1206, the NMD may determine whether the server sent an indication to stop the streaming of the voice command. If the server did not send an indication to stop the streaming of the voice command, then processing may return to 1204 to determine if the recognition timer expired. If the server sent an indication to stop the streaming of the voice command, then at 1208 the NMD may establish a busy timer. The busy timer may indicate a time duration by which the server is to send a response to the voice command that followed the wakeword after the NMD sent the voice command.

The server may be cloud-based server system. The server may perform voice recognition on the voice command. For example, the server may convert the voice command to text, interpret the text, and then formulate a response based on the text. At 1210, expiration of the busy timer is checked. If the busy timer is not expired, then at 1212, the NMD checks to see if the response is received. The response may take a variety of forms.

In one example, if the voice command is a request for information, then the response may be a voice response. The voice response may be the requested information which is sent to the NMD in the form of text and converted to a voice response that is audibly played back by the NMD. For example, the voice response may be "The weather sunny" in response to a voice command querying "What is the weather?". Further, the voice response may be mixed with the audio being played back by the NMD in the case when the NMD is also playing back audio. If the audio is paused, then the voice response may be played back alone.

In another example, the voice response may be an indication that the voice command was not understood. For example, the voice response may be "I did not understand the command." The voice response may take other forms as well.

Additionally, or alternatively, the response may be a command associated with control of a media playback device or system such as play certain music content or change a setting of the playback device. The server may send the command to the NMD and the NMD may perform the command or instruct another network device to perform the command. For example, the command may be for the NMD to play certain audio content or change a setting of the playback device. If a command is received, then the NMD may perform the command or instruct another network device to perform the command.

The response may take other forms as well, including a response in the form of text which is displayed on the control device 300. Other arrangements are also possible.

At 1214, an action is performed associated with the response, e.g., play the voice response or perform the command. If no response is received from the server, then processing returns to 1210. If the busy timer expires with no response received, then the processing may terminate.

While the server is processing the voice command, the NMD may not be arranged to detect any additional wakewords. However, the NMD may receive additional voice input as a result of playing a voice response. The server may provide an indication to the NMD that the voice response will result in additional voice input. The NMD may establish a timer to wait for the additional voice input. For example, the additional voice input may be an audio signal with an average amplitude which exceeds a threshold level. If the NMD detects an audio signal above a threshold level, then the NMD may receive the additional voice input and stream the voice input to the server, at which point, the server may provide a response to the NMD. The response may be processed as a voice command in the manner described herein. If the additional voice input is not received before the timer expires, the NMD may stop receiving the voice input and terminate processing.

In some embodiments, arbitration may be performed by a centralized device rather than being performed locally at each NMD. The centralized device may be a designed NMD or network device connected to the communication means 546, e.g., in a household, making a determination of which NMD which detected a wakeword should send the voice command following the wakeword to the server. In this regard, the centralized device may receive an arbitration message from the one or more NMDs and identify based on the measure of confidence associated with the arbitration message which NMD should send its received voice command to the cloud-based computing device. For example, the centralized device may determine which NMD detected the wakeword with a highest measure of confidence. The centralized device may then cause the identified NMD to send its received voice command to the computing device.

NMDs may have received a voice command with a sufficiently high measure of confidence that providing the voice command to the computing device would assist in performing reliable voice recognition. Accordingly, in some embodiments, the voice command received by NMDs which did not win an arbitration may also be sent to the computing device to improve reliability in voice recognition of the voice command. The received voice command sent may be those having a measure of confidence that exceeds a threshold level. The NMD which wins arbitration may notify those NMDs to send its received voice command to the server if the measure of confidence exceeds the threshold level. The multiple versions of the voice command may facilitate reliable voice recognition.

IV. CONCLUSION

The description above discloses, among other things, various example systems, methods, apparatus, and articles of manufacture including, among other components, firmware and/or software executed on hardware. It is understood that such examples are merely illustrative and should not be considered as limiting. For example, it is contemplated that any or all of the firmware, hardware, and/or software aspects or components can be embodied exclusively in hardware, exclusively in software, exclusively in firmware, or in any combination of hardware, software, and/or firmware. Accordingly, the examples provided are not the only way(s) to implement such systems, methods, apparatus, and/or articles of manufacture.

Additionally, references herein to "embodiment" means that a particular feature, structure, or characteristic described in connection with the embodiment can be included in at least one example embodiment of an invention. The appearances of this phrase in various places in the specification are not necessarily all referring to the same embodiment, nor are separate or alternative embodiments mutually exclusive of other embodiments. As such, the embodiments described herein, explicitly and implicitly understood by one skilled in the art, can be combined with other embodiments.

The specification is presented largely in terms of illustrative environments, systems, procedures, steps, logic blocks, processing, and other symbolic representations that directly or indirectly resemble the operations of data processing devices coupled to networks. These process descriptions and representations are typically used by those skilled in the art to most effectively convey the substance of their work to others skilled in the art. Numerous specific details are set forth to provide a thorough understanding of the present disclosure. However, it is understood to those skilled in the art that certain embodiments of the present disclosure can be practiced without certain, specific details. In other instances, well known methods, procedures, components, and circuitry have not been described in detail to avoid unnecessarily obscuring aspects of the embodiments. Accordingly, the scope of the present disclosure is defined by the appended claims rather than the forgoing description of embodiments.

When any of the appended claims are read to cover a purely software and/or firmware implementation, at least one of the elements in at least one example is hereby expressly defined to include a tangible, non-transitory medium such as a memory, DVD, CD, Blu-ray, and so on, storing the software and/or firmware.

The invention claimed is:

1. A first playback device comprising:

at least one processor;

at least one non-transitory computer-readable medium; and program instructions stored on the at least one non-transitory computer-readable medium that, when executed by the at least one processor, cause the first playback device to:

detect a voice input via at least one microphone of the first playback device, the voice input comprising a command to control playback of audio content by at least one of the first playback device or a second playback device;

determine a first measure of confidence associated with the voice input as detected by the first playback device;

receive, from the second playback device, an arbitration message comprising a second measure of confidence associated with the voice input as detected by the second playback device;

determine that the second measure of confidence is greater than the first measure of confidence;

receive, from the second playback device, the voice input as detected by the second playback device;

based on the determination that the second measure of confidence is greater than the first measure of confidence, perform voice recognition based on the voice input as detected by the second playback device; and after performing the voice recognition based on the voice input as detected by the second playback device, execute the command to control playback of audio content by at least one of the first playback device or the second playback device.

2. The first playback device of claim 1, wherein the arbitration message further comprises voice data that is based on the voice input as detected by the second playback device, and wherein the program instructions that, when executed by the at least one processor, cause the first playback device to perform the voice recognition comprise program instructions that, when executed by the at least one processor, cause the first playback device to:

transmit a voice message that comprises the voice data to a cloud-based server via a network for voice processing.

3. The first playback device of claim 2, wherein the voice message is a first voice message, and wherein the arbitration message further comprises a value indicating an interval of time that the second playback device will wait before transmitting, to the cloud-based server, a second voice message that is based on the voice input as detected by the second playback device.

4. The first playback device of claim 1, wherein the arbitration message further comprises voice data that is indicative of a wakeword.

5. The first playback device of claim 1, further comprising program instructions stored on the at least one non-transitory computer-readable medium that, when executed by the at least one processor, cause the first playback device to:

after performing the voice recognition based on the voice input as detected by the second playback device, cause the second playback device to play back a voice response to the voice input.

6. The first playback device of claim 1, wherein the arbitration message further comprises a header that comprises (i) voice data that is based on the voice input as detected by the second playback device, (ii) an identifier associated with a source of the voice input as detected by the second playback device, and (iii) a timestamp value indicating a time at which the arbitration message was transmitted by the second playback device.

7. The first playback device of claim 1, wherein the program instructions that, when executed by the at least one processor, cause the first playback device to execute the command to control playback of audio content comprise program instructions that, when executed by the at least one processor, cause the first playback device to execute the command to control playback of audio content by playing back a first audio channel of the audio content in synchrony with playback of a second audio channel of the audio content by the second playback device.

8. The first playback device of claim 1, wherein the voice input further comprises a wakeword.

9. A non-transitory computer-readable medium, wherein the non-transitory computer-readable medium is provisioned with program instructions that, when executed by at least one processor, cause a first playback device to:

detect a voice input via at least one microphone of the first playback device, the voice input comprising a command to control playback of audio content by at least one of the first playback device or a second playback device;

determine a first measure of confidence associated with the voice input as detected by the first playback device;

receive, from the second playback device, an arbitration message comprising a second measure of confidence associated with the voice input as detected by the second playback device;

determine that the second measure of confidence is greater than the first measure of confidence;

receive, from the second playback device, the voice input as detected by the second playback device;

based on the determination that the second measure of confidence is greater than the first measure of confidence, perform voice recognition based on the voice input as detected by the second playback device; and after performing the voice recognition based on the voice input as detected by the second playback device, execute the command to control playback of audio content by at least one of the first playback device or the second playback device.

10. The non-transitory computer-readable medium of claim 9, wherein the arbitration message further comprises voice data that is based on the voice input as detected by the second playback device, and wherein the program instructions that, when executed by the at least one processor, cause the first playback device to perform the voice recognition comprise program instructions that, when executed by the at least one processor, cause the first playback device to:

transmit a voice message that comprises the voice data to a cloud-based server via a network for voice processing.

11. The non-transitory computer-readable medium of claim 10, wherein the voice message is a first voice message, and wherein the arbitration message further comprises a value indicating an interval of time that the second playback device will wait before transmitting, to the cloud-based server, a second voice message that is based on the voice input as detected by the second playback device.

12. The non-transitory computer-readable medium of claim 9, wherein the arbitration message further comprises voice data that is indicative of a wakeword.

13. The non-transitory computer-readable medium of claim 9, wherein the non-transitory computer-readable medium is also provisioned with program instructions that, when executed by the at least one processor, cause the first playback device to:

after performing the voice recognition based on the voice input as detected by the second playback device, cause the second playback device to play back a voice response to the voice input.

14. The non-transitory computer-readable medium of claim 9, wherein the arbitration message further comprises a header that comprises (i) voice data that is based on the voice input as detected by the second playback device, (ii) an identifier associated with a source of the voice input as detected by the second playback device, and (iii) a timestamp value indicating a time at which the arbitration message was transmitted by the second playback device.

15. The non-transitory computer-readable medium of claim 9, wherein the program instructions that, when executed by the at least one processor, cause the first playback device to execute the command to control playback of audio content comprise program instructions that, when executed by the at least one processor, cause the first playback device to execute the command to control playback of audio content by playing back a first audio channel of the audio content in synchrony with playback of a second audio channel of the audio content by the second playback device.

16. The non-transitory computer-readable medium of claim 9, wherein the voice input further comprises a wakeword.

17. A method implemented by a first playback device, the method comprising:

detecting a voice input via at least one microphone of the first playback device, the voice input comprising a command to control playback of audio content by at least one of the first playback device or a second playback device;

determining a first measure of confidence associated with the voice input as detected by the first playback device;

receiving, from the second playback device, an arbitration message comprising a second measure of confidence associated with the voice input as detected by the second playback device;

determining that the second measure of confidence is greater than the first measure of confidence;

receiving, from the second playback device, the voice input as detected by the second playback device;

based on the determination that the second measure of confidence is greater than the first measure of confidence, performing voice recognition based on the voice input as detected by the second playback device; and after performing the voice recognition based on the voice input as detected by the second playback device, executing the command to control playback of audio content by at least one of the first playback device or the second playback device.

18. The method of claim 17, wherein the arbitration message further comprises voice data that is based on the voice input as detected by the second playback device, and wherein performing the voice recognition comprises:

transmitting a voice message that comprises the voice data to a cloud-based server via a network for voice processing.

19. The method of claim 18, wherein the voice message is a first voice message, and wherein the arbitration message further comprises a value indicating an interval of time that the second playback device will wait before transmitting, to the cloud-based server, a second voice message that is based on the voice input as detected by the second playback device.

20. The method of claim 17, wherein the arbitration message further comprises voice data that is indicative of a wakeword.

* * * * *